United States Patent [19]

Counselman

[11] Patent Number: 4,894,662

[45] Date of Patent: Jan. 16, 1990

[54] METHOD AND SYSTEM FOR DETERMINING POSITION ON A MOVING PLATFORM, SUCH AS A SHIP, USING SIGNALS FROM GPS SATELLITES

[75] Inventor: Charles C. Counselman, Belmont, Mass.

[73] Assignee: Western Atlas International, Inc., Houston, Tex.

[21] Appl. No.: 852,016

[22] Filed: Apr. 14, 1986

Related U.S. Application Data

[63] Continuation-in-part of Ser. No. 353,331, Mar. 1, 1982, Pat. No. 4,667,203.

[51] Int. Cl.$^4$ ............................................. G01S 5/02
[52] U.S. Cl. .................................. 342/357; 342/450; 342/463
[58] Field of Search ........ 342/357, 352, 356, 417–419, 342/450, 454, 457, 463–465

[56] References Cited

U.S. PATENT DOCUMENTS

| | | | |
|---|---|---|---|
| 3,860,921 | 1/1975 | Wood | 342/109 |
| 3,900,873 | 8/1975 | Bouvier et al. | 342/103 |
| 3,906,204 | 9/1975 | Rigdon et al. | 342/357 |
| 3,943,514 | 3/1976 | Afendykiw et al. | 342/156 |
| 4,045,796 | 8/1977 | Kline | 342/103 |
| 4,054,879 | 10/1977 | Wright et al. | 342/192 |
| 4,114,155 | 9/1978 | Raab | 342/394 |
| 4,170,776 | 10/1979 | MacDoran | 342/458 |
| 4,232,389 | 11/1980 | Loiler | 455/12 |
| 4,368,469 | 1/1983 | Ott et al. | 342/352 |
| 4,445,118 | 4/1984 | Taylor et al. | 342/357 |
| 4,463,357 | 7/1984 | MacDoran | 342/460 |
| 4,468,793 | 8/1984 | Johnson et al. | 342/460 |
| 4,601,005 | 7/1986 | Kilvington | 364/602 |
| 4,613,977 | 9/1986 | Wong et al. | 324/420 |
| 4,647,935 | 3/1987 | Helbing | 342/357 X |

OTHER PUBLICATIONS

Charles C. Counselman, III, "Radio Astrometry", Annual Reviews of Astrometry and Astrophysics, vol. 14, 1976, pp. 197–214.
Counselman, Shapiro, Greenspan and Cox, "Backpack VLBI Terminal with Subcentimeter Capability", NASA Conference Publication 2115—Radio Interferometry Techniques for Geodesy, 1980, pp. 409–414.
Counselman, Gourevitch, King, Herring, Shapiro, Greenspan, Rogers, Whitney and Cappallo, "Accuracy of Baseline Determinations by MITES assessed by Comparison with Tape, Theodolite, and Deodimeter Measurements", EOS, The Transactions of the American Geophysical Union, vol. 62, Apr. 28, 1981, p. 260.
Counselman and Shapiro, "Miniature Interferometer Terminals for Earth Surveying", Bulletin Geodesique, vol. 53, 1979, pp. 139–163.

(List continued on next page.)

*Primary Examiner*—Theodore M. Blum
*Assistant Examiner*—John B. Sotomayor
*Attorney, Agent, or Firm*—Norman E. Brunell; E. Eugene Thigpen

[57] ABSTRACT

Method and apparatus are disclosed for accurately determining position from GPS satellites and received on a ship using C/A code group delay observable TAU, 308 $f_o$ implicit carrier phase observable PHI, L1 band implicit $f_o$ carrier residual phase observable $PSI_{L1}$, and L2 band implicit $f_o$ carrier residual phase observable $PSI_{L2}$. A precise measurement of the group-phase delay range to each satellite is made based upon the L1 center frequency carrier phase. A correction for ionospheric effects is determined by simultaneous observation of the group delays of the wide bandwidth P code modulations in both the L1 and L2 bands. These group delays are determined by measuring the phases of carrier waves implicit in the spread-spectrum signals received in both bands. These carriers are reconstructed from both the L1 and L2 band signals from each satellite without using knowledge of the P code. The unknown biases in the L1 center frequency carrier phase range measurements are determined from simultaneous, pseudorange measurements, with time averaging. The instantaneous position of the ship may then be determined from the ranges so determined, with both the bias and the ion-spheric effects having been eliminated.

64 Claims, 24 Drawing Sheets

OTHER PUBLICATIONS

W. O. Henry, "Some Developments in Loran", Journal of Geophysical Research, vol. 65, Feb. 1960, pp. 506–513.

Pierce, "Omega", IEEE Transactions on Aerospace and Electronic Systems, vol. AES-1, No. 3, Dec. 1965, pp. 206–215.

J. J. Spilker, Jr., "GPS Signal Structure and Performance Characteristics", Navigation, vol. 25, No. 2, 1978, pp. 121–146.

Bossler, Goad and Bender, "Using the Global Positioning System (GPS) for Geodetic Positioning", Bulletin Geodesique, vol. 54, 1980, pp. 553–563.

Alan E. E. Rogers, "Broad-Band Passive 90° RC Hybrid with Low Component Sensitivity for Use in the Video Range of Frequencies", Proceedings of the IEEE, vol. 59, 1971, 1617–1618.

M. L. Meeks, Editor, Methods of Experimental Physics, vol. 12 (Astrophysics), Part C (Radio Observations), 1976, pp. v–ix and as follows: Chapter 5.3: J. M. Moran, "Very Long Baseline Interferometer Systems", pp. 174–197, Chapter 5.5: J. M. Moran, Very Long Baseline Interferometric Observations and Data Reduction, pp. 228–260, Chapter 5.6: I. I. Shapiro, Estimation of Astrometric and Geodetic Parameters, pp. 261–276.

Counselman and Gourevitch, "Miniature Interferometer Terminals for Earth Surveying: Ambiguity and Multipath with Global Positioning System", IEEE Transactions on Geoscience and Remote Sensing, vol. GE-19, No. 4, Oct. 1981, pp. 244–252.

Counselman and Shapiro, "Miniature Interferometer Terminals for Earth Surveying", Proceedings of the 9th GEOP Conference, An International Symposium on the Applications of Geodesy to Geodynamics, Oct. 2–5, 1978, Dept. of Geodetic Science Report No. 280, The Ohio State University, 1978, pp. 65–85.

Peter F. MacDoran, "Satellite Emission Radio Interferometric Earth Surveying Series—GPS Geodetic System", Bulletin Geodesique, vol. 53, 1979, pp. 117–138.

Peter F. MacDoran, "SERIES-Satellite Emission Radio Interferometric Earth Surveying," Third Annual NASA Geodynamics Research Program Review, Crustal Dynamics Project, Geodynamics Research, Jan. 26–29, 1981, Goddard Space Flight Center, p. 76 (plus) three view graph figures entitled: Satellite L--Band Ionospheric Calibration (SLIC); Series One-Way Range Receiver Simplified Block Diagram: and Series Receiver Range Synthesis.

Peter F. MacDoran, "Satellite Emission Range Inferred Earth Surveying", Series—GPS, JPL, presented at Defense Mapping Agency Meeting, Feb. 9, 1981, 13 pages.

MacDoran, Spitzmesser and Buennagel, "SERIES: Satellite Emission Range Inferred Earth Surveying", Presented at the Third International Geodetic Symposium on Satellite Doppler Positioning, Las Cruces, N.M., Feb. 1982, 23 pages.

MacDoran, Spitzmesser and Buennagel, "SERIES: Satellite Emission Range Inferred Earth Surveying", Proceedings of the 3rd International Geodetic Symposium on Satellite Doppler Positioning, vol. 2, 1982, pp. 1143–1164.

"Operating Manual STI Model 5010 GPS Receiver", Stanford Telecommunications Inc., STI-O & M-8707B, Feb. 25, 1980, selected pages as follows: Title page, i–vi, 1-1, 1-3, 2-1 through 2-5, 3-1 through 3-3, 6-1 through 6-9.

"Pioneer Venus Project, Differenced Long-Baseline Interferometry Experiment, Design Review Document," NASA Ames Research Center, Moffett Field, Calif., Jul. 1, 1977, 23 pages.

C. Goad, "Visit with P. MacDoran, Aug. 6, 1981", Memo to Capt. Bossler, sent to Dr. Counselman, Aug. 12, 1981, 3 pages.

Peter F. MacDoran, Statements made at the 3rd International Geodetic Symposium on Satellite Doppler Positioning, Feb. 1982.

A. E. E. Rogers, C. A. Knight, H. F. Hinteregger, A. R. Whitney, C. C. Counselman, III, I. I. Shapiro, S. A. Gourevitch and T. A. Clark, "Geodesy by Radio Interferometry: Determination of a 1.24-km. Base Line Vector with 5-mm Repeatability", J. Geophys. Res., vol. 83, pp. 325–334, 1978.

W. E. Carter, A. E. E. Rogers, C. C. Counselman, III, and I. I. Shapiro, "Comparison of Geodetic and Radio Interferometric Measurements of the Haystack-Westford Base Line Vector", J. Geophys. Res., vol. 85, pp. 2685–2687, 1980.

(List continued on next page.)

OTHER PUBLICATIONS

R. A. Preston, R. Ergas, H. F. Hinteregger, C. A. Knight, D. S. Robertson, I. I. Shapiro, A. R. Whitney, A. E. E. Rogers, and T. A. Clark, "Interferometric Observations of an Artificial Satellite", Science, vol. 178, pp. 407-409, 1972.

C. C. Counselman, III and I. I. Shapiro, "Miniature Interferometer Terminals for Earth Surveying", Proc. of the 2nd Int'l. Geodetic Symposium on Satellite Doppler Positioning, vol. 2, pp. 1237-1286, 1979 (avail. from Appl. Res. Lab., Univ. of Texas, Austin, Tex. 78758).

R. J. Anderle, "Application of the NAVSTAR GPS Geodetic Receiver to Geodesy and Geophysics", Naval Surface Weapons Center Tech. Rept. No. 80-282, 27 pages, 1980.

J. J. Spilker, Jr., Digital Communications by Satellite, Prentice-Hall, Englewood Cliffs, N.J., pp. 302-303, 1977.

P. L. Bender, "A Proposal to the National Aeronautics and Space Administration for the Support of GPS Satellite Orbit Determination Using the Reconstructed Carrier Phase Method for Tracking", Quantum Physics Division, National Bureau of Standards, Boulder, Colo., pp. 1-12, submitted Aug. 5, 1980.

Peter L. Bender, National Bureau of Standards, Private Communication, 1978.

C. C. Counselman, III, D. H. Steinbrecher, "The Macrometer (TM): A Compact Radio Interferometry Terminal for Geodesy with GPS", Proceedings of the Third International Geodetic Symposium on Satellite Doppler Positioning, pp. 1165-1172, Feb. 8-12, 1982.

C. C. Counselman, III, R. J. Cappallo, S. A. Gourevitch, R. L. Greenspan, T. A. Herring, R. W. King, A. E. E. Rogers, I. I. Shapiro, R. E. Snyder, D. H. Steinbrecher, and A. R. Whitney, "Accuracy of Relative Positioning by Interferometry with GPS: Double-Blind Test Results", Proceedings of the Third International Geodetic Symposium on Satellite Doppler Positioning, pp. 1173-1176, Feb. 8-12, 1982.

R. L. Greenspan, A. Y. Ng, J. M. Przyjemski and J. D. Veale, "Accuracy of Relative Positioning by Interferometry with Reconstructed Carrier GPS: Experimental Results", Proceedings of the Third International Geodetic Symposium on Satellite Doppler Positioning, pp. 1177-1195, Feb. 8-12, 1982.

T. P. Yunck, "An Introduction to Series-X", Jet Propulsion Laboratory, California Institute of Technology, NASA Contract NAS 7-1000, Nov. 1982.

Buennagel, MacDoran, Neilan, Spitzmesser and Young, "Satellite Emission Range Inferred Earth Survey (Series) Project: Final Report on Research and Development Phase, 1979 to 1983", JPL Publication 84-16, Mar. 1, 1984.

Crow, Bletzacker, Najarian, Purcell, Statman and Thomas, "Series-X Final Engineering Report", JPL D-1476, Aug. 1984.

MacDoran, Whitcomb and Miller, "Codeless GPS Positioning Offers Sub-Meter Accuracy", Sea Technology, Oct. 1984.

MacDoran, Miller, Buennagel and Whitcomb, "Codeless Systems for Positioning, with NAVSTAR-GPS", First International Symposium on Precise Positioning with the Global Positioning System, Positioning with the GPS-1985, Apr. 15-19, 1985.

James Collins, "GPS Suverying Techniques", ACSM Bulletin, Jun. 1985, pp. 17-20.

Ron L. Hatch, "The Synergism of GPS Code and Carrier Measurements", Proceedings of the Third International Geodetic Symposium on Satellite Doppler Positioning, pp. 1213-1231, Feb. 8-12, 1982.

"Proposal for a GPS Geodetic Receiver", The Johns Hopkins University Applied Physics Laboratory, Apr. 1980.

Phil Ward, "An Advanced Navstar GPS Geodetic Receiver", Proceedings of the Third International Geodetic Symposium on Satellite Doppler Positioning, pp. 1213-1231, Feb. 8-12, 1982.

Javad Ashjaee, "GPS Doppler Processing for Precise Positioning in Dynamic Applications", IEEE Oceans '85, Nov. 1985.

I. I. Shapiro, "Thoughts on Mighty MITES", Memo from I. I. Shapiro to C. C. Counselman, III, Department of Earth and Planetary Sciences, M.I.T., Dec. 29, 1980.

KALMAN FILTER PARAMETERS

| STATE VARIABLE | SIGMA | CORRELATION TIME T |
|---|---|---|
| LATITUDE (LAT.) | ZERO | -- |

[LATITUDE IS GIVEN EXACTLY BY THE INTEGRAL OF D(LAT)/DT.]

| | | |
|---|---|---|
| LONGITUDE (LON.) | ZERO | -- |

[LONGITUDE IS GIVEN EXACTLY BY THE INTEGRAL OF D(LON.)/DT.]

| | | |
|---|---|---|
| HEIGHT (HGT.) | 10 METERS | $10^4$ SECONDS |
| D (LAT.)/DT | 3 METERS/SEC | $10^4$ SECONDS |
| D (LON.)/DT | 3 METERS/SEC | $10^4$ SECONDS |
| DELTA LAT. | 5 METERS | 4 SECONDS |
| DELTA LON. | 5 METERS | 4 SECONDS |
| DELTA HGT. | 5 METERS | 4 SECONDS |
| CLOCK EPOCH | $7 \times 10^{-6}$ SEC | $10^{12}$ SECONDS |
| CLOCK RATE | $7 \times 10^{-9}$ SEC/SEC | $10^{12}$ SECONDS |

[THE EPOCH ERROR OF THE CLOCK IS GIVEN BY THE SUM OF THE "CLOCK EPOCH" PROCESS AND THE INTEGRAL OF THE "CLOCK RATE" PROCESS CHARACTERIZED ABOVE.]

| | | |
|---|---|---|
| PHI BIAS (EACH SAT.) | 20 CENTIMETERS | $10^8$ SECONDS |
| IONOSPHERE AT L1 | 10 METERS | $6 \times 10^4$ SECONDS |

FIG. 15C 4,894,662

METHOD AND SYSTEM FOR DETERMINING POSITION ON A MOVING PLATFORM, SUCH AS A SHIP, USING SIGNALS FROM GPS SATELLITES

This application is a continuation-in-part of U.S. patent application Ser. No. 353,331, now U.S. Pat. No. 4,667,203 filed on Mar. 1, 1982 in the name of Charles C. Counselman III.

BACKGROUND OF THE INVENTION

The present invention relates generally to an improved method and system for measuring position on earth from a moving platform, such as a ship, using signals from the NAVSTAR Global Positioning System satellites, commonly called GPS satellites. In particular, the present invention relates to civilian GPS receivers, that is, receivers which do not utilize knowledge of the potentially unavailable P code component of the GPS signals to determine position information.

Conventional civilian GPS receivers utilize simultaneous pseudorange, in other words, group delay observations of the C/A code components of the L1 band signals received from a plurality of GPS satellites to determine position information. A major source of position errors with such conventional GPS receivers is multipath. Multipath errors may be reduced by time averaging of observations made from a fixed position. Conventional time averaging, however, cannot be used to improve the accuracy of receivers on ships because the resultant position information would relate to the average position of the ship during the observation period, not the instantaneous position.

Position errors also result from ionospheric group delay effects in such pseudorange measurements. The magnitude of the delay encountered by a signal in the ionosphere varies with local conditions and cannot be predicted with sufficient accuracy to be eliminated from position measurements made by GPS receivers. The magnitudes of such errors are frequency dependent, however, and can be determined from simultaneous measurements of signals in different frequency bands. In particular, the GPS system was designed so that simultaneous measurement of signals in the L1 and L2 bands could be used to determine ionospheric delay. This technique is routinely used in military GPS receivers. Conventional civilian receivers measure the C/A code group delay in the L1 band, but cannot make L2 band C/A code group delay measurements because the C/A code modulation is not presently applied to signals transmitted in the L2 band. Simultaneous measurements therefore can not be conveniently made for both L band signals.

In general, conventional civilian receivers are limited in accuracy because of their reliance on group delay and because of their requirement for knowledge of a code modulating the signals in a GPS band in order to measure the group delay of the signals received in that band.

SUMMARY OF THE INVENTION

The present invention provides method and apparatus for accurately determining position information using signals transmitted by GPS satellites and received on moving platforms, such as ships, independent of knowledge of the P code component of the signals. A precise measurement of the ship's range to each satellite is made based upon the L1 center frequency carrier phase. A correction for ionospheric effects is determined by simultaneous observation of the group delays of the wide bandwidth P code modulations in both the L1 and L2 bands. These group delays are determined by measuring the phases of carrier waves implicit in the spread-spectrum signals received in both bands. These carriers are reconstructed from both the L1 and L2 band signals from each satellite without using knowledge of the P code. The unknown biases in the L1 center frequency carrier phase range measurements are determined from simultaneous, pseudorange measurements, with time averaging. The instantaneous position of the ship may then be determined from the ranges so determined, with both the bias and the ionospheric effects having been eliminated.

BRIEF DESCRIPTION OF THE DRAWINGS

In the drawings wherein like reference numerals represent like parts.

DETAILED DESCRIPTION OF PREFERRED EMBODIMENT

1. The GPS SYSTEM

Figure 1:
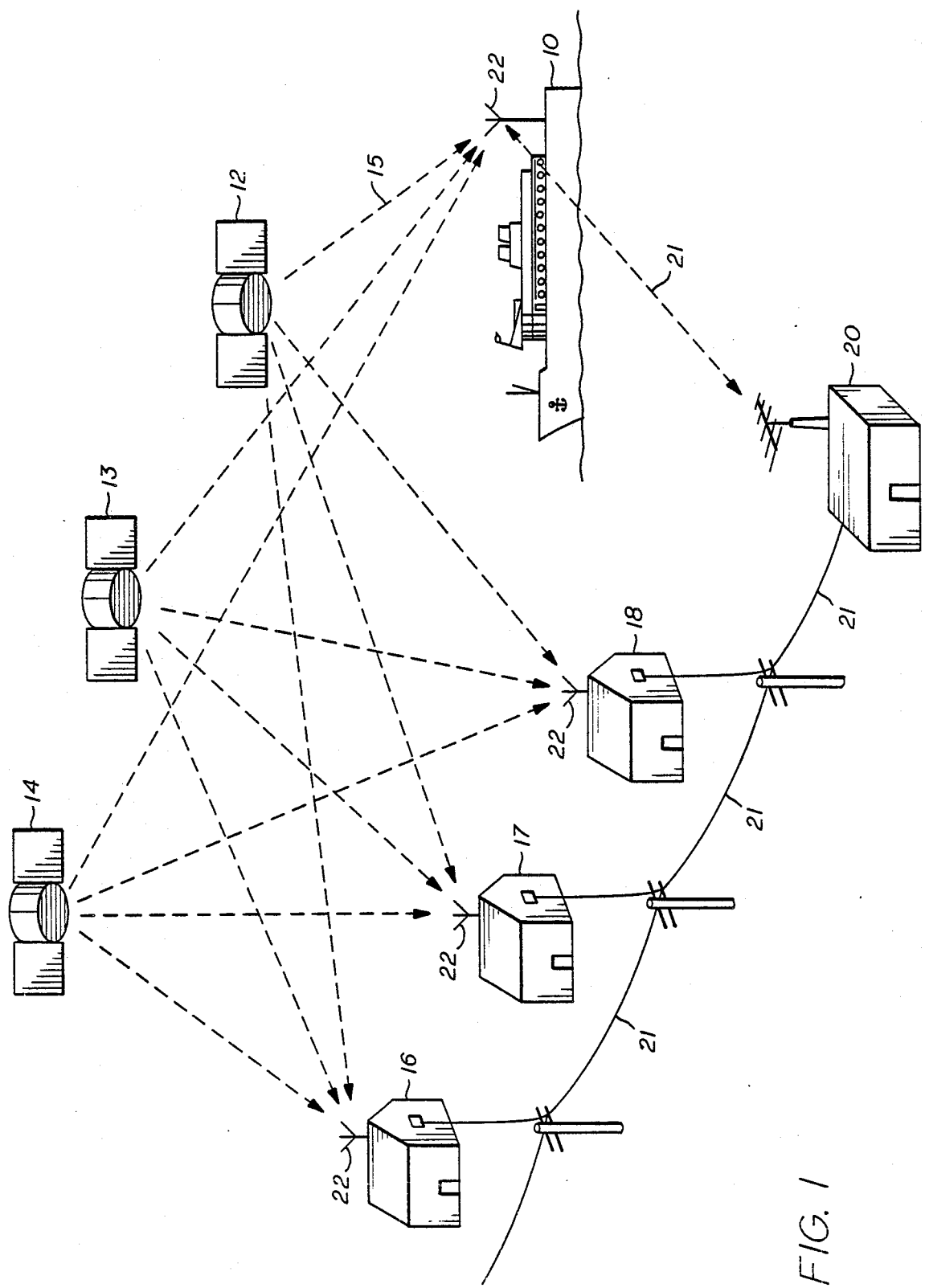
FIG. 1 illustrates a system for determining position information using signals received on a ship from GPS satellites in accordance with a preferred embodiment of the present invention.

The following description of the GPS system, and the structure of its signals, is presented for clarity and to facilitate explanation of the invention. More detailed discussions are available in the literature.

The signals of primary interest in determining position are transmitted by each GPS satellite in the same two bands of frequencies, one of which is known as the L1 band, and the other known as the L2 band.

Within each of these GPS bands, the transmitted signal is a broadband, noise-like, pseudorandom signal which contains no discrete spectral components. The signals are therefore said to be carrier-suppressed.

The term "carrier" is used herein in the same sense as it is used in the radio art, that is, a carrier is a periodic wave of essentially constant amplitude, frequency, and phase. Information may be conveyed, or "carried" by varying the amplitude, frequency and/or phase of such a signal. A carrier may be called a "subcarrier" if its frequency is less than the bandwidth of the signal. A signal may include several carriers. For example, a broadcast television signal is said to include a video carrier and an audio carrier.

Although no carriers are present in the GPS signals as transmitted, various carriers may be said to be implicit therein in that such carriers may be recovered or reconstructed from the GPS signals.

Within each GPS satellite, a frequency standard, such as an atomic cesium beam device, provides a fundamental frequency of 5.115 MegaHertz, called $f_o$, from which all other critical satellite frequencies are derived by integer multiplication or division. The frequency of the L1 band center frequency carrier of GPS signals is 308 times $f_o$ or 1575.42 MegaHertz and the frequency of the L2 band center frequency carrier is 240 times $f_o$ or 1227.60 MegaHertz. The $f_o$ fundamental frequency is a carrier frequency which may be reconstructed from the GPS signals.

GPS signals are bi-phase or quadriphase modulated. In particular, quadrature components of an L band center frequency carrier may be mixed, in the satellite, with aperiodic, pseudorandom, binary valued waves $m(t)$ and $n(t)$ which include several implicit periodic carrier waves. Polarity or phase reversals of $m(t)$ and $n(t)$ are constrained to occur only at times which are integer multiples of fixed time intervals $t_n$ and $t_m$ known as the chip widths of $m(t)$ and $n(t)$, respectively. If a polarity reversal occurred at every multiple of $t_m$, then $m(t)$ would be a periodic square wave with a frequency equal to $1/(2\ t_m)$. Because the polarity reversals actually occur pseudorandomly, just half the time on average, the $1/(2\ t_m)$—frequency carrier wave is suppressed, as is the band center frequency carrier.

The $m(t)$ wave is the product of several different waves whose time intervals between polarity reversals are integer multiples of $t_m$. Thus, additional carriers whose frequencies are corresponding submultiples of $1/(2\ t_m)$ are also implicit in the GPS signals. One of the waveforms used to produce $m(t)$ for the L1 band signals is the C/A code, which is a satellite specific, pseudorandom binary sequence of 1023 chips repeated periodically with a period of 1 millisecond, or a frequency of 1 kiloHertz. For the C/A code component of the L1 band signals, $1/(2\ t_m)$ is $f_o/10$ or 0.5115 MegaHertz. Another factor in $m(t)$ is the binary navigation data which has a 20 millisecond chip width, thus a 25 Hertz carrier frequency. These data include the current time indicated by the satellite's clock, a description of the satellite's current position in orbit, and a description of corrections to be applied to the time indicated by the satellite's clock.

The conventional method of determining the position of a receiver from signals received from GPS satellites uses observations of the times indicated by the satellite clocks as reflected in the transmitted binary navigation data. Typically, four different satellites are observed simultaneously. As discussed below with reference to FIG. 8E, at some moment when a clock in the receiver indicates a time $t_R$, the modulation of the signal being received from the $i^{th}$ satellite contains, in its navigation data, a satellite clock indication $t_i$, and satellite position coordinates $x_i$, $Y_i$, and $z_i$. For simplicity in this explanation it will be assumed that any indicated clock corrections have already been applied.

If the receiver's clock happened to be synchronized with that of the satellite, then the difference between $t_R$ and $t_i$ would just equal the signal travel time between satellite and receiver. The distance, or "range" from the satellite to the receiver could then be determined by multiplying this time difference by the speed of light. Since the clocks are not synchronized, the range deduced by this method is biased by an unknown amount equal to the departure from synchronization, delta $t_R$, multiplied by the speed of light. Such range measurements are known as pseudorange measurements.

Deltas $t_R$ may be determined simultaneously with the receiver's three position coordinates $x_R$, $y_R$ and $z_R$ by taking four simultaneous observations of pseudorange for four suitably positioned satellites and solving four simultaneous algebraic equations relating these four unknowns in accordance with known procedures.

Such conventional measurements of apparent propagation time delay, known as group delay, are limited by multipath and ionospheric effects. The term "multipath" refers to the simultaneous reception of signals which have reached the receiving antenna via different paths from the transmitting antenna. Harmful multipath effects most often result from the reflection of signals from objects near the receiver. Even weak multipath effects may severely limit the position accuracy available from pseudorange receivers.

Multipath effects are often in the nature of randomly fluctuating noise and may be reduced by simple time averaging of the observations as long as the position of the receiver is fixed. It is also known that multipath generally affects the phase delay of a signal much less than the group delay. Thus, the fluctuation of the range inferred from the center-frequency carrier phase is much smaller than that of the range inferred from the code modulation of a GPS signal.

The speed of propagation of a radio signal through the ionosphere is different from the speed of the same signal through other media such as the vacuum of space or the earth's troposphere. Ionospheric propagation effects limit the accuracy of conventional civilian position measurements made by pseudoranging because the ionosphere may delay the propagation of the signal modulation by an unknown amount. This amount may vary with time and location in an unknown way, but it depends on frequency in an accurately known manner. The group delay introduced by the ionosphere for a particular satellite-to-receiver propagation path at a particular time is known to be inversely proportional to the square of the center frequency of the band in which the signal is received.

2. THE PREFERRED EMBODIMENT

FIGURE 1

Referring now to FIG. 1, a system according to a preferred embodiment of the present invention is shown for determining the position of ship 10 from observation of the plurality of GPS satellites, illustrated by GPS 12, GPS 13 and GPS 14, currently visible to ship 10.

In accordance with the current design of the GPS system, a minimum of 18 GPS satellites will be deployed by about 1988. The manner of deployment will assure that at least 4 satellites will then always be visible from any point on earth. The present invention is best capable of determining position information if a minimum of 4 satellites are visible during an observation period. Satisfactory determinations may be made with only three satellites visible at the same time of one unknown, for example, the height of the phase center of the receiving antenna above sea level, does not have to be determined.

During operation of the system according to the present invention, measurements are made on ship 10 of at least four observables for GPS signals 15 transmitted by each of, for example, GPS 12, GPS 13 and GPS 14 and received on ship 10 via antenna 22. These four observables are:

(a) 308 $f_o$ implicit carrier phase observable PHI of the L1 center frequency carrier;

(b) C/A code group delay observable TAU of the C/A code component of the L1 band signals (known equivalently as the pseudorange);

(c) L1 band implicit $f_o$ carrier phase observable $PSI_{L1}$ of the fundamental frequency $f_o$ subcarrier implicit in the signals received in the L1 band; and (d) L2 band implicit $f_o$ carrier phase observable $PSI_{L2}$ of the fundamental frequency $f_o$ subcarrier implicit in the signals received in the L2 band.

These observables may be processed, in data processing equipment onboard ship 10 or in data processing center 20, either in real time or in post real time to determine position information. In addition, shore stations 16, 17 and 18 may also be utilized to receive GPS signals 15 through antennas 22 and determine position information, as well as other pertinent data, relating to the GPS satellites. This additional information and/or data could include ephemerides or orbital position information for each satellite as well as any necessary satellite clock error or synchronization information which must be determined.

At present, satellite ephemeris information and satellite clock synchronization information are provided in the navigation messages included in the signals transmitted by the GPS satellites, and may be decoded and used by civilian users of the GPS system. There is a possibility that such information may not always be satisfactorily available, either because of limitations in its accuracy or by intentional encryption of the information for military reasons. In any case, it is desirable, for high accuracy civilian applications, to be able to determine orbit information and clock error or synchronization information without reliance on the broadcast orbit information. This may be achieved with multiple ground stations operating in conjunction with the shipboard receivers.

Shore stations 16, 17 and 18 may contain data processing subsystems, or such subsystems may be contained in ship 10 or in separate data processing center 20 as shown in FIG. 1. Shore stations 16, 17 and 18 are able to communicate with each other, ship 10 and data processing center 20 via data link 21. Data processing center 20 may also conveniently include radio communications equipment for the transfer of data to and from ship 10 as part of data link 21, although such radio communication may not be necessary for determining position information for some purposes. Raw data may be captured on ship 10 and later be transferred by any convenient means, not shown, to data processing center 20 for post processing. However, when the position information is being determined for real-time navigational purposes for use by ship 10 in maintaining its own course, the above mentioned radio communication link may well be required for proper operation of the system.

Shore station 18 may also be conveniently utilized to permit relative position measurements, that is, measurements of the position of ship 10 with respect to shore station 18. Such measurements are also called "baseline" measurements, the relative position vector extending from shore station 18 to ship 10 being called the baseline vector. It is known that such relative measurements may be significantly more accurate than single point position measurements made by ship 10 alone, because certain measurement inaccuracies are common to both ends of the baseline and may cancel each other when the observations at ship 10 and shore station 18 are combined.

It is conventional to chose one end of a baseline to be a point of known location, such as a geodetic survey marker. In systems of the type described herein, it is most convenient to position the shore station which forms one end of the baseline at the known location. The position of the ship may then be calculated as the end point of the baseline vector originating at the known location. It is clear that a relatively short distance between ship 10 and shore station 18 is desirable. This may not always be practical. The only real limit to the length of the baseline, that is, the maximum permissible distance between ship 10 and the nearest shore station, is that the same GPS satellite must be visible to both ends of the baseline if simultaneous observations at both ends are to be differenced directly to cancel common errors.

The terminal portions of shore stations 16, 17 and 18 may be constructed and/or operated identically to the terminal on ship 10. It may be preferable, however, for shore stations 16, 17 and 18 to measure additional observables not required on ship 10, including observations of the phase of the center frequency carrier of the L2 band signals. Simultaneous observation of the phases of the center frequency carriers of both bands can yield a more accurate determination of the ionospheric delay and therefore of the satellite orbits and the position of ship 10. Terminal 23 of ship 10, which may also be used in shore stations 16, 17 and 18 as noted above, will be discussed in detail with reference to FIG. 2.

FIGURE 2

Figure 2:
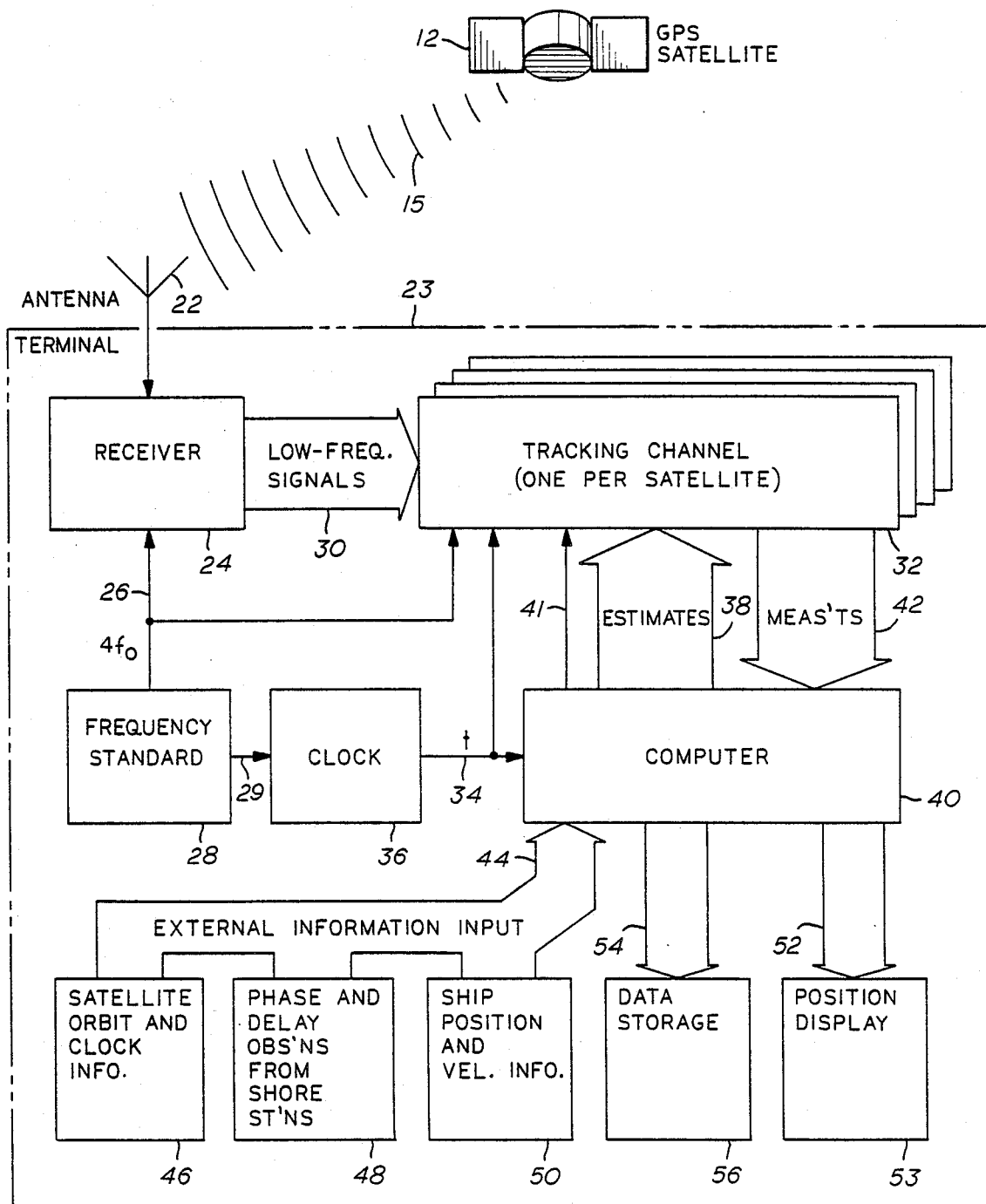
FIG. 2 illustrates a block diagram of a terminal for receiving GPS signals that may be used both onboard ships and in land installations in accordance with the system shown in FIG. 1.

Referring now to FIG. 2, terminal 23 is shown in block diagram form. As noted, identical terminals 23 may be used in both shore stations 16, 17 and 18 as well as on board ship 10 although it may be preferable to include additional equipment within terminals 23 in ship 10 or in shore stations 16, 17 and 18 such as codeless L2 center frequency carrier phase tracking channels for orbit data determination.

Terminal 23 may conveniently be positioned in a protected equipment room in ship 10 with other complex shipboard electronic equipment. It must however be connected to antenna 22 mounted above the deck of ship 10, preferably on a tall mast, not shown, above and as far away as possible from potentially interfering structures, such as metal deck plates and superstructures which might aggravate errors caused by multipath effects.

Antenna 22 receives GPS signals 15 from the plurality of the then visible GPS satellites, of which only GPS satellite 12 is shown in this FIG. 2. L band GPS signals 15 are fed from antenna 22 to receiver 24, within terminal 23, which also receives 4 $f_o$ constant frequency reference signal 26 generated by frequency standard 28. Frequency standard 28 may be a specially configured cesium atomic beam standard which provides a constant frequency output signal at exactly 20.46 MegaHertz which is four times the satellite's fundamental frequency, $f_o$. Alternately, it may be more convenient, and less expensive, to use a more readily available 5 MegaHertz cesium atomic beam standard, and a frequency synthesizer, not shown, to convert the 5 MegaHertz standard signal to the desired 4 $f_o$ constant frequency reference signal at 20.46 MegaHertz.

Receiver 24 is used to down convert GPS signals 15; that is, receiver 24 serves to provide output signals 30 which are relatively low in frequency in comparison to the L band microwave radio signals that are received by antenna 22 from GPS 12. Signals 30 are provided to a plurality of satellite tracking channels 32, only one of which is shown in FIG. 2 for clarity. An individual satellite tracking channel 32 is required for each satellite to be observed during any particular observation period. The satellite to be observed by each satellite tracking channel 32 is determined by satellite assignment 41 from real time computer 40. Terminal 23 may include 6 satellite tracking channels for redundancy although only 4 satellite channels are required for normal operation. Good operating practice suggests that more than the minimum number of satellites be tracked at any one time so that if one of the satellites is obscured or drops below the horizon or is otherwise unavailable or unusable during a portion of the observation period, the data collected will still be adequate.

Tracking channel 32 also continuously receives digital real time indication 34, t, generated by real time clock 36. Real time clock 36 is governed by frequency standard 28 which provides clock synchronization signal 29. Time t is obtained from clock 36 in a conventional manner by an initial real time adjustment or setting, and then by counting cycles of the oscillation of the signals from frequency standard 28.

The operation of all tracking channels 32, one for each of the GPS satellites, is the same. The operation of tracking channel 32 depicted in FIG. 2, which operates on GPS signals 15 from GPS satellite 12, will be explained below. The operation of tracking channels 32 for other GPS satellites may be understood therefrom. In addition to low frequency signals 30, 4 $f_o$ reference signal 26 and digital real time indication 34, tracking channel 32 receives estimates 38 which include estimates, or predictions, of received signal frequency and group delay for GPS satellite 12 from real time computer 40. Tracking channel 32 returns measurements 42 related to this satellite's signals to real time computer 40.

Real time computer 40 generates estimates 38 on the basis of external information input 44 it receives from external sources, as well as information contained in measurements 42. Such external information 44 may include data on the orbital position of satellite 12 as well as data concerning the corrections that need to be applied to the time information included in signals 15. Orbital and time correction information 46 shown in FIG. 2 could represent information transmitted over data link 21 from locations on land such as data processing center 20 as shown in FIG. 1. Information 46 could also be obtained by terminal 23 from the broadcast navigation message included in GPS signals 15 from satellite 12, by decoding the so called navigation message broadcast by GPS satellite 12, or it could be from some other means.

Real time computer 40 may also receive information from observations made by one or more of the shore stations 16, 17 and/or 18 of signals 15 from satellite 12. This information would conveniently include data representing the phases of carrier signals implicit in GPS signals 15 as received by that shore station. Additionally, such data may include pseudorange measurements related to satellite 12 determined by the observation and measurement of the group delay of the C/A code component of the L1 band signals in signals 15 received from satellite 12. This information is designated in FIG. 2 as phase and delay observations from shore stations 48. Real time computer 40 may also receive information related to the current position and/or velocity of ship 10 from ship position and velocity information 50. Such information may be provided by any of the conventionally available commercial equipment commonly used for determining such information such as conventional navigation and dead reckoning equipment.

Real time computer 40 utilizes measurements 42 and information input 44 from sources 46, 48 and 50 to compute an improved determination of the current or past position 52 of ship 10. Position determination 52 may be supplied to position information display or utilization device 53. Real time computer 40 may also provide raw measurement data 54 from satellite tracking channel 32 to data store 56. Raw data 54 from data store 56 may be processed at some later time, onboard ship 10 or on land at data processing center 20, to provide enhanced position information based on measurements or other data not suitably available on ship 10 during the observation of satellite 12, such as enhanced satellite orbit or clock information. Similarly, phase and delay observations from some other shore stations, not shown, may be available for post processing that were not available during the observation period. Even enhanced data concerning the position and/or velocity of ship 10 may be used in post processing to improve the accuracy of the position information.

Conventional GPS receivers do not make use of external information inputs such as those discussed above with respect to external information 44. Conventional GPS receivers obtain all such satellite orbit and satellite clock information directly from the navigation message broadcast by each satellite. It is particularly important that terminal 23 be capable of utilizing external inputs as described above in order to maintain operation and accuracy during those times that the Department of Defense chooses to degrade certain of the broadcast information from the GPS system in order to deny the high accuracy normally available to military users. Although the accuracy available to users of a system according to the instant invention will not acceptable for military operations, civilian users will be able to operate surveying and navigation procedure without interruption.

It has been announced that such denial of accuracy procedures may include the intentional broadcast of inaccurate information data related to the orbits of the GPS satellite and/or on the satellite clocks. Broadcasting inaccurate information on satellite clocks is commonly called dither or dithering.

The commonly expected form of dithering of satellite clock information would be to intentionally vary the rate of the clock in GPS satellite 12, or to permit the normal variations in clock rates to degrade accuracy, and then restriction access to the clock correction information. As noted above, each GPS satellite, in its navigational data broadcast, broadcasts data including both the time indicated by the satellite's clock as well as the detailed information concerning the corrections needed in order to accuracy utilize this broadcast indicated time. An easy to implement approach to dithering would therefore be to deny public access to such clock correction information by encrypting the clock correction data included in the broadcast satellites' clock correction message.

Other sources of external information 44 might include inertial navigation systems, compass, water velocity logs, Doppler sonar or information on the attitude of ship 10, that is, its orientation in space, roll, pitch and yaw. As ship 10 rolls and pitches, antenna 22, which is at the top of a mast, is waving around in space. The position that computer 40 determines is therefore going to be the position of this moving point at the top of the mast. This additional information may be necessary to determine the center of mass of ship 10.

FIGURE 3

Figure 3:
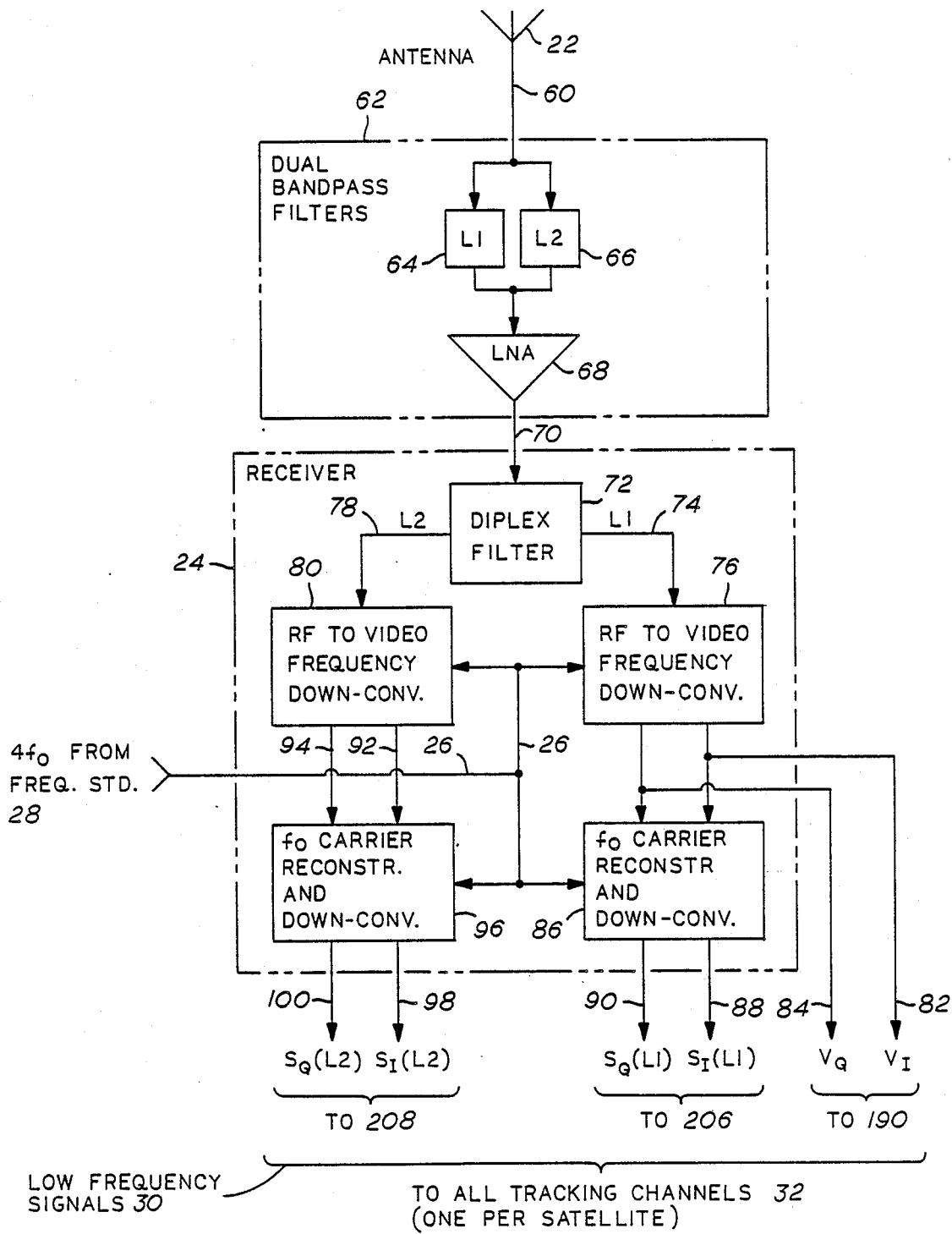
FIG. 3 is a more detailed block diagram of the receiver subsystem and related elements of the terminal shown in FIG. 2.

Referring now to FIG. 3, receiver 24 of terminal 23 is shown in greater detail together with antenna 22 and remote filter and preamplifier package 62 which is preferably located physically very near antenna 22. Remote filter and preamplifier package 62 serves to connect antenna 22 to receiver 24.

In particular, transmission line 60 carries the L1 and L2 band radio frequency signals received by antenna 22 to remote filter and preamplifier package 62. Preamp 62 is preferably positioned physically close to antenna 22 in order to minimize the transmission line losses in line 60 between antenna 22 and low noise amplifier 68 within preamp 62. It is convenient to position preamp 62 on the same mast or other superstructure on which antenna 22 is positioned.

In preamp 62, the L band signals in line 60 are coupled to the inputs of band pass filters 64 and 66. Filter 64 is a high quality, low loss band pass filter tuned to the approximate center of the L1 band at 1575.42 MegaHertz. The bandwidth of filter 64 may be of the order of 30 MegaHertz. Filter 66 is tuned to the center of the L2 band at 1227.60 MegaHertz with a similar bandwidth. Filters 64 and 66 serve to prevent strong signals originating outside the GPS frequency bands from reaching, and overloading or perhaps damaging, sensitive low noise amplifier 68. Band pass filters 64 and 66 are available commercially from a variety of vendors and should be selected for low attenuation in the L1 and L2 frequency bands and high-out-of band attenuation.

The outputs of filters 64 and 66 are combined at the input of low noise amplifier 68. The amplified L band signals available at the output of low noise amplifier 68 are fed, via transmission line 70, to receiver 24. Receiver 24 is conveniently positioned within ship 10 in a protected area, typically in the same environment used to protect other electronic equipment. Transmission line 70 may therefore be relatively long. Low noise amplifier 68 serves to amplify the L band signals fed into transmission line 70 to a level sufficient to compensate for the attenuation of line 70. Low noise amplifier 68 may conveniently be a commercially available gallium arsenide field effect transistor amplifier with a low noise figure of about 10 dB.

Receiver 24 receives the output of low noise amplifier 68 via transmission line 70 as one input and 4 $f_o$ constant frequency reference signal 26 from frequency standard 28, shown in FIG. 2, as a second input. Within receiver 24, transmission line 70 is connected to the input of diplex filter 72. Diplex filter 72 is a frequency selective signal splitter which splits the L band radio frequency signals received through transmission line 70 into L1 band radio frequency signals 74 and L2 band radio frequency signals 78.

L1 band radio frequency signals 74 are applied to radio frequency to video frequency down converter 76 in which they are mixed with quadrature components of a reference signal at the nominal center frequency of the L1 band, 1575.42 MegaHertz, which is exactly 308 times $f_o$. These quadrature components are derived from 4 $f_o$ reference signal 26. The operation of down converter 76 will be described in greater detail hereinbelow with reference to FIG. 4. In general, down converter 76 serves to convert L1 band radio frequency signals 74 from a center frequency of 308 $f_o$ or 1575.42 MegaHertz, to baseband, that is, to a center frequency of 0 Hertz. As described below in greater detail with respect to FIG. 4, video frequency down converter 76 generates in-phase video signal 82 $V_I$, and quadrature video signal 84 $V_Q$, which taken together form complex video signal V.

Quadrature video signals 82 and 84 are included in low frequency signals 30 and are used by each satellite tracking channel 32 in terminal 23 as well as by L1 band $f_o$ carrier reconstructor and down converter 86 in receiver 24.

L1 band $f_o$ carrier reconstructor and down converter 86 is described in greater detail herein below with reference to FIG. 5. Reconstructor 86 serves, in general, to reconstruct satellite fundamental frequency $f_o$ carriers implicit in L1 band radio frequency signals 74. Satellite fundamental frequency $f_o$ carriers from each GPS satellite are implicit in L1 band radio frequency signals 74 from diplex filter 72, and in quadrature video signals 82 and 84 because they were implicit in GPS signals 15 and none of the operations performed on signals 15 to this stage have altered this implicit relationship.

It is important to note that converter 76 and reconstructor 86 utilize reference frequencies which are derived by fixed multiplication of constant frequency 4 $f_o$ reference signal 26 from frequency standard 28 shown in FIG. 2 so that all such signals are in phase with each other.

L1 band $f_o$ carrier reconstructor and down converter 86 generates in-phase reconstructed L1 band $f_o$ carrier composite 88, $S_I(L1)$, and quadrature phase reconstructed L1 band $f_o$ carrier composite 90, $S_Q(L1)$, which taken together form complex L1 band reconstructed $f_o$ carrier composite S(L1). L1 band reconstructed carrier composite phasor 89, shown below in FIG. 8D, is the instantaneous value of complex L1 band reconstructed $f_o$ carrier composite S resulting from the superposition of the phasors representing the reconstructed L1 band $f_o$ carriers from all GPS satellites in view. As seen in FIG. 8D, L1 band GPS reconstructed $f_o$ carrier phasor $89_{12}$ represents the particular L1 band reconstructed $f_o$ carrier from GPS satellite 12.

In-phase and quadrature reconstructed L1 band $f_o$ carrier composite signals 88 and 90 are very low frequency signals which are filtered within reconstructor 86 to a bandwidth of approximately 1 kiloHertz.

L2 band radio frequency signals 78 are applied to down converter 80 in which they are mixed with quadrature components of a reference signal at the nominal center frequency of the L2 band, 1227.60 MegaHertz, which is exactly 240 times $f_o$. These quadrature components are also derived from 4 $f_o$ reference signal 26. The operation of down converter 80 is substantially identical to the operation of down converter 76 and may be understood in detail with reference to the description of down converter 76 in FIG. 4. In general, down converter 80 serves to convert L2 band radio frequency signals 78 from a center frequency of 240 $f_o$, or 1227.60 MegaHertz, to baseband. As described in greater detail with respect to FIG. 4, L2 band video frequency down converter 80 generates in-phase L2 band video signal 92 and quadrature phase L2 band video signal 94.

In-phase and quadrature L2 band video signals 92 and 94 are used by L2 band $f_o$ carrier reconstructor and down converter 96. Reconstructor 96 operates in an identical manner to reconstructor 86 and may be understood from the description thereof with reference to FIG. 5. Reconstructor 96 serves, in general, to reconstruct the satellite fundamental frequency $f_o$ carriers implicit in L2 band radio frequency signals 78. Satellite fundamental frequency $f_o$ carriers from each GPS satellite are implicit in L2 band radio frequency signals 78 from diplex filter 72, and in phase L2 band video signal 92 and quadrature phase L2 band video signal 94, because they were implicit in GPS signals 15 and none of the operations performed on GPS signals 15 to this stage have altered this implicit relationship.

L2 band $f_o$ carrier reconstructor and down converter 96 generates in-phase reconstructed L2 band $f_o$ carrier composite 98, $S_I(L2)$, and quadrature phase reconstructed L2 band $f_o$ carrier composite 100, $S_Q(L2)$, which taken together form complex L2 band reconstructed $f_o$ carrier composite S (L2). In-phase and quadrature reconstructed L2 band $f_o$ carrier composite signals 98 and 100 are very low frequency signals which are filtered within reconstructor 96 to a bandwidth of approximately 1 kiloHertz.

FIGURE 4

Figure 4:
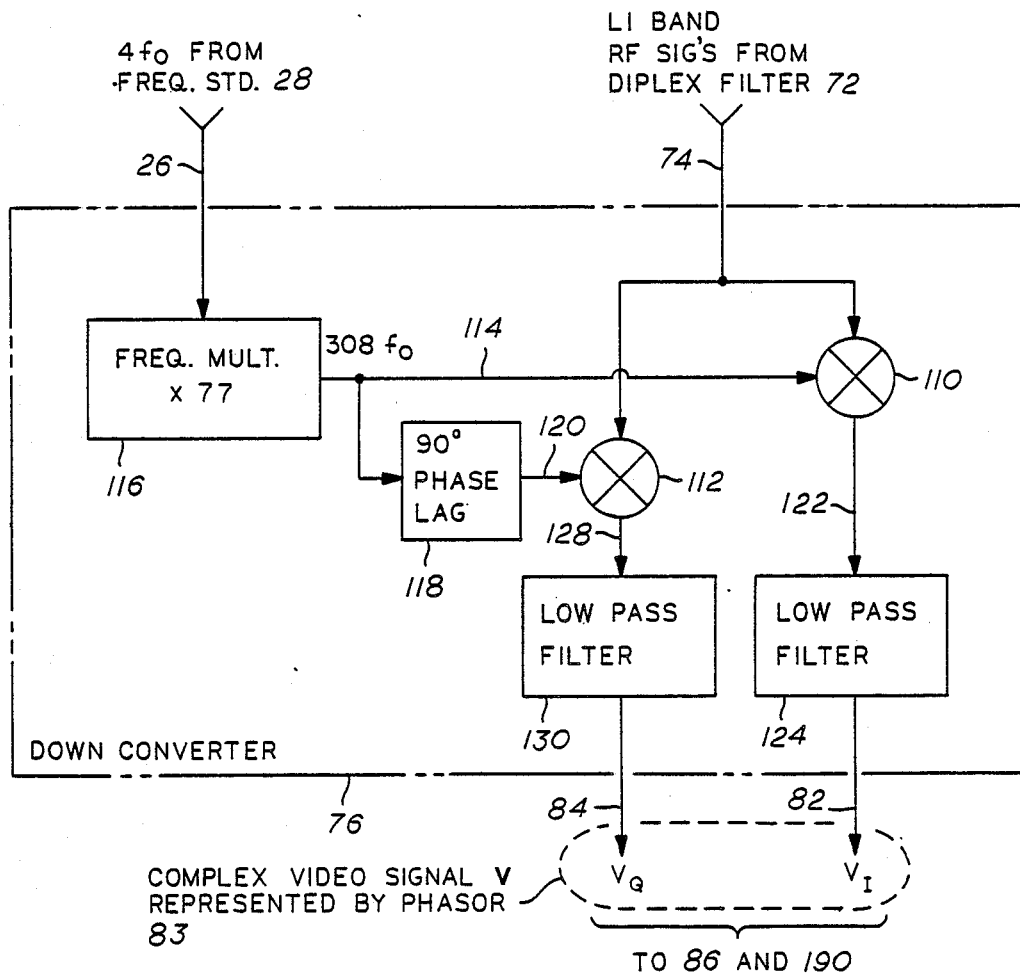
FIG. 4 is a detailed signal flow diagram of the radio frequency to video frequency down converter subsystem of the receiver shown in FIG. 3.

Referring now to FIG. 4, down converter 76 of receiver 24 shown in FIG. 3 is shown in greater detail. As noted above, converter 76 serves to down shift L1 band signals 74 in the same manner as converter 80 serves to down shift L2 band signals 78.

L1 band radio frequency input signals 74 from diplex filter 72 are applied to a pair of identical doubly balanced mixers 110 and 112. Local oscillator input 114 is applied to mixer 110 from frequency multiplier 116 which multiplies 4 $f_o$ reference frequency signal 26 from standard 28 by a factor of 77. This operation generates local oscillator input 114 at a frequency of 1575.42 MegaHertz. The equivalent frequency multiplier in L2 band video frequency down converter 80 utilizes a multiplication factor of 60 to achieve a frequency of 1227.60 MegaHertz.

Mixer output 122 includes signal components with frequencies equal to both the sum and the difference of the frequencies of signal inputs 114 and 74.

The signal components of mixer output 122 at the sum of the frequencies of the inputs to mixer 110 are at approximately twice the L1 center frequency. These signals are commonly called sum frequencies and are rejected by video low pass filter 124.

The signal components of mixer output 122 equal in frequency to the difference between the frequencies of the inputs to mixer 110 are commonly called the beat frequencies or difference frequencies. The beat frequency components of mixer output 122 have frequencies equal to the differences in frequency of L1 band signals 74 and L1 center frequency carrier reference signal 114.

GPS signals 15 do not contain useful amounts of signal power farther than about 9 MegaHertz from the center frequency of the band. L1 band signals 74 may therefore be considered to be signals with a bandwidth less than about 18 MegaHertz centered on approximately the L1 center frequency carrier. The beat frequency component of mixer output 122 is therefore the under 18 MegaHertz wide component of L1 band signal 74 down converted in frequency to baseband, that is, to a low frequency range from near zero to less than about 9 MegaHertz. This beat frequency component of mixer output 122 is not rejected by video low pass filter 124 and is included in in-phase video signal 82.

Video low pass filter 124 should be approximately matched to the baseband power spectral density of the n(t), or P-code related, component of the GPS signals. This spectral density, N(f), is given approximately by $$N(f) = \text{sinc}^2(f/2\ f_o)$$

where f represents video frequency, $f_o$ is the GPS fundamental frequency, and $\text{sinc}^2(f/2\ f_o)$ is the square of the "sinc" function, defined by $$\text{sinc }(x) = \sin(PI^*x)/(PI^*x),$$

where x, equal to $f/2\ f_o$, is the argument of the function, and PI equals 3.1416... N(f) has a one-sided half-power bandwidth of about 4.5 MegaHertz, and has a null at f equal to 2 $f_o$. Video low pass filter 124 may be configured in accordance with a conventional lumped-element design, preferably with 3 to 5 poles. It is important for video low pass filter 124 to have linear phase, and for filter 130 to be accurately matched in phase to video low pass filter 124, in order to optimize the performance of L1 band $f_o$ carrier reconstruction and down converter 86 which receives video signals 82 and 84. It is also desirable for video low pass filters 124 and 130 to have high attenuation at video frequency f equal to 2 $f_o$, so that video signals 82 and 84 are devoid of spurious components which could interfere with reconstructed-carrier detection and phase measurement in L1 band $f_o$ carrier phase detector 206.

In addition to rejecting the double frequency mixing products in mixer output 122, video low pass filter 124 generally serves to limit the bandwidth of in-phase video signal 82 to the bandwidth of the useful signal. This limits the amount of noise and potential interference which is passed to following stages of receiver 24 and satellite tracking channel 32.

Local oscillator input 114 is applied to 90° phase lag circuit 118 to produce delayed local oscillator input 120 which therefore lags local oscillator input 114 by exactly one-quarter cycle. Delayed local oscillator input 120 is applied as one input to mixer 112 in the same manner that undelayed local oscillator input 114 is applied to mixer 110. Mixer output 128 from mixer 112 is therefore substantially identical to mixer output 122 from mixer 110 except that the beat frequency components are shifted in phase by one-quarter cycle.

FIGURE 5

Figure 5:
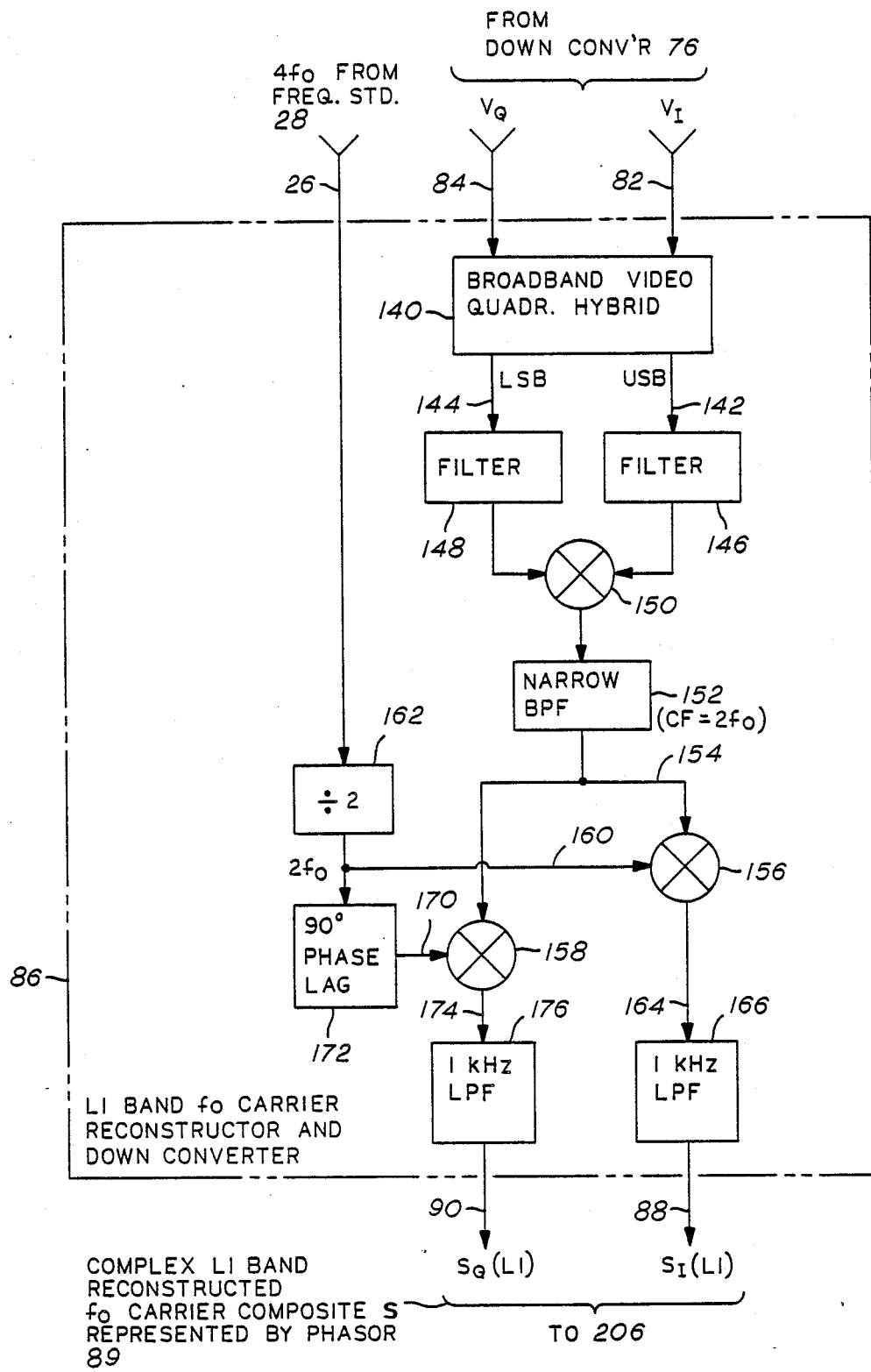
FIG. 5 is a detailed signal flow diagram of one of the $f_o$ carrier reconstruction and down conversion subsystems of the receiver shown in FIG. 3.

Referring to FIG. 5, reconstructor 86 of receiver 24 shown in FIG. 3 is disclosed in greater detail. As noted above with respect to FIG. 3, reconstructors 86 and 96 are identical in construction and operation, except that the inputs supplied to them are different. The construction and operation of reconstructor 96 may therefore be understood from the following explanation of reconstructor 86.

Downconverted, in-phase video signal 82 and downconverted, quadrature video signal 84 are generated by L1 band radio frequency to video frequency down converter 76 shown in FIG. 3. As noted above, video signals 82 and 84 are identical except for a relative phase shift of exactly 90°. The sense of this phase shift, i.e. whether there is a leading phase shift or a lagging phase shift in $V_Q$ relative to $V_I$, depends on whether the L1 band input frequency was above or below the frequency of local reference signal 114, shown in FIG. 4. Signal 114, as previously noted with respect to FIG. 4, is nominally equal in frequency to 308 $f_o$, the center frequency carrier of the L1 band signals as transmitted.

It is therefore possible to separate the upper sideband components of L1 band signals 74, (the components of signal 74 above the center carrier frequency of 1575.42 MegaHertz), from the lower sideband components thereof (the components of signal 74 that were lower in frequency than the center carrier frequency), by delaying the phase of video signal 84 an additional 90° with respect to video signal 82 and then adding and subtracting the results to form upper and lower sideband signals. Broad band video quadrature hybrid 140, to which inphase and quadrature video signals 82 and 84 are applied as inputs, performs this additional phase shift and the addition and subtraction operations to form upper sideband signal 142 and lower sideband signal 144.

Broad band video quadrature hybrid circuit 140 may conveniently be configured as described in detail in an article in the Proceedings of the IEEE, vol. 59 (1971), pg. 1617-1618, by Alan E. E. Rogers.

Upper sideband signal 142 at the output of broad band video quadrature hybrid 140 is equal to the arithmetic sum of in phase and quadrature video inputs 82 and 84, both inputs having been delayed in phase by amounts that are dependent on frequency, but with the phase lag of quadrature video input signal 84 greater than that of in-phase video input signal 82 by a constant 90°, independent of frequency. Lower sideband signal 144 at the output of broad band video quadrature hybrid 140 is equal to the arithmetic difference of the same two differentially phase-shifted quadrature video inputs 82 and 84.

Returning now to the operation of reconstructor 86, upper sideband signal 142 at the output of broad band video quadrature hybrid 140 is filtered by filter 146. Lower side band signal 144 is filtered by filter 148, identical to filter 146.

The outputs of filters 146 and 148 are applied as inputs to doubly balanced mixer 150. The output of mixer 150 includes mixing product signals at both the sum and difference frequencies of upper and lower sideband input signals 142 and 144. The output of mixer 150 is filtered by narrow bandpass filter 152. The center frequency of narrow bandpass filter 152 is 2 $f_o$, that is, 10.23 MegaHertz. Thus, narrow bandpass filter 152 selects the sum-frequency portion of the output of 150.

Video input signals 82 and 84, as well as upper and lower sideband signals 142 and 144, include a composite of all spread spectrum signals received from all visible GPS satellites in the L1 frequency band. The components representing individual satellites in these composite signals are spread spectrum pseudorandom signals whose spectra are noise like in character and do not contain any discrete frequency or continuous wave components. However, after upper sideband signal 142 is mixed with lower sideband signal 144 in mixer 150, continuous wave reconstructed carriers, having discrete frequencies and phases, are present in second composite signal 154 at the output of bandpass filter 152.

Filters 146 and 148 reject signals which may interfere with the $f_o$ carrier reconstruction and phase measurement operations performed in subsequent portions of L1 band $f_o$ carrier reconstruction and down converter 86 and L1 band $f_o$ carrier phase detector 206. In particular, filters 146 and 148 are provided with narrow band rejecting, or "notch", characteristics in order to reject narrow bandwidth spurious signals which may be present in upper and lower sideband signals 142. If not rejected by filters 146 and 148, such supurious signals could combine in mixer 150 to produce interfering signals with frequencies which could not be rejected by narrow bandpass filter 152. It may be particularly useful to provide each of filters 146 and 148 with a rejecting notch centered at a frequency of $f_o$, because a continuous wave component of upper sideband signal 142 having a frequency of $f_o$ could mix with a similar component of lower sideband signal 144 to produce an interfering signal of frequency equal to 2 $f_o$ in second composite signal 154.

It may also be desirable to provide filters 146 and 148 with high-pass characteristics in order to reject components of upper and lower sideband signals 142 and 144 with frequencies below about 1 MegaHertz. Included in such rejected components would be most of the m(t), or C/A-code related, power of the GPS signals. In general, it is desirable for filters 146 and 148 to reject noise and other signals while passing the desired n(t), or P-code related, components of the GPS signals.

Regardless of the specific band-rejecting characteristics which may be chosen for filters 146 and 148, it is important for these filters to be designed to introduce the smallest possible phase shifts throughout most of the video frequency band of interest, which extends from approximately 1 MegaHertz to 9 MegaHertz.

Second composite signal 154 is a composite of reconstructed carriers, each representing the fundamental frequency fsubcarrier from one GPS satellite. Each such reconstructed carrier in second composite signal 154 has a frequency near 2 $f_o$, the second harmonic of the fundamental frequency subcarrier, or approximately 10.23 MegaHertz. The frequencies of the reconstructed carriers from different satellites, however, are generally not exactly the same. The frequency of the reconstructed carrier from any GPS satellite will be observed in second composite signal 154 to differ from 2 $f_o$ primarily as a result of Doppler shift due to the relative motion of that satellite and receiver 24.

The maximum Doppler shift, which is observed when a satellite is rising or setting, is of the order of plus or minus 30 Hertz, respectively. Therefore, narrow bandpass filter 152 should have a bandwidth of at least 60 Hertz, in order to pass the reconstructed carrier signals from all satellites. It is undesirable for the bandwidth of filter 152 to be too great, because noise and interference far from the desired reconstructed subcarrier frequencies should be rejected. However, it is also undesirable to have the bandwidth of narrow bandpass filter 152 be too narrow because narrow bandwidth in a bandpass filter is usually accompanied by phase shift which varies sharply with frequency within the pass band. It is therefore preferable to use a bandwidth of several kiloHertz in narrow bandpass filter 152 in order to preserve the phase linearity of receiver 24.

Second composite signal 154 at the output of narrow bandpass filter 152 is supplied to a pair of identical, doubly balanced mixers 156 and 158. Local oscillator reference input 160, applied to doubly balanced mixer 156, has a constant frequency of 2 $f_o$ which is derived in frequency divider 162 from 4 $f_o$ reference frequency signal 26 supplied by frequency standard 28, as shown in FIG. 2.

Output 164 of doubly balanced mixer 156 contains mixing products at both the sum and difference frequencies of its inputs, the reconstructed carriers in second composite signal 154 and 2 $f_o$ local oscillator reference input 160. The sum frequencies are near 4 $f_o$. The desired difference frequencies are generally less than 30 Hertz. Output 164 is applied as an input to low pass filter 166, which has a bandwidth of about 1 kiloHertz. Low pass filter 166 serves to reject the sum frequencies and pass the difference frequencies to yield in-phase reconstructed carrier composite signals 88, labelled for convenience as $S_I$(L1).

Local oscillator reference input 160 is also applied to 90° phase lag circuit 172 to obtain delayed local oscillator signal 170 which lags local oscillator signal 160 by 90°. Delayed local oscillator signal 170 is applied as an input to doubly balanced mixer 158. Output 174 of doubly balanced mixer 158 contains mixing products at both the sum and difference frequencies of its inputs, the reconstructed carriers in second composite signal 154 and delayed local oscillator signal 170. The sum frequencies are near 4 $f_o$. The difference frequencies are generally less than 30 Hertz. Output 174 is applied as an input to low pass filter 176 which has a bandwidth of about 1 kiloHertz. Low pass filter 176 serves to reject the sum frequencies and pass the difference frequencies to yield quadrature phase reconstructed L1 band $f_o$ carrier composite signal 90 labelled for convenience as $S_Q$(L1).

As noted above with regard to FIG. 3, $f_o$ carrier reconstructor and down conversion circuit 96 operates in the same manner as $f_o$ carrier reconstruction and down conversion circuit 86, just described above. Reconstructor 96 serves to produce in-phase reconstructed carrier signals 98, labelled $S_I$(L2) and quadrature phase reconstructed carrier composite signals 100, labelled $S_Q$(L2).

Thus, with reference again to FIG. 3, $f_o$ carriers implicit in the signals received in each of the L1 and L2 bands are reconstructed and converted downward in frequency from the neighborhood of 10.23 MegaHertz to the neighborhood of zero. The purpose of the frequency down conversion is to enable the subsequent signal processing circuits to be operated at a lower speed.

FIGURE 6

Figure 6:
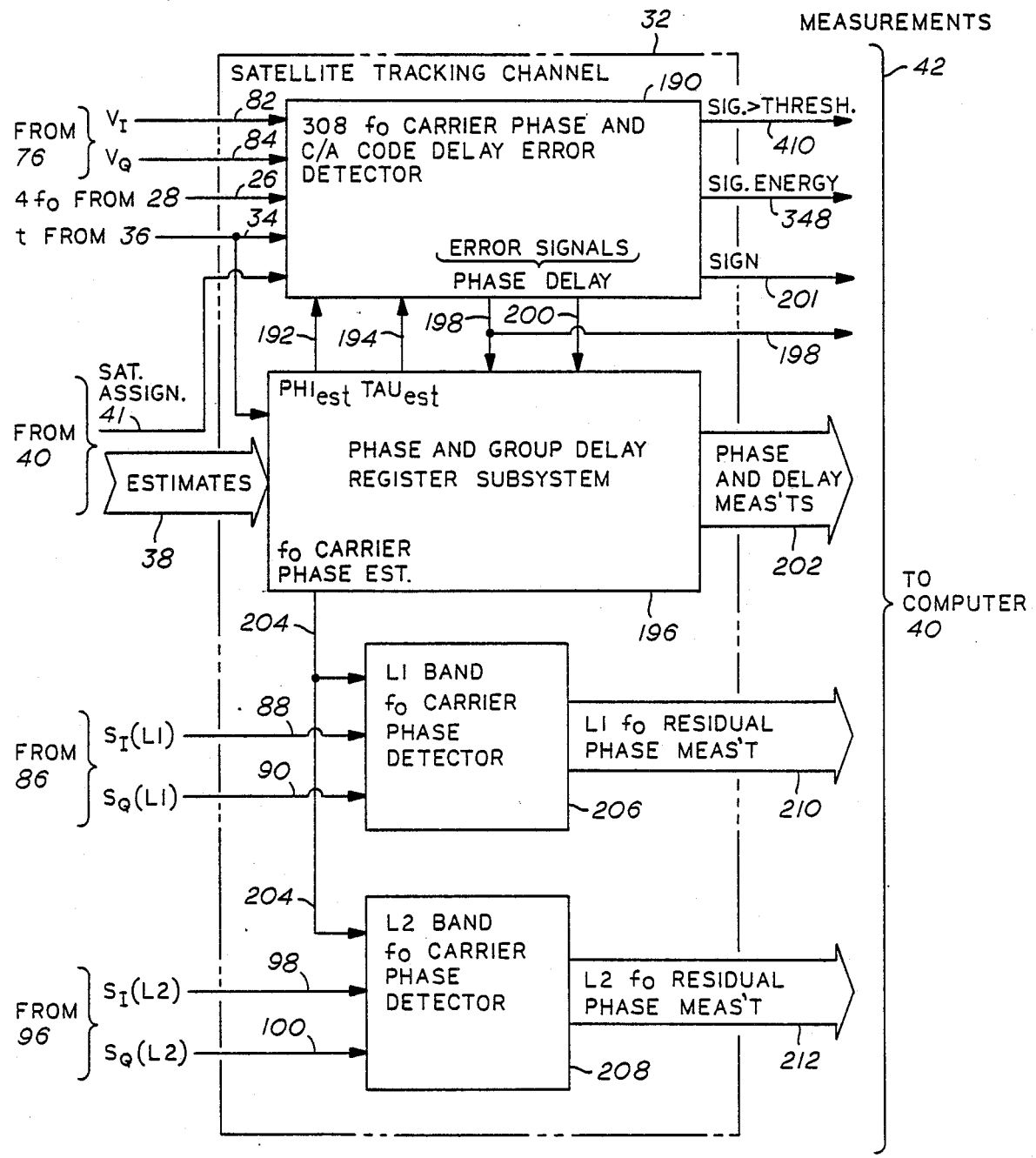
FIG. 6 is a block diagram of one of the satellite tracking channels illustrated in the terminal shown in FIG. 2.

Referring now to FIG. 6, satellite tracking channel 32, shown in FIG. 2, is disclosed in greater detail. As noted with reference to FIG. 2, one such tracking channel 32 is required per satellite tracked. Receiver 24 therefore includes, typically, 6 such tracking channels 32. All such tracking channels 32 are identical and operate in the same manner. The operation of only one such tracking channel 32 will therefore be discussed in detail with respect to this FIG. 6. For ease of discussion, it will be assumed that tracking channel 32 shown in this FIG. 6 has been assigned to GPS satellite 12 by satellite assignment 41 from real time computer 40.

All tracking channels 32 receive the same set of low frequency signals 30 from receiver 24 as shown in FIG. 2. Low frequency signals 30 include in-phase and quadrature video signals 82 and 84 from L1 radio frequency to video frequency down converter 76 as well as L1 band in-phase and quadrature reconstructed carrier composite signals 88 and 90 from reconstructor 86 and L2 band in-phase and quadrature reconstructed carrier composite signals 98 and 100 from reconstructor 96, all as shown in FIG. 3.

All tracking channels 32 also receive 4 $f_o$ reference frequency signal 26 from frequency standard 28 in FIG. 2 and continuously updated digital real time indication 34 from real time clock 36, as shown in FIG. 2. In addition, each tracking channel 32 receives estimates 38, calculated by real time computer 40, for the frequency and C/A code delay of GPS signals 15 as received at antenna 22 from the GPS satellite to be tracked by that channel.

Estimates 38 include a continuously updated estimate of the frequency of the 308 $f_o$ L1 band center frequency carrier as received from GPS satellite 12. The received frequency of any component of GPS signals 15 differs from the frequency of the corresponding component of the signals transmitted by GPS satellite 12 because of the Doppler shift resulting from the relative motion of antenna 22 and GPS satellite 12.

In addition, the frequency of the L1 band center frequency carrier implicit in the signals transmitted by GPS satellite 12 may differ from exactly 1575.42 MegaHertz, by virtue of any variations, either accidental or deliberate, of the satellite fundamental frequency $f_o$ used in GPS satellite 12. The same is true for other components of GPS 15.

Figure 13A:
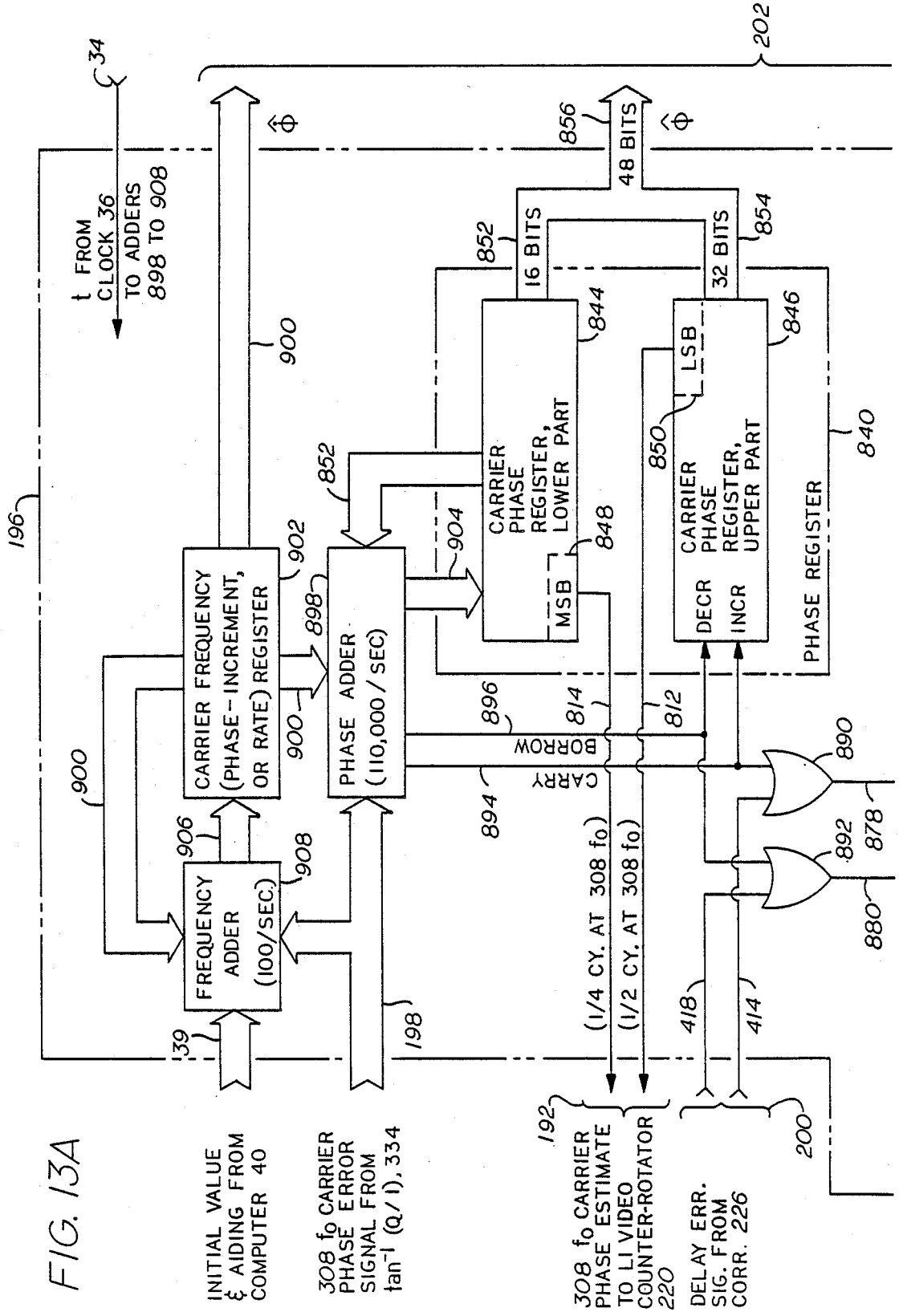
FIG. 13, formed by the combination of FIG. 13A and FIG. 13B, is a block diagram of the register subsystem of the satellite tracking channel shown in FIG. 6.
Figure 13B:
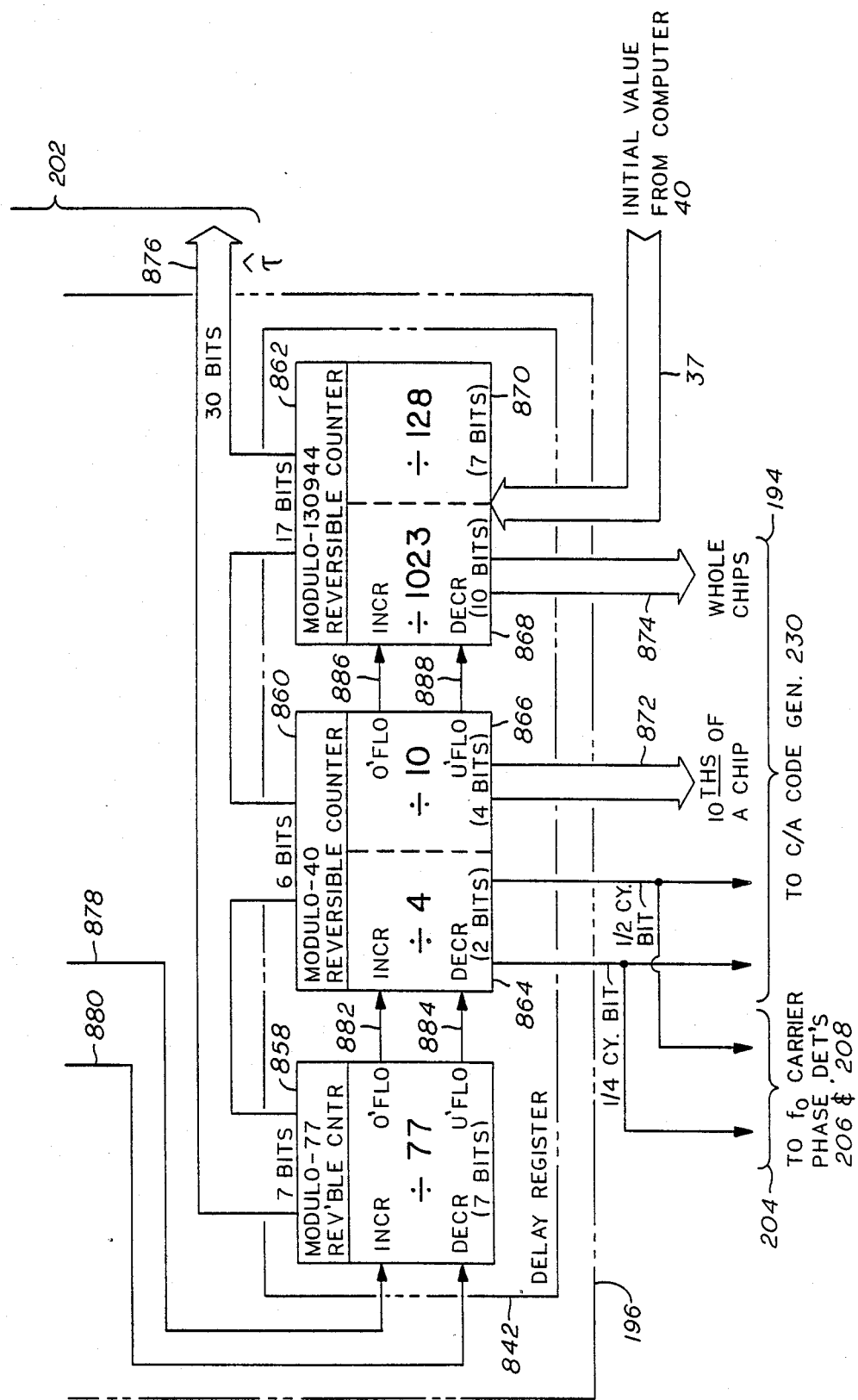

In addition to the 308 $f_o$ L1 band center frequency carrier frequency estimate, estimates 38 includes group delay initial value 37, as shown in FIG. 13.

In-phase and quadrature video signals 82 and 84, 4 $f_o$ reference frequency signal 26 and digital real time indication 34 are applied as inputs to 308 $f_o$ carrier phase and C/A code delay error detector 190 which also receives 308 $f_o$ carrier phase estimate $PHI_{est}$ 192 and C/A code group delay estimate $TAU_{est}$ 194 as inputs from phase and group delay register subsystem 196. 308 $f_o$ carrier phase estimate $PHI_{est}$ 192 is a fractional cycle part of 308 $f_o$ carrier phase estimate $PHI_{est}$ 856, as described below with reference to FIG. 13. C/A code group delay estimate $TAU_{est}$ 194 is a fractional period part of C/A code group delay estimate $TAU_{est}$ 876, as also described below with reference to FIG. 13.

308 $f_o$ carrier phase and C/A code delay error detector 190 serves to generate phase error signal 198 and group delay error signal 200 as well as above threshold indication 410, on-time signal energy indication 348 and sign bit 201, as discussed below with reference to FIG. 7 and FIG. 10.

308 $f_o$ implicit carrier phase observable PHI is implicit in GPS signals 15 as received from GPS satellite 12, and therefore is implicit in complex video signal V, that is, in phase and quadrature video signals 82 and 84. Similarly, the actual group delay encountered between transmission by GPS satellite 12 and reception by antenna 22 by the C/A component implicit in the L1 band portion of GPS signals 15, C/A code group delay observable TAU, is also implicit in complex video signal V.

Phase error signal 198 is an estimate of the difference between 308 $f_o$ implicit carrier phase observable PHI and 308 $f_o$ carrier phase estimate $PHI_{est}$ 192. Group delay error signal 200 represents an estimate of the difference between C/A code group delay observable TAU and C/A code group delay estimate $TAU_{est}$ 194.

308 $f_o$ implicit carrier phase observable PHI and C/A code group delay observable TAU are tracked by phase and group delay register subsystem 196 as a result of interaction with 308 $f_o$ carrier phase and C/A code delay error detector 190. Phase and group delay register subsystem 196 and 308 $f_o$ carrier phase and C/A code delay error detector 190 cooperate to form feedback loops to minimize phase error signal 198 and group delay error signal 200. The cooperation of 308 $f_o$ carrier phase and C/A code delay error detector 190 and phase and group delay register subsystem 196 serves therefore to form interrelated and interconnected phase and delay locked loops which track the phase and group delay respectively of signals implicit in GPS signals 15.

As will be described below in greater detail with respect to FIG. 7, $f_o$ carrier phase and C/A code delay register subsystem 196 also generates $f_o$ carrier phase estimate 204, which is an estimate of the phase of the satellite fundamental frequency $f_o$ carrier implicit in the 1575.42 MegaHertz L1 band signals received from GPS satellite 12. $f_o$ carrier phase estimate 204 is provided to both the L1 band $f_o$ carrier phase detector 206 and the L2 band $f_o$ carrier phase detector 208.

L1 $f_o$ carrier phase detector 206 receives in-phase reconstructed L1 band $f_o$ carrier composite signal 88 and quadrature phase reconstructed L1 band $f_o$ carrier composite signal 90 as inputs from reconstructor 86. L2 $f_o$ carrier phase detector 208 receives in-phase and quadrature reconstructed carrier composite signals 98 and 100 from reconstructor 96. L1 band $f_o$ carrier phase estimate 204 is provided to L1 $f_o$ carrier phase detector 206 which generates L1 $f_o$ residual phase measurement 210 equal to the difference between $f_o$ carrier phase estimate 204 and L1 band implicit $f_o$ carrier phase observable $PSI_{L1}$ implicit in the L1 band portion of GPS signals 15 as received by antenna 22. $f_o$ carrier phase estimate 204 also is provided to L2 $f_o$ carrier phase detector 28 which generates L2 $f_o$ residual phase measurement 212 equal to the difference between $f_o$ carrier phase estimate 204 and L2 band implicit $f_o$ carrier phase observable $PSI_{L2}$ implicit in the L2 band portion of GPS signals 15 as received. L1 $f_o$ residual phase measurement 210 and L2 $f_o$ residual phase measurement 212 are included in measurements 42 provided to real time computer 40.

FIGURE 7

Figure 7:
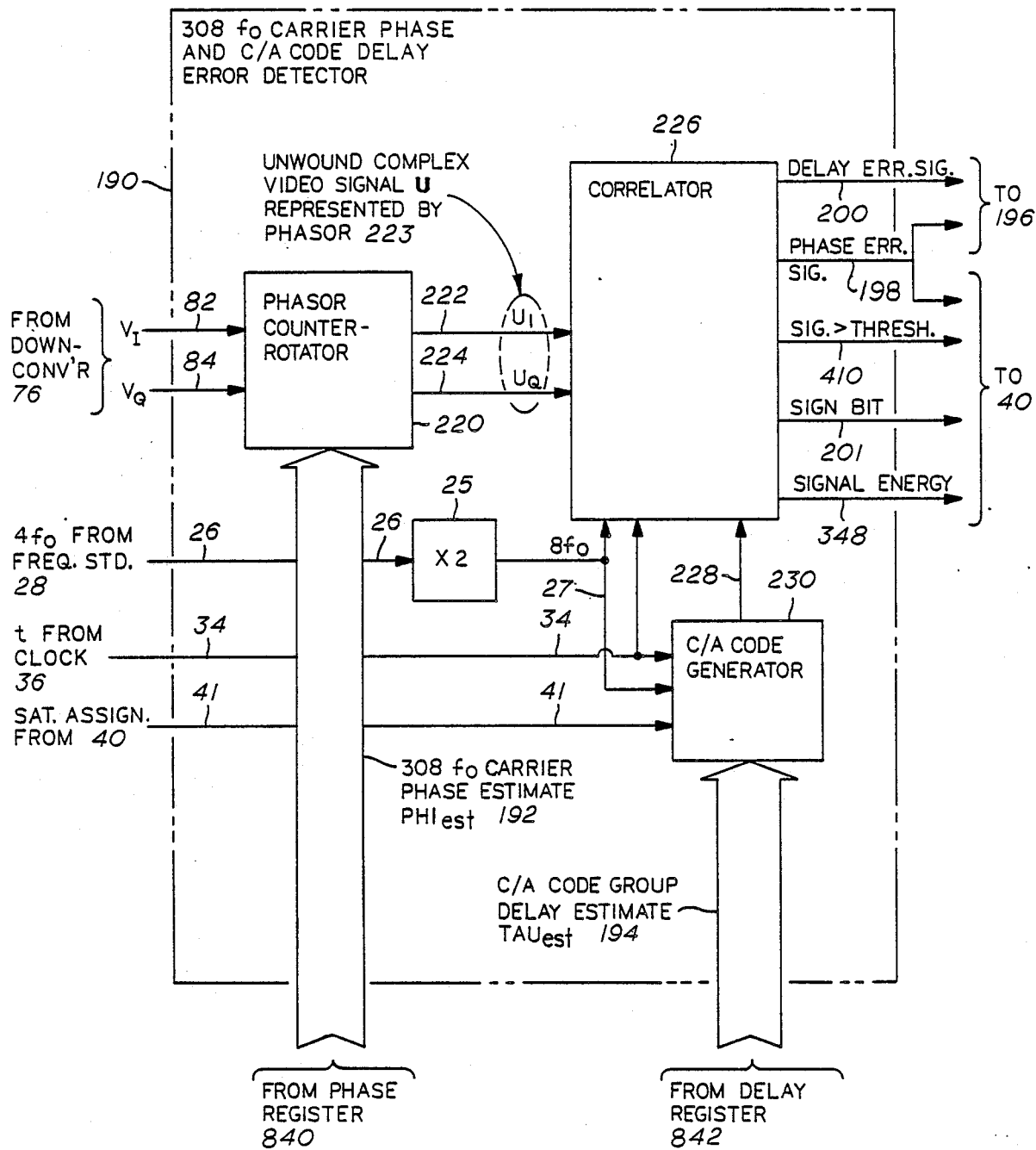
FIG. 7 is a block diagram of the 308 $f_o$ carrier phase and C/A code delay error detector subsystem of the satellite tracking channel shown in FIG. 6.

Referring now to FIG. 7, 308 $f_o$ carrier phase and C/A code delay error detector 190, in satellite tracking channel 32 as shown in FIG. 6, is disclosed in more detail. As noted above with respect to FIG. 6, 308 $f_o$ carrier phase and C/A code delay error detector 190 cooperates with phase and group delay register subsystem 196 within satellite tracking channel 32 to form phase and delay locked loops. 308 $f_o$ carrier phase and C/A code delay error detector 190 receives in-phase video signal 82 and quadrature video signal 84 as inputs from L1 down converter 76 and, utilizing reference frequency input 26 and digital real time indication 34, serves to generate phase error signal 198 and group delay error signal 200 by comparing the actual 308 $f_o$ implicit carrier phase observable PHI and the actual C/A code group delay observable TAU which are implicit in complex video signal V with 308 $f_o$ carrier phase estimate $PHI_{est}$ 192 and C/A code group delay estimate $TAU_{est}$ 194 from phase and group delay register subsystem 196. 308 $f_o$ carrier phase and C/A code delay error detector 190 includes phasor counter rotator 220, correlator 226 and C/A code generator 230. Phasor counter rotator 220, correlator 226 and C/A code generator 230 are each shown in greater detail hereinbelow with reference to FIGS. 9, 10 and 11, respectively.

In-phase video signal 82 and quadrature video signal 84 from L1 down converter 76, shown in FIG. 3, are applied as inputs to phasor counter rotator 220 which also receives 308 $f_o$ carrier phase estimate $PHI_{est}$ 192. Phasor counter rotator 220 subtracts 308 $f_o$ carrier phase estimate $PHI_{est}$ 192 from the phase angle of complex video signal V. As a result of this subtraction, the rate of change of the center frequency carrier phase implicit in complex video signal V is reduced by an amount equal to the rate of change of 308 $f_o$ carrier phase estimate $PHI_{est}$ 192.

Phasor counter rotator 220, as described in greater detail with respect to FIG. 9, below, generates in-phase unwound video signal 222, $U_I$, and quadrature unwound video signal 224, $U_Q$, which taken together form unwound complex video signal U. The term "unwound" in the phrase "unwound complex video signal U" refers to the reduction of the speed of rotation of the phasor in the complex plane which can be used to represent unwound complex video signal U. Unwound complex video signal U is "unwound" in that it is substantially equivalent to complex video signal V except that the speed of rotation in the complex plane of the phasor of unwound complex video signal U is substantially slower than the speed of the phasor in the complex plane which can be used to represent complex video signal V. Stated another way, the constantly changing phase of unwound complex video signal U changes at a much slower rate than the constantly changing phase of complex video signal V. Representation of complex video signal V and unwound complex video signal U in the complex plane and the operation of phasor counter rotator 220 may be understood with reference to FIG. 8.

FIGURE 8

Referring now to FIG. 8, the operation of phasor counter rotator 220 may be understood as follows. As noted above, in-phase video signal 82, $V_I$, and quadrature video signal 84, $V_Q$, may be regarded as the real and the imaginary parts respectively of complex video signal V; that is:

$$V = V_I = i\ V_Q,$$

where i equals the square root of $-1$. Similarly, in-phase unwound video signal 222, $U_I$, and quadrature unwound video signal 224, $U_Q$, are the real and imaginary parts of the unwound complex video signal U; that is:

$$U = U_I = i\ U_Q.$$

Phasor counter rotator 220 generates unwound complex video signal U according to the following equation:

$$U = V \cdot exp\ (-i\ PHI_{est}),$$

where "exp( )" is the complex exponential function $$exp\ (i\ PHI_{est}) = cos\ (PHI_{est}) = i \cdot sin\ (PHI_{est}).$$

Thus, the phase angle of unwound complex video signal U is equal to the phase angle of complex video signal V minus 308 $f_o$ carrier phase estimate $PHI_{est}$ 192.

Figure 8A:
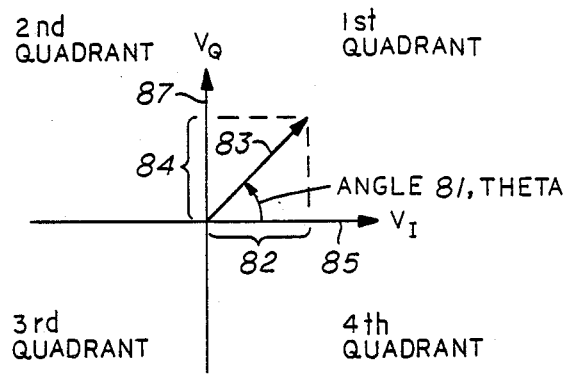
FIG. 8 is a series of graphic representations of phasors in the complex plane representing signals in various other figures.

FIG. 8A is a representation, in the complex plane, of complex video signal V. The in-phase or real component of complex video signal V is plotted on horizontal axis 85 and the quadrature or imaginary component of complex video signal V is plotted on vertical axis 87. In phase video signal 82 is equal to the projection on horizontal axis 85, and quadrature video signal 84 is equal to the projection on quadrature vertical axis 87, of video phasor 83. Phasor 83, whose angle is depicted as angle 81, THETA, represents complex video signal V.

The upper right hand quadrant of the complex plane, as shown in FIG. 8A, is the quadrant in which the signs of both in-phase video signal 82 and quadrature video signal 84 are positive. This quadrant is labelled as the 1st quadrant in accordance with common conventions. Similarly, the upper left quadrant is the quadrant in which the sign of in-phase video signal 82 is negative and the sign of quadrature video signal 84 is positive. This quadrant is labelled the 2nd quadrant. The lower left quadrant is the quadrant in which the signs of both in-phase video signal 82 and quadrature video signal 84 are negative. This quadrant is labelled as the 3rd quadrant. The lower right quadrant is the quadrant in which the sign of in-phase video signal 82 is positive and the sign of quadrature video signal 84 is negative. This quadrant is labelled as the 4th quadrant.

Figure 8B:
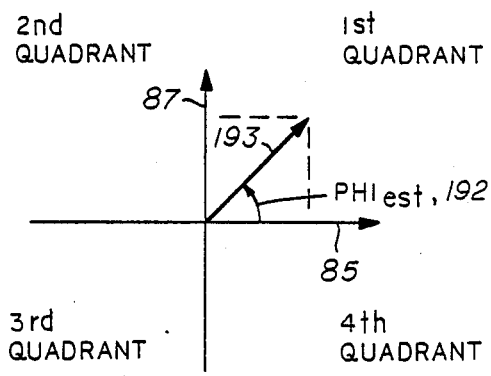
Figure 8C:
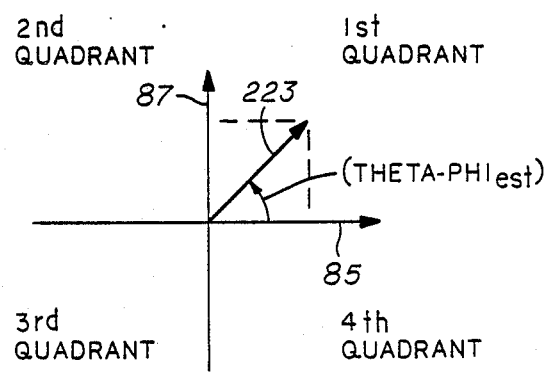
Figure 8D:
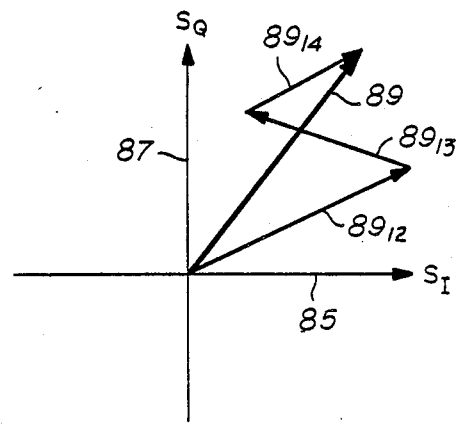

FIG. 8B is a representation in the complex plane of 308 $f_o$ carrier phase estimate phasor 193 whose angle is equal to 308 $f_o$ carrier phase estimate $PHI_{est}$ 192. Similarly, FIG. 8C is a representation in the complex plane of unwound complex video phasor 223 whose angle is equal to the difference between angle 81, THETA, and 308 $f_o$ carrier phase estimate $PHI_{est}$ 192.

Referring now to FIG. 8D, the complex plane of complex L1 band reconstructed $f_o$ carrier composite $S_{I(L1)}$ is shown, with real part $S_{I(L1)}$ and imaginary part $S_Q(L1)$ plotted on the horizontal and the vertical coordinate axes, respectively. Phasor 89 is the vector sum, or resultant, of phasors $89_{12}$, $89_{13}$ and $89_{14}$, which represent the components of $S_{(L1)}$ represented by L1 band reconstructed carrier composite phasor 89, due to GPS satellites 12, 13 and 14, respectively.

Figure 8E:
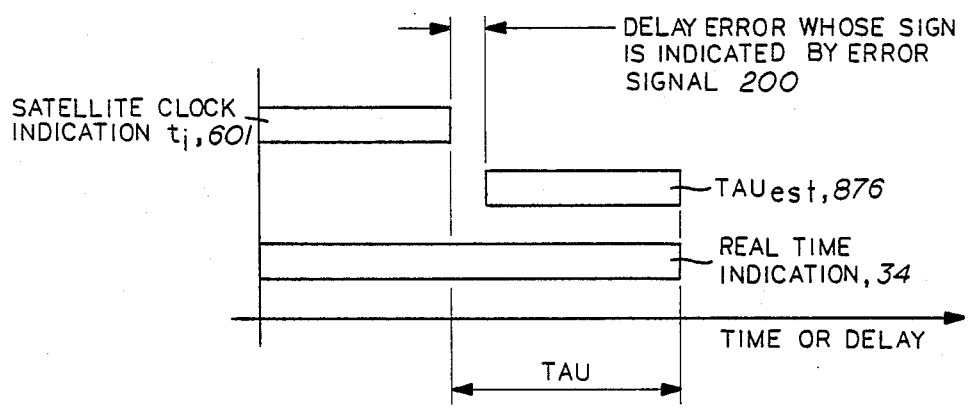

FIG. 8E is a snapshot from the viewpoint of antenna 22 at one instant of time, which indicates the relationship between satellite clock indication $t_1$ 601, delay error signal 200, 30-bit C/A code group delay estimate $TAU_{est}$ 876, and digital real time indication 34 from real time clock 36.

Satellite clock indication $t_1$ 601 is the time indicated by the signal being received from GPS satellite 12, for a particular digital real time indication 34 from real time clock 36. Satellite clock indication $t_1$ 601 is implicit in the modulation of GPS signals 15 received from GPS satellite 12, and may be read explicitly by decoding the broadcast navigation message contained in this signal.

30-bit C/A code group delay estimate $TAU_{est}$ 876 as shown in FIG. 13 is generated by or contained in delay register 842 and is an estimate of C/A code group delay observable TAU.

The difference between digital real time indication 34 and the sum of satellite clock indication $t_1$ 601 and 30-bit C/A code group delay estimate $TAU_{est}$ 876 is the delay error whose sign is indicated by delay error signal 200.

Referring again now to FIG. 7, in-phase video signal 82 and quadrature video signal 84 are received by phasor counter rotator 220 in analog form from L1 down converter 76 and converted to one bit digital form in which the value of each bit indicates the sign of the respective video signal. The two bits representing in-phase video signal 82 and quadrature video signal 84 therefore, when taken together, indicate the quadrant in the complex plane of video phasor 83.

308 $f_o$ carrier phase estimate $PHI_{est}$ 192 is received by phasor counter rotator 220 from phase and group delay register subsystem 196 in a two bit digital form which indicates the quadrant of 308 $f_o$ carrier phase estimate phasor 193. Phasor counter rotator 220 generates in-phase unwound video signal 222 and quadrature unwound video signal 224 in one bit digital form which, taken together, represent the quadrant of unwound complex video phasor 223 in the complex plane.

If 308 $f_o$ carrier phase estimate $PHI_{est}$ 192 indicates that PHI is near zero, modulo 1 cycle, 308 $f_o$ carrier phase estimate phasor 193 will be in the 4th quadrant and in-phase unwound video signal 222 and quadrature unwound video signal 224 will be equal, respectively, to in-phase video signal 82 and quadrature video signal 84, that is, unwound complex video phasor 223 will be in the same quadrant as a video phasor 83. If 308 $f_o$ carrier phase estimate $PHI_{est}$ 192 indicates that PHI in near 90° or plus one-quarter cycle, unwound complex video phasor 223 will be one quadrant further clockwise than video phasor 83. If 308 $f_o$ carrier phase estimate $PHI_{est}$ 192 indicates that PHI is near 180° then a 180° rotation is performed and so on.

In-phase unwound video signal 222 and quadrature unwound video signal 224 may therefore be formed, within phasor counter rotator 220, by logic gates not shown, which operate in accordance with a simple truth table, described in greater detail with respect to FIG. 9.

Within 308 $f_o$ carrier phase and C/A code delay error detector 190 in-phase unwound video signal 222 and quadrature unwound video signal 224 are applied as inputs to correlator 226, as shown in FIG. 7. Correlator 226 also receives 8 $f_o$ reference signal 27 from frequency doubler 25, which generates 8 $f_o$ reference signal 27 by multiplying 4 $f_o$ reference signal 26 from frequency standard 28 by a factor of 2, and digital real time indication 34 from real time clock 36 as shown in FIG. 2. In addition, correlator 226 receives one bit C/A code local model 228 from C/A code generator 230.

Correlator 226 correlates in-phase unwound video signal 222 and quadrature video signal 224 with one bit C/A code local model 228. One bit C/A code local model 228 is a sequence of bit values representing the C/A code specific to GPS satellite 12. This sequence is output from C/A code generator 230 at times in accordance with the estimated arrival time of the C/A sequence from the GPS satellite to which C/A code generator 230 has been assigned by satellite assignment 41 from real time computer 40. The timing of the generation of one bit C/A code local model 228 is governed by digital real time indication 34 provided by real time clock 36, 8 $f_o$ reference signal 27 from frequency doubler 25 and C/A code group delay estimate $TAU_{est}$ 194 shown in FIG. 6.

C/A code group delay estimate $TAU_{est}$ 194 is a multi-bit digital representation of the estimated delay, modulo the code period of 1 millisecond, in which the least significant bit represents 1/40th of one bit or one chip of the C/A code sequence. As noted above, the C/A code is a periodic sequence of 1,023 equally wide chips transmitted with a period of exactly one millisecond. The least significant bit of C/A code group delay estimate $TAU_{est}$ 194 therefore corresponds to a path length of about 7.5 meters. Thus, the RMS quantization error of C/A code group delay estimate $TAU_{est}$ 194 is on the order of 7.5 meters divided by the square root of 12, or about 2 meters. This 2 meter RMS quantization error is negligible in comparison with the other errors that affect the C/A code as received, such as multipath errors.

One bit C/A code local model 228 will correlate constructively only with the particular component of unwound complex video signal U which originated from GPS satellite 12. The C/A code used in every other satellite is uncorrelated, that is, orthogonal, with the code of GPS satellite 12. Because of this orthogonality, correlator 226 serves to select the signals from GPS satellite 12 and to reject the signals from other satellites.

As noted above with respect to the structure of the GPS signals, the C/A code related modulation is bi phase modulation which switches the phase of a component of the 308 $f_o$ L1 center frequency carrier transmitted by GPS satellite 12 between two values 180 degrees apart according to whether the current code bit is 1 or zero. These phase reversals occur pseudorandomly at integer multiples of the C/A code chip width, $t_m$. Unwound complex video signal U appears therefore to flicker in phase by 180° at this rate.

Correlation within correlator 226 by one bit C/A code local model 228, when one bit C/A code local model 228 is generated in synchronism with the C/A code being received and matches the sequence of the C/A code specific to GPS satellite 12, stops this flickering so that the phase remains relatively constant for a time interval sufficient to permit coherent integration and detection of the signal. However, the phase does not remain constant for a very long time because, every 20 milliseconds, the phase may be reversed by the telemetry modulation which broadcasts the navigation message.

Correlator 226 correlates in-phase unwound video signal 222 and quadrature unwound video signal 224 with one bit C/A code local model 228 for a time interval which is less than 20 milliseconds. Unless this time interval happens to contain a telemetry reversal, the phase remains relatively constant so that correlator 226 may generate phase error signal 198 which represents the difference between 308 $f_o$ implicit carrier phase observable PHI and 308 $f_o$ carrier phase estimate $PHI_{est}$ 192. Correlator 226 also determines the sign of the difference between C/A code group delay observable TAU and C/A code group delay estimate $TAU_{est}$ 194.

As disclosed hereinbelow in greater detail with reference to FIG. 10, correlator 226 determines the sign of this delay difference by comparing the energies of the correlation products from tow correlations. The first such correlation is the correlation of one bit C/A code local model 228 with in-phase unwound video signal 222 and quadrature unwound video signal 224 discussed above. The second such correlation is the correlation of in-phase unwound video signal 222 and quadrature unwound video signal 224 with a further-delayed version of one bit C/A code local model 228 in which the further-delay equals one chip width of the C/A code. The energies resulting from each of these two correlations are compared to determine if correlation with the signal representing the early code results in greater than or less energy than correlation with the signal representing the late or delayed code. Delay error signal 200 indicates the result of this comparison and is applied to phase and group delay register subsystem 196 in which this indication of the code delay is used to advance or retard delay register 842 shown in FIG. 13, in order to maintain delay lock between the actual value of C/A code group delay observable TAU and C/A code group delay estimate $TAU_{est}$ 194.

FIGURE 9

Referring now to FIG. 9 phasor counter rotator 220 will be described in greater detail. As noted above with regard to FIG. 7, phasor counter rotator 220 operates to subtract 308 $f_o$ carrier phase estimate $PHI_{est}$ 192 from angle 81 THETA of complex video phasor 83 to generate unwound video signal 222 and quadrature unwound video signal 224 which taken together form a two bit digital representation of the quadrant in the complex plane of unwound video phasor 223.

Figure 12:
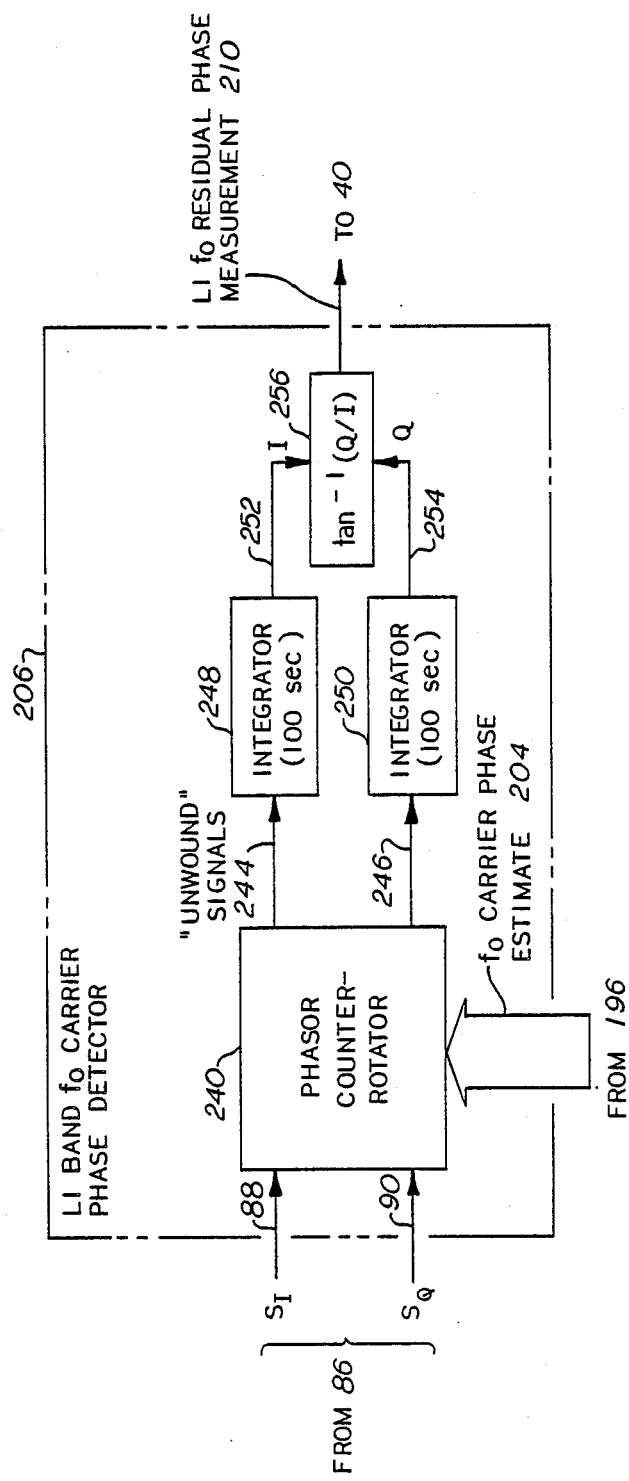
FIG. 12 is a block diagram of the $f_o$ carrier phase detector depicted in the satellite tracking channel shown in FIG. 6.

The function performed by phasor counter rotator 220 in 308 $f_o$ carrier phase and C/A code delay error detector 190 is also required elsewhere in the system according to the present invention. Similar functions are performed within each satellite tracking channel 32 by phasor counter rotator 240 in L1 $f_o$ carrier phase detector 206, as shown in FIG. 12, and by a similar phasor counter rotator, not sown, in L2 $f_o$ carrier phase detector 208. The operation of phasor counter rotator 220 will be described in detail with regard to FIG. 9 and the operations of the phasor counter rotators in L1 $f_o$ carrier phase detector 206 and L2 $f_o$ carrier phase detector 208 can be understood therefrom.

Figures 9A, 9B, 9C, 9D:
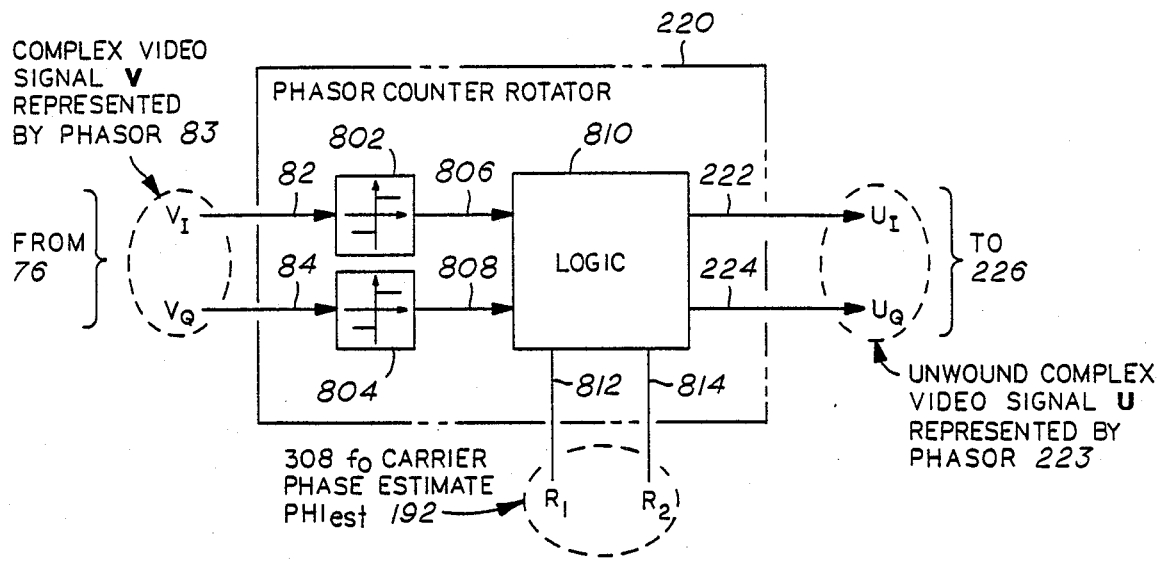
FIG. 9 is a block diagram of one of the phasor counter rotators depicted in the error detecting system shown in FIG. 7 and truth tables related to the operation thereof.

As shown in FIG. 9A in-phase video signal 82 and quadrature video signal 84 are applied at the input of phasor counter rotator 220 to a pair of identical one bit analog to digital converters 802 and 804, respectively, which operate as clippers to generate one bit in-phase video sign indicator 806 and one bit quadrature video sign indicator 808 respectively. One bit in-phase video sign indicator 806 is a logical or binary digital signal in which the true or 1 state represents that the sign of in-phase video signal 82 was positive and a zero or false state represents that the sign thereof was negative. The same relationship holds between the states of one bit quadrature video sign indicator 808 and quadrature video signal 84.

One bit in-phase video sign indicator 806 and one bit quadrature video sign indicator 808, taken together form a two bit digital representation of the quadrant of video phasor 83, as may be noted from the first three columns of the table in FIG. 9B. In particular, it can be seen by comparison between FIGS. 8A and 9B that when video phasor 83 is in the 1st quadrant, the signs of in-phase video signal 82 and quadrature video signal 84 are positive so the digital states of one bit in-phase video sign indicator 806 and one bit sign video quadrant indicator 808 must be true of 1. Similarly when video phasor 83 is in the 2nd quadrant, one bit in-phase video sign indicator 806 and one bit quadrature video sign indicator 808 are equal to 0 and 1, respectively. In the 3rd quadrant, they are both equal to zero and in the 4th quadrant they are equal to 1 and zero, respectively.

This two bit digital representation of the phase angle of video phasor 83 is modulo one cycle, that is, the integer number of cycles is ignored in this representation. An instantaneous phase angle between 0 and 1 cycle cannot be distinguished from a phase angle between 2 and 3 cycles, for example.

With reference again to FIG. 9A, 308 $f_o$ carrier phase estimate $PHI_{est}$ 192 from phase and group delay register subsystem 196 is applied as an input to phasor counter rotator 220 at the input to logic circuitry 810. In particular, as will be noted hereinbelow with respect to FIG. 13, phase register 840 contains a multibit 308 $f_o$ carrier phase estimate $PHI_{est}$ 856, of which only tow bits are included in 308 $f_o$ carrier phase estimate $PHI_{est}$ 192. The first bit to the right of the binary point of 308 $f_o$ carrier phase estimate $PHI_{est}$ 856 is half-cycle bit $R_1$ 812 which indicates whether 308 $f_o$ carrier phase estimate phasor 193 is in the first two or the second two quadrants of the complex plane. The second bit to the right of the binary point is quarter-cycle bit $R_2$ 814 which indicates whether the number of the quadrant of 308 $f_o$ carrier phase estimate phasor 193 is odd or even.

308 $f_o$ carrier phase estimate $PHI_{est}$ 192 can be understood with reference to the rightmost pair of columns in the table in FIG. 9B. When 308 $f_o$ carrier phase estimate phasor 193 is in the 1st quadrant, half cycle bit $R_1$ 812 and quarter cycle bit $R_2$ 814 are both equal to zero indicating that the phasor has neither one half nor one quarter cycle of phase. When 308 $f_o$ carrier phase estimate phasor 193 is in the 2nd quadrant, half-cycle bit $R_1$ 812 and quarter-cycle bit $R_2$ 814 are equal to zero and 1, respectively. Similarly, the 3rd quadrant is indicated when half-cycle bit $R_1$ 812 and quarter-cycle bit $R_2$ 814 are equal to 1 and zero and the 4th quadrant is represented when they are both equal to 1. The difference between this binary form of quadrant representation and the sign-based representation provided by one bit in-phase video sign indicator 806 and one bit quadrature video sign indicator 808 can be seen with reference to the table in FIG. 9B.

Referring now to FIG. 9A again, logic circuitry 810 operates on complex video signal V, as represented by one bit in-phase video sign indicator 806 and one bit quadrature video quadrant indicator 808, to subtract therefrom 308 $f_o$ carrier phase estimate $PHI_{est}$ 192 in order to generate unwound complex video signal U represented by in-phase unwound video signal 222 and quadrature unwound video signal 224. In this operation, phase angles are described only in terms of quadrants. This representation is relatively coarse in that it is only accurate within plus or minus one-eighth cycle. In-phase unwound video signal 222 and quadrature unwound video signal 224 provide a two bit digital representation of the quadrant of unwound complex video 223.

The required functional relationship between in-phase unwound video signal 222, output from logic circuitry 810, and the four inputs, in-phase video sign indicator 806, quadrature video sign indicator 808, half cycle bit $R_1$ 812 and quarter cycle bit $R_2$ 814, is displayed in the truth table in FIG. 9C. Similarly, the required functional relationship between quadrature unwound video signal 224 output from logic circuitry 810, and these inputs is displayed in the truth table shown in FIG. 9D. With these relationships clearly defined in accordance with these truth tables, it is convenient to provide logic circuitry 810 in the form of logic gates or a Read Only Memory, not shown.

FIGURE 10

Figure 10:
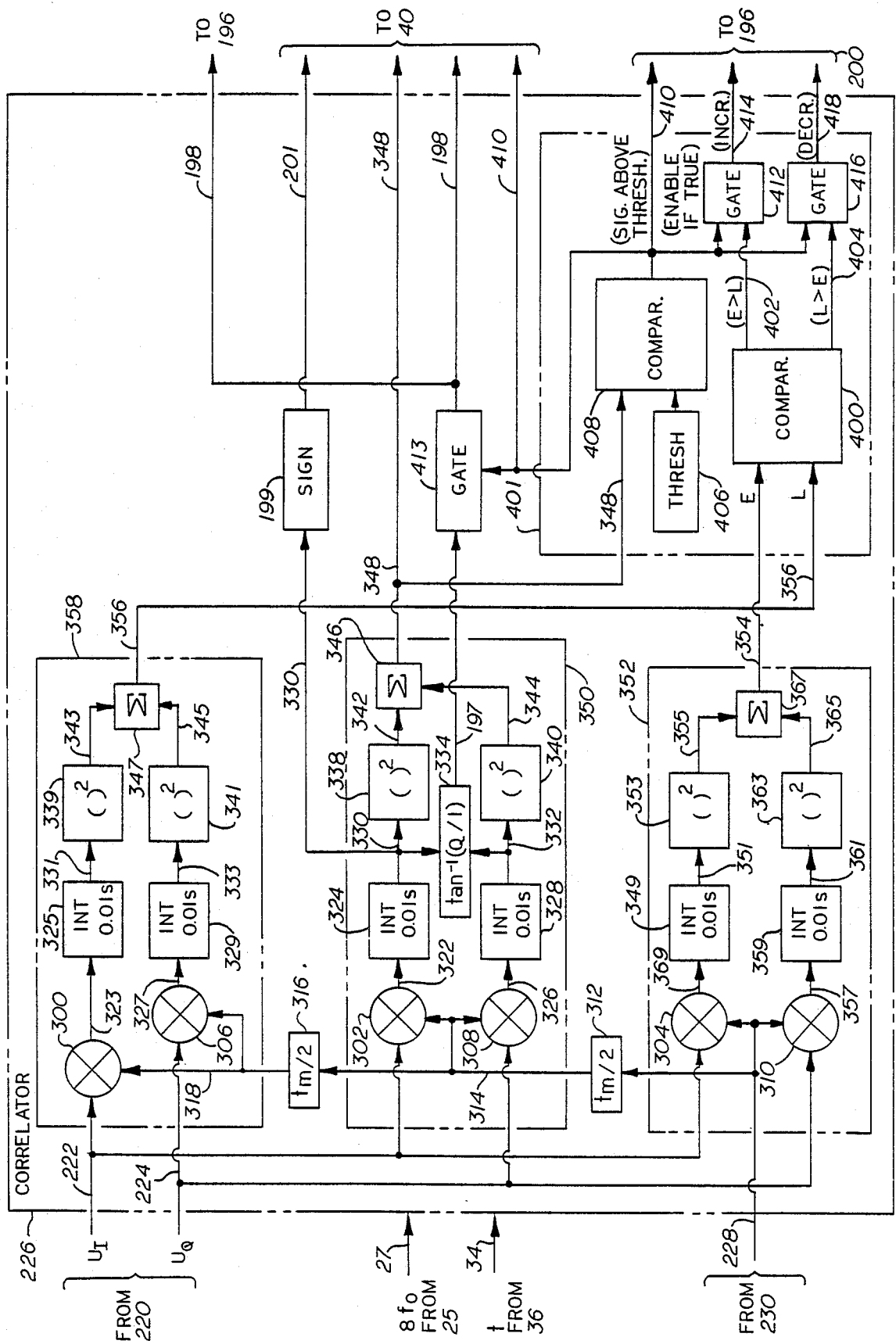
FIG. 10 is a block diagram of the singular depicted in the error detecting system shown in FIG. 7.

Now referring to FIG. 10, operation of correlator 226 within 308 $f_o$ carrier phase and C/A code delay error detector 190 as shown in FIG. 7 is disclosed in greater detail. In-phase unwound video signal 222 from phasor counter rotator 220 is applied as an input to mixers 300, 302 and 304. Quadrature unwound video signal 224 from phasor counter rotator 220 in FIG. 7 is applied as an input to mixer 306, mixer 308 and mixer 310. The second inputs to mixers 300, 302, 304, 306, 308 and 310 are provided by one bit C/A code local model 228 and one-half and one chip delayed versions thereof, 314 and 318 respectively. In-phase unwound video signal 222, quadrature unwound video signal 224 and one bit C/A code local models 228, 314 and 318 are all one bit digital or logistical signals. Therefore, mixers 300, 302, 304, 306, 308, and 310 are exclusive nor logic gates; equivalently, these mixers may be regarded as modulo-2 binary adders, or as parity detectors.

One bit C/A code local model 228 is applied as an input to one-half chip delay circuit 312 which generates one-half chip delayed C/A code local model 314. One half chip delayed C/A code local model 314 is then applied as an input to one-half chip delay circuit 316 which generates one-chop delayed C/A code local model 318 by delaying one-half chip delayed C/A code local model 314 by an additional one-half chip. One-half chip delay circuit 312 and one-half chip delay circuit 316 operate in an identical manner and each applies a delay equal to exactly one-half of the width, $t_m$, of a C/A code chip or bit.

The chipping rate of the C/A code in the GPS system is 1,023 chips per millisecond or 1,023 million chips per second or 1,023 MegaHertz of $f_o/5$. Each chip is therefore equal to 5 cycles of oscillation of the reference frequency $f_o$ or twenty cycles of 4 $f_o$ reference frequency 26 from frequency standard 28 shown in FIG. 2, or 40 cycles of 8 $f_o$ reference signal 27. 8 $f_o$ is the "clock" rate at which one bit C/A code local model 228 is generated by C/A code generator 230, as discussed below with reference to FIG. 11. Correlator 226 receives 8 $f_o$ reference signal 27 from frequency doubler 25 shown in FIG. 7 and digital real time indication 34 from real time clock 36 shown in FIG. 2.

One-half chip delay circuits 312 and 316 can therefore each be configured from a 20 bit shift register clocked by 8 $f_o$ reference frequency 27 from doubler 25 as shown in FIG. 7. 8 $f_o$ reference frequency 27 also serves to clock 0.01 second integer 324 as discussed below. One half chip delayed C/A code local model 314, which is a one-half chip delayed version of one bit C/A code local model 228, is applied as an input to mixers 302 and 308 at the input of on-time signal detector 350 as well as the input of one-half chip delay circuit 316. One chip delayed C/A code local model 318 generated by one-half chip delay circuit 316, which is a one full chip delayed version on one bit C/A code local model 228, is applied as inputs to mixers 300 and 306 at the input of late signal detector 358. One bit C/A code local model 228 is applied directly, that is without any delay, to mixers 304 and 310 at the input of early signal detector 352.

The operation of on-time signal detector 350 will be discussed first. The operation of early signal detector 352 and late signal detector 358 is similar to the operation of on-time signal detector 350 and may be more easily described thereafter.

Within on-time signal detector 350 mixer 302 generates output 322 which, as noted above, is the exclusive nor function of in-phase unwound video signal 222 and one-half chip delayed C/A code local model 314. Output 322 is applied as an input to 0.01 second integrator 324 where it is integrated to form output 330.

Because output 322 is a one bit digital signal, 0.01 second integrator 324 can most conveniently be configured from a clocked counter operated in response to digital real time indication 34 from real time clock 36 sown in FIG. 2, to start, stop, and restart integration at each integer multiple of 0.01 second as indicated by real time clock 36. To start the integration, at the occurrence of digital real time indication 34 equal to an integer multiple of 0.01 seconds, integrator 324 must be reset. Then for every cycle of 8 $f_o$ reference signal 27, the count which represents the integrated value is incremented or not according to whether output 322 is 1 or zero, respectively. At the end of the 0.01 second integration period, the value contained in 0.01 second integrator 324 is read out to obtain output 330 and 0.01 second integrator 324 is then reset to zero to start the next integration.

If 0.01 second integrator 324 is configured from a clocked counter in this manner, its output 330 will be biased by one-half the number of cycles of 8 $f_o$ reference frequency 27 which are contained in one 0.01-second integration interval, or 4 $f_o$) 0.01 second, or about 204, 600 counts. This bias is conveniently taken into account in the configurations of two quadrant inverse tangent function generator 334 and squarer 338, which accept output 330 from 0.01 second integrator 324.

Similarly, mixer 308 generates output 326 which is integrated for 0.01 second by integrator 328, beginning and ending on integer 1/100ths of a second under the control of real time clock 36, to generate output 332. At the end of the 0.01 second integration period, output 330 from 0.01 second integrator 324 and output 332 from integrator 328 are applied as inputs to two quadrant inverse tangent function generator 334. Two quadrant inverse tangent function generator 334, which may be configured from a Read Only Memory (ROM), generates phase error signal 197 equal to the angle in the range minus one-quarter cycle to plus one-quarter cycle whose tangent is Q/I where Q represents output 332 and I represents output 330. Not that phase error signal 197 from two quadrant inverse tangent function generator 334 is not affected by telemetry phase reversals in GPS signals 15 because such reversals act to change the signs of both I and Q, providing that no reversal occurs during the particular 0.01 second interval for which I and Q were generated. Phase error signal 197 from two quadrant inverse tangent function generator 334 therefore indicates the angle, modulo 0.5 cycle, of the average value during the 0.01 second integration period of the complex number whose real part is output 322 and whose imaginary part is output 326. As noted above, the angle of this complex number remains relatively constant during the integration period except for the telemetry phase reversals which occur at integer multiples of 0.02 seconds.

It is significant that the integration interval, namely 0.01 seconds, is an integer number of milliseconds, and also that it is exactly one-half of the interval between possible telemetry modulation phase reversals. The integration should be performed for an integer number of milliseconds because one millisecond is the period of the C/A code function. As noted above, the satellite-specific C/A codes are orthogonal to one another so that cross correlation of the C/A code components of the signals from one satellite with the C/A code of another satellite will yield a zero result. However, this desired lack of cross correlation is not exactly obtainable unless the integration extends over an integer number of code periods. In the present case the integer number is 10.

The fact that the integration period is exactly one-half of the telemetry phase reversal interval guarantees that all of the even numbered integration intervals, or all of the odd numbered integration periods, will be free of phase reversals for a long time.

The angle of the complex signal component from GPS satellite 12 at the inputs to integrators 324 and 328, will remain constant during the integration period, and therefore this signal will accumulate coherently within integrators 324 and 328 throughout all of the odd or even intervals, whichever contain no phase reversals. The phase reversals occurring during half of the other integration intervals, even or odd respectively, reduce the average accumulated value for those intervals. By comparing the average amount of signal energy accumulated during even numbered integration periods with the average amount of signal energy accumulated during odd numbered integration periods, it is possible to determine the phase of the 20 millisecond telemetry reversals relative to the phase of the 20 millisecond periodic signal defined by the beginning and ends of the even or the odd integration periods. It is convenient for these averages to be computed and compared with computer 40 to which on-time signal energy indication 348 for each integration interval, is furnished as described below.

Sign indicator 199 determines the sign of output 330 from 0.01 second integrator 324 and generates sign bit 201 indicating whether output 330 was positive or negative. Sign bit 201 is furnished to computer 40. The sequence of values of sign bit 201 from the even or the odd-numbered 0.01 second integration intervals, whichever are determined not to contain telemetry phase reversals, is then interpreted as the telemetry message by computer 40. For this interpretation to be possible, phase lock must have been acquired. If phase lock has been acquired, then virtually all of the on-time signal energy appears in output 3300 and none in output 332.

Output 330 from 0.01 second integrator 324 is applied, at the end of every 0.01 second integration period, as an input to squarer 338 which generates output 342 representing the square of output 330. Output 332 from integrator 328, at the end of every 0.01 integration period, is applied to squarer 340 which generates output 344 equal to the square of output 332. Output 342 and output 344 are applied as inputs to summer 346 to obtain on-time signal energy indication 348 for each 0.01 second integration period. On-time signal energy indication 348 is equal to the sum of the squares of output 330 and output 332. It is convenient to obtain phase error signal 197, sign bit 201, and on-time signal energy indication 348 directly from output 330 and output 332 by using the values of output 330 and output 332 to address a ROM in which pre-computed values of phase error signal 197, sign bit 201 and on-time signal energy indication 348 have been stored.

On-time signal energy indication 348 is applied as an input to real time computer 40, shown in FIG. 2 at the end of each 0.01 second integration interval. In real time computer 40, the average of the even interval energies of on-time signal energy indication 348 is compared with the average of the odd interval energies thereof in order to determine the phase of the telemetry reversals. Phase error signal 197 from two quadrant inverse tangent function generator 334 is gated by gate 413 to obtain phase error signal 198. Phase error signal 198 is output from gate 413 if and only if above threshold indication 410, also input to gate 413, indicates that phase error signal 197 is a valid determination of phase error. As discussed below, above threshold indication 410 indicates that on-time signal energy indication 348 is above a preset threshold, and thus that sufficient signal energy was accumulated during the 0.01 second integration interval to ensure that a valid phase determination could be performed by two quadrant inverse tangent function generator 334.

Phase error signal 198, representing a valid measurement, is applied as an input to phase and group delay register subsystem 196 shown in FIG. 6 to maintain phase lock.

When 308 $f_o$ carrier phase estimate $PHI_{est}$ 192 is in lock with, and thus is remaining equal to, 308 $f_o$ implicit carrier phase $PHI_{est}$, phase error signal 198 will be nearly equal to zero.

As noted, the telemetry may be read by real time computer 40 by scanning the sequence of even or odd sign bits 201 searching for the frame synchronization pattern which is transmitted by GPS satellite 12 to mark the beginning of each telemetry frame. The parity of this synchronization pattern indicates whether sign bit 201 must be inverted to obtain the telemetry message bits.

The telemetry bit values should be determined from either the even or the odd numbered 0.01 second integration times, which ever one has been determined not to contain phase reversals as previously explained. Although phase error signal 198 is better determined from just the even or just the odd numbered integration times, whichever have been determined not to contain telemetry phase reversals, it is not strictly necessary to distinguish between even and odd numbered integration intervals for this purpose. One of the two values for phase error signal 198, for the odd interval or the even interval, will always be valid because there is no reversal within that integration period. The other, even or odd, may also be valid unless the telemetry reversals are occuring very near the midpoint of the integration interval. In the case in which the phase reversals occur near the midpoint of the integration period, the very low output value of output 330 and output 332 would result in an unreliable value 197 at the output of two quadrant inverse tangent function generator 334 which would better not be passed on as phase error signal 198.

In order to detect such invalid indications and prevent their acceptance for use as phase error signal 198, the energy of the signal received in each integration interval, as indicated by on-time signal energy indication 348 from summer 346 is compared with threshold value 406 in comparator 408. Comparator 408 generates binary valued above threshold indication 410 which indicates whether or not on-time signal energy indication 348 was greater than threshold value 406. Threshold value 406 should be set high enough so that if on-time signal energy indication 348 exceeds threshold value 406, above threshold indication 410 will indicate that phase error signal 198 is valid. Above threshold indication 410 from comparator 408 is applied as an input to gate 413 as noted above to indicate the presence of a valid measurement. Above threshold indication 410 is also used by real time computer 40 during the initial signal acquisition process which will be described below with further reference to FIG. 6.

Within late signal detector 358, mixer 300 generates output 323 which can be considered to be the exclusive nor function of in-phase unwound video signal 222 and one-chip delayed C/A code local model 318. Output 323 is applied as an input to 0.01 second integrator 325 where it is integrated to form output 331.

Because output 323 is also a one bit digital signal, 0.01 second integrator 325 can be configured from a clocked counter operated in response to digital real time indication 34 from real time clock 36 shown in FIG. 2 to start and stop integration at each integer multiple of 0.01 second as indicated by real time clock 36. Integrator 325 must be operated in the same manner as 0.01 second integrator 324 as noted above with respect to on-time signal detector 350.

Mixer 306 generates output 327 which is integrated for 0.01 second by integrator 329, beginning and ending on integer 0.01's of a second under the control of real time clock 36, to generate output 333.

Output 331 from 0.01 second integrator 325 is applied, at the end of the 0.01 second integration period, as an input to squarer 339 which generates output 343 equal to the square of output 331. Output 333 from integrator 329 is applied at the end of the 0.01 integration period to squarer 341 which generates output 345 equal to the square of output 333. Output 343 and output 345 are applied as inputs to summer 347 which generates late signal 356 which is therefore one measure of the energy of the signal received from GPS satellite 12 during the integration period.

Within early signal detector 352, mixer 304 generates output 369 which can be considered to be the exclusive nor function of in-phase unwound video signal 222 and one bit C/A code local model 228. Output 369 is applied as an input to 0.01 second integrator 349 where it is integrated to form output 351.

Because output 369 is also a one bit digital signal, 0.01 second integrator 349 can be configured from a clocked counter operated in response to digital real time indication 34 from real time clock 36 shown in FIG. 2 to start and stop integration at each integer multiple of 0.01 second as indicated by real time clock 36. Integrator 349 must be operated in the same manner as 0.01 second integrator 324 as noted above with respect to on-time signal detector 350.

Similarly, mixer 310 generates output 357 which is integrated for 0.01 second by integrator 359, beginning and ending on integer 0.01's of a second under the control of real time clock 36, to generate output 361.

Output 351 from 0.01 second integrator 349 is applied, at the end of the 0.01 second integration period, as an input to squarer 353 which generates output 355 equal to the square of output 351. Output 361 from integrator 359 at the end of the 0.01 integration period, is applied to squarer 363 which generates output 365 equal to the square of output 361. Output 355 and output 365 are applied as inputs to summer 367 which generates early signal 354 which is therefore a measure of the energy of the signal received from GPS satellite 12 during the integration period.

As noted above, on-time signal energy indication 348 from on-time signal detector 350 is applied at the input to C/A code group delay error detecting circuit 401 to generate above threshold indication 410. Early signal 354 and late signal 356 are also applied as inputs to C/A code group delay error detecting circuit 401 and, in particular, are applied as inputs to early versus late energy comparator 400. Early versus late comparator 400 operates to determine which of its inputs is greater and generates early greater than late indication 402 is early signal 354 is greater than late signal 356 and generates late greater than early early indication 404 if the opposite is true.

Early greater than late indication 402 and late greater than energy indication 404 are applied as inputs to a pair of identical logical AND gates 412 and 416. The other inputs to AND gates 412 and 416 are provided by above threshold indication 410 so that the respective delay register incrementing signal 414 and delay register decrementing signal 418 from gates 412 and 416 are enabled if on-time signal energy indication 348 is above threshold value 406, Gates 412 and 416 generate delay register incrementing signal 414 and delay register decrementing signal 418 respectively which, taken together, form group delay error signal 200 as shown above with reference to FIG. 6.

In this manner it can be seen that correlator 226 serves to generate a value for phase error signal 197, determine from the on-time signal energy if the phase error signal so generated is valid and if it is, pass this value as phase error signal 198 to phase and group delay register subsystem 196. Similarly, correlator 226 passes group delay error signal 200 to increment or decrement the value for 30-bit C/A code group delay estimate TAU$_{est}$ 876 held in delay register 842 shown in FIG. 13 in accordance with the relative power available from early or late cross correlation.

FIGURE 11

Figure 11:
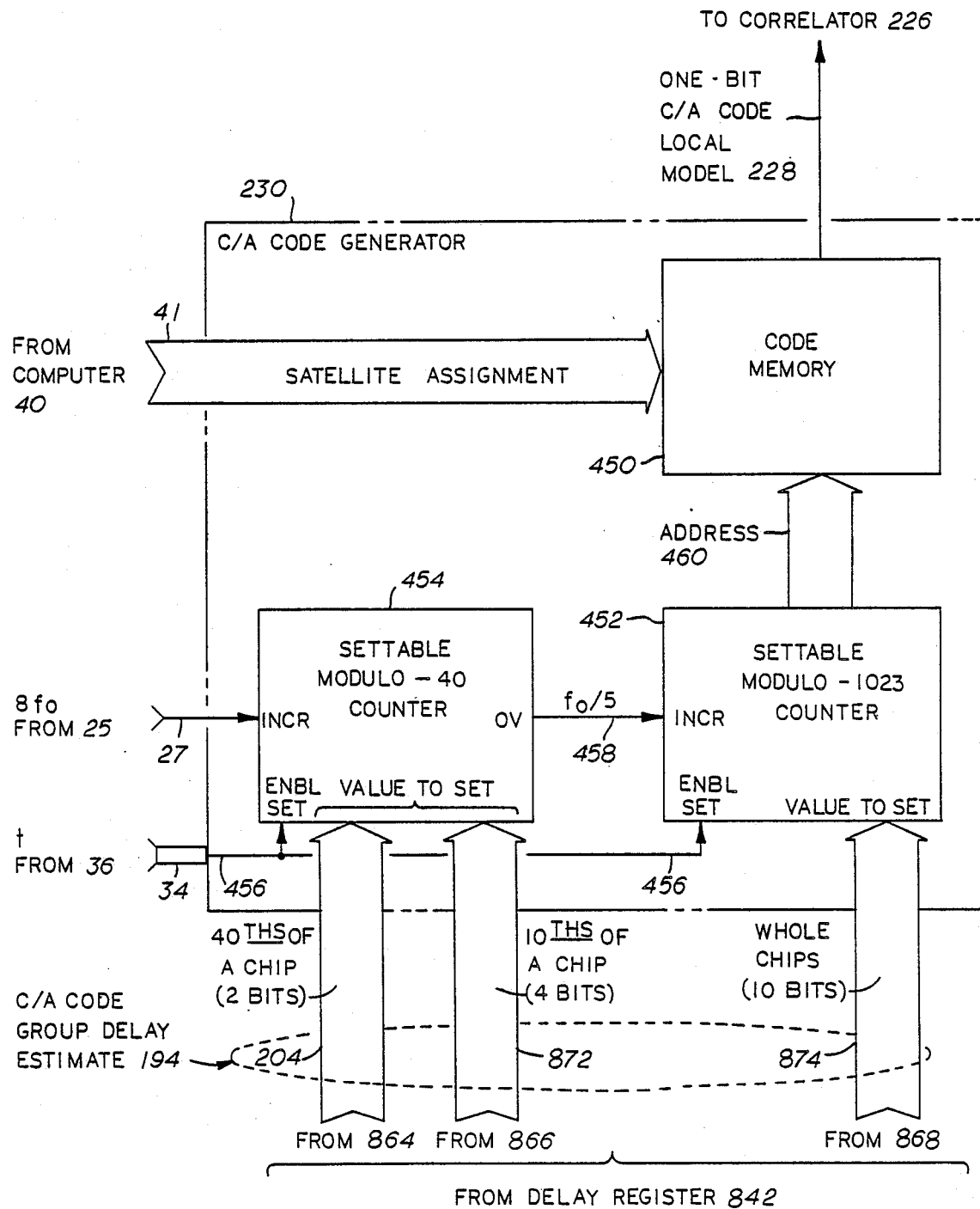
FIG. 11 is a block diagram of the C/A code generator depicted in the error detecting system shown in FIG. 7.

Referring now to FIG. 11, C/A code generator 230, shown in FIG. 7, is disclosed in greater detail. As noted with reference to FIG. 7, C/A code generator 230 generates one bit C/A code local model 228 which is a pseudorandom sequence of 1023 bit values representing the C/A code specific to GPS satellite 12. This sequence is transmitted by GPS satellite 12 periodically with a period of 1 millisecond.

One bit C/A code local model 228 from C/A code generator 230 is applied to correlator 226 wherein one bit C/A code local model 228 is correlated with unwound complex video signal U which represents in phase unwound video signal 222 and quadrature unwound video signal 224.

One bit C/A code local model 228 correlates constructively only with the particular component of unwound complex video signal U which originated from GPS satellite 12. The C/A code used in every other satellite is uncorrelated, that is, orthogonal, with the code of GPS satellite 12. Because of this orthogonality, correlator 226 serves to select the signals from GPS satellite 12 and to reject the signals from other satellites.

As discussed with reference to FIG. 2, real time computer 40 generates satellite assignment 41 which is applied to satellite tracking channel 32 in order to indicate the particular GPS satellite, GPS satellite 12, which is to be tracked by satellite tracking channel 32. As shown in FIG. 6, within satellite tracking channel 32, satellite assignment 41 is applied to 308 $f_o$ carrier phase and C/A code delay error detector 190 within which, as shown in FIG. 7, satellite assignment 41 is applied to C/A code generator 230. As discussed below, satellite assignment 41 causes C/A code generator 230 to generate the particular code sequence, one bit C/A code local model 228, which is specific to GPS satellite 12.

C/A code generator 230 also receives digital real time indication 34 from real time clock 36, 8 $f_o$ reference frequency 27 from doubler 25, and C/A code group delay estimate TAU$_{est}$ 194 from delay register 842, as shown in FIG. 7. These three inputs together govern the timing of the generation of one bit C/A code local model 228.

As discussed below with reference to FIG. 13, delay register 842 contains and generates C/A code group delay estimate TAU$_{est}$ 194, an estimate of the actual C/A code group delay observable TAU of the C/A code component of GPS signals 15 received from GPS satellite 12. C/A code group delay estimate TAU$_{est}$ 194 is adjusted by the action of delay error signal 200, generated by correlator 226, in order to minimize the difference between the C/A code group delay estimate TAU$_{est}$ 194 and the actual C/A code group delay observable TAU. Thus C/A code generator 230 is a part of a delay-locked feedback loop which includes correlator 226 and delay register 842.

Referring to FIG. 11, C/A code generator 230 includes code memory 450, settable modulo-1023 counter 452 and settable modulo-40 counter 454. Satellite assignment 41 from real time computer 40 is applied to code memory 450. Satellite assignment 41 preferably includes the complete 1023-bit sequence which is to be reproduced by C/A code generator 230 as one bit C/A code local model 228. Transferral of this satellite-specific sequence to code memory 450 from real time computer 40 therefore has the desired effect of assigning C/A code generator 230 to GPS satellite 12. Such a transfer must be performed whenever it is desired to begin tracking a satellite with satellite tracking channel 32. Satellite assignment 41 will retained in code memory 450 until a different satellite assignment 41 is received from real time computer 40.

It should be noted that the assignment of other parts of satellite tracking channel 32 to GPS satellite 12 is accomplished by means not involving knowledge and use of the satellite-specific code. In particular, L1 band $f_o$ carrier phase detector 206 and L2 band $f_o$ carrier phase detector 208 in satellite tracking channel 32 are assigned to GPS satellite 12 by application of satellite-specific $f_o$ carrier phase estimate 204, as illustrated in FIG. 6 and FIG. 12 and discussed with reference thereto.

For special purposes, such as for test purposes, special sequences of bit might be transferred to, and stored within, code memory 450. Alternatively, code memory 450 could be configured to retain more than one sequence of bits, and a particular one of these sequences could be selected by means of satellite assignment 41. For example, every possible C/A code sequence, for every GPS satellite, could be permanently contained in code memory 450, and satellite assignment 41 could designate which code was to be read out of code memory 450.

Code memory 450 receives address 460 from settable modulo-1023 counter 452. Address 460 controls the reading of bits from code memory 450. The value of address 460 is the address in code memory 450 of the particular bit in the code sequence which is read out of code memory 450 as one bit C/A code local model 228. The bits are caused to be read out in sequence, one at a time, by repetitively incrementing the value of address 460.

If, as noted above, code memory 450 has been loaded with the 1023-bit sequence corresponding to the C/A code of GPS satellite 12, with successive bits of the sequence stored at successive addresses from zero to 1022 then the proper one bit C/A code local model 228 can be generated by incrementing address 460 in steps of one at a rate of 1,023,000 steps per second. This is done, as shown in FIG. 11, be deriving address 460 from settable modulo-1023 counter 452, which serves as a memory-address counter, and by incrementing settable modulo-1023 counter 452 with $f_o/5$ input 458, from settable modulo-40 counter 454.

$f_o/5$ input 458 has a frequency of $f_o/5$, or 1,023,000 per second, so that address 460 increases at this rate. Settable modulo-1023 counter 452 counts upward until a maximum value of 1022 is reached. After reaching a value of 1022, instead of increasing to 1023, the count returns to zero causing a return to the starting-point of the 1023-bit C/A sequence.

Settable modulo-40 counter 454 receives 8 $f_o$ reference frequency 27 from doubler 25, and divides this frequency by 40 to generate $f_o/5$ input 458 which is applied to settable modulo-1023 counter 452.

The relative timing, that is, the phase of one bit C/A code local model 228 relative to digital real time indication 34 from real time clock 36, is controlled by C/A code group delay estimate TAU$_{est}$ 194 from delay register 842. Millisecond tick 456, included in digital real time indication 34, is a pulse occurring once per millisecond, every time that exactly an integer number of milliseconds is indicated by digital real time indication 34. In other words, millisecond tick 456 marks integer milliseconds.

Millisecond tick 456 is applied to inputs of settable modulo-40 counter 454 and settable modulo-1023 counter 452, which are configured such that each occurrence of millisecond tick 456, marking an integer millisecond according to real time clock 36, causes the current value of C/A code group delay estimate TAU$_{est}$ 194 to be copied into settable modulo-40 counter 454 and settable modulo-1023 counter 452. In other words, millisecond tick 456 enables the setting of settable modulo-40 counter 454 and settable modulo-1023 counter 452, and C/A code group delay estimate TAU$_{est}$ 194 provides the values to which these counters are instantaneously set.

As shown in FIG. 11, and as also shown and discussed with reference to FIG. 13, C/A code group delay estimate TAU$_{est}$ 194 includes 10-bit whole chip group delay estimate 874 from modulo-1023 reversible counter 868, in delay register 842. 10-bit whole chip group delay estimate 874 indicates the whole number of C/A code chips, form zero to 1022, or modulo 1023, which should have been generated by C/A cod generator 230 at the occurrence of millisecond tick 456.

The fraction of a C/A code chip which should have been generated by C/A code generator 230 at the occurrence of millisecond tick 456 is indicated by tenths-of-a-chip delay estimate 872 from 4-bit, modulo-10 counter 866, of modulo-40 counter 860 in delay register 842, and by 2-bit $f_o$ carrier phase estimate 204 from 2-binary-bit, modulo-4, counter 864, of modulo-40 counter 860 in delay register 842. As noted with reference to FIG. 13, $f_o$ carrier phase estimate 204 represents delay in units equivalent to one-quarter cycle of phase at a frequency of 2 $f_o$. These units are also 40$^{ths}$ of a C/A code chip.

As shown in FIG. 11, 10-bit chip group delay estimate 874 is applied to the "value to set" input of settable modulo-1023 counter 452, such that the instantaneous value of 10-bit whole chip group delay estimate 874 will be copied into settable modulo-1023 counter 452 at each occurrence of millisecond tick 456.

Two-bit, $f_o$ carrier phase estimate 204 and, 4-bit estimate 872, which together represent the entire contents of modulo-40 counter 860, are applied together to the "value to set" input of settable modulo-40 counter 454, such that the instantaneous values of $f_o$ carrier phase estimate 204 and 4-bit estimate 872, together representing a fraction of a C/A code chip, will be copied into settable modulo-40 counter 454 at each occurrence of millisecond tick 456.

From one occurrence of millisecond tick 456 to the next, settable modulo-40 counter 454 and settable modulo-1023 counter 452 will increment at exactly uniform rates, of 8 $f_o$ and $f_o/5$, respectively, in accordance with 8 $f_o$ reference frequency 27. Therefore, one bit C/A code local model 228 will be generated at a constant rate, except for discontinuous or "step" adjustments of delay, or code phase, occurring at integer milliseconds in accordance with millisecond tick 456 from digital real time indication 34. It would be more desirable to generate one bit C/A code local model 228 with a smoothly varying rate and phase. However, the discontinuities at the integer milliseconds are minor. The range between antenna 22 and GPS satellite 12 varies typically by less than one meter per millisecond. Each millisecond, the average delay of one bit C/A code local model 228 as generated by C/A code generator 230 will be biased by one-half the amount of the delay discontinuity occurring at the integer millisecond, due to the stepwise nature of the generated delay variation. This bias is conveniently accounted for in the processing of the C/A code group delay observable TAU of the C/A code component of GPS signals 15 by real time computer 40.

FIGURE 12

Referring not to FIG. 12, L1 band $f_o$ carrier phase detector 206 shown in FIG. 6, is disclosed in greater detail. As noted with reference to FIG. 6, L2 band $f_o$ carrier phase detector 208 is identical in operation to L1 band $f_o$ carrier phase detector 206 except that it operates on signals received in the L2 band of frequencies. Phasor counter rotator 240 at the input to L1 band $d_o$ carrier phase detector 206 receives in-phase reconstructed L1 band $f_o$ carrier composite 88 and quadrature phase reconstructed L1 band $f_o$ carrier composite 90 as inputs from L1 band $f_o$ carrier reconstructor and down converter 86 shown in FIG. 3.

As noted above with respect to FIG. 9, the operation of phasor counter rotator 240 is identical to that of phasor counter rotator 220 shown in FIG. 7 except that phasor counter rotator 240 operates on L1 band reconstructed carrier composite phasor 89 while phasor counter rotator 220 operates on complex video phasor 83. L1 band reconstructed carrier composite phasor 89 is the phasor in the complex plane that represents the composite of all the individual, satellite specific L1 band reconstructed $f_o$ phasors such L1 band reconstructed $f_o$ carrier phasor $89_{12}$ from GPS satellite 12.

Phasor counter rotator 240 receives $f_o$ carrier phase estimate 204 from phase and group delay register subsystem 196 as its second input. As noted below with reference to FIG. 13, $f_o$ carrier phase estimate 204 is derived directly from delay register 842, and indirectly from phase register 840, both of which are contained in phase and group delay register subsystem 196. $f_o$ carrier phase estimate 204 is a two bit signal representing only the quadrant of the estimated reconstructed $f_o$ carrier, phase modulo one cycle, at the reconstructed carrier frequency. As noted above, the phase of the reconstructed $f_o$ carrier, that is, the angle of L1 band reconstructed $f_o$ carrier phasor $89_{12}$, is double that of the corresponding $f_o$ carrier which is implicit in complex video signal V, which is a composite of suppressed-carrier, spread-spectrum signals.

As noted above with reference to FIG. 1, implicit in both the L1 and the L2 band portions of the suppressed-carrier, spread-spectrum GPS signals 15, transmitted by GPS satellite 12, is an implicit carrier wave of frequency nominally equal to $f_o$, or 5,115 MegaHertz. $f_o$ is the fundamental frequency which is generated by a frequency standard, not shown, within GPS satellite 12, and which is the basis for the construction of all signals transmitted by GPS satellite 12. The actual frequency of this implicit carrier may of course deviate from exactly $f_o$, depending on the accuracy of the satellite's frequency standard. The deviation of the actual implicit carrier frequency from exactly $f_o$ is normally less than about 0.05 Hertz, or about 1 part in $10^8$ of $f_o$.

Spread-spectrum GPS signals 15 from GPS satellite 12 received by antenna 22 and fed to receiver 24, as discussed with reference to FIG. 2 and FIG. 3, have been delayed and Doppler-shifted as a result of the relative position and velocity of the antenna in GPS satellite 12, not shown, with respect to antenna 22. The phases $PSI_{L1}$ and $PSI_{L2}$, of the $f_o$ carriers implicit in the L1 and L2 bands of GPS signals 15, as received, reflect the group delays of the signal received in the respective bands. L1 band $f_o$ carrier phase detector 206 and L2 band $f_o$ carrier phase detector 208 measure $PSI_{L1}$ and $PSI_{L2}$, respectively. The Doppler frequency shifts of the $f_o$ carriers implicit in both the L1 and the L2 bands of GPS signals 15, as received, vary between plus and minus 15 Hertz as the satellite rises, traverses the sky, and sets. Expressed as a fraction of $f_o$, this Doppler frequency shift is between about plus and minus 3 parts in $10^6$. Thus, the typical Doppler frequency shift is of the order of two orders of magnitude greater than the $f_o$ carrier frequency deviation normally due to offset of the frequency standard within GPS satellite 12.

The radio frequency to video frequency down-conversion performed within radio frequency to video frequency down converter 76, shown in FIG. 3, does not alter the frequency of the $f_o$ carrier implicit in GPS signals 15, as received, not does this frequency down-conversion alter the spread-spectrum nature of these signals. Complex video signal V, whose real and imaginary parts are in-phase video signal 82 and quadrature video signal 84, as shown in FIG. 3, is a composite of the spread-spectrum signals received from all visible satellites. In complex video signal V, the spread-spectrum component of GPS signals 15 has an implicit carrier of frequency near $f_o$, shifted by between plus and minus 15 Hertz due mainly to the Doppler effect, as noted above.

The spread-spectrum components of complex video signal V coming from satellite other than GPS satellite 12 have implicit carrier frequencies which also are near $f_o$, but which are shifted by different amounts reflecting the different satellite motions with respect to antenna 22, and reflecting as well any differences between the offsets of the frequency standards in the different satellites.

The differences between the frequencies of the $f_o$ carriers implicit in the signals received from different GPS satellites are utilized within L1 band $f_o$ carrier phase detector 206 and within L2 band $f_o$ carrier phase detector 208 to separate the signals received from GPS satellite 12 from the signals received from different satellites. As noted with reference to FIG. 2, an individual satellite tracking channel 32 within terminal 23 is assigned to each satellite. Within satellite tracking channel 32 assigned to GPS satellite 12, as shown in FIG. 6, L1 band $f_o$ carrier phase detector 206 and L2 band $f_o$ carrier phase detector 208 receive satellite-specific $f_o$ carrier phase estimate 204, a prediction of the time-varying phase of the $f_o$ carriers implicit in this particular satellite's L1 and L2 band signals. The time-rate-of-change of $f_o$ carrier phase estimate 204 represents the predicted frequency shift of the $f_o$ carriers implicit in the signals being received from GPS satellite 12.

$f_o$ carrier phase estimate 204 is applied to both L1 band $f_o$ carrier phase detector 206 and L2 band $f_o$ carrier phase detector 208, because theoretically the same $f_o$ carrier frequency shifts should be observed in both bands, except for the presence of any time-varying dispersive effects in the signal propagation paths. Small dispersive effects are in fact present, due to the ionosphere and due to multipath. However, in the present context, these effects are normally insignificant.

As noted below with reference to FIG. 13, $f_o$ carrier phase estimate 204, and thus the frequency prediction which is used within L1 band $f_o$ carrier phase detector 206 to distinguish the signal of GPS satellite 12 from the signals of other satellites, is derived within phase and group delay register subsystem 196 from continuously updated 30-bit C/A code group delay estimate $TAU_{est}$ 876 contained in delay register 842. The reason for deriving $f_o$ carrier phase estimate 204 from the 30-bit C/A code group delay estimate $TAU_{est}$ 876 is that the time-variation of the L1 $f_o$ carrier phase $PSI_{L1}$ is similar to that of the group delay of the C/A code modulation of the L1 signal from the same satellite. That is, the C/A code group delay variation, multiplied by the implicit carrier frequency $f_o$, should approximate the implicit carrier phase variation. The necessary multiplication of the delay by the implicit carrier frequency $f_o$ is accomplished conveniently by tapping the appropriate stage in the chain of appropriate counters, or dividers, which form delay register 842, as shown and discussed in detail with reference to FIG. 13.

Referring again to FIG. 3, complex video V from L1 radio frequency to video frequency down converter 76 is applied to L1 band $f_o$ carrier reconstruction and down converter 86, wherein two basic operations are performed. As discussed with reference to FIG. 5, the first basic operation performed within L1 band $f_o$ carrier reconstruction and down converter 86 is to reconstruct, from complex video signal V, complex L1 band reconstructed $f_o$ carrier composite S(L1) which is a composite of continuous-wave components, called reconstructed carriers, representing the L1 $f_o$ implicit carrier waves. A second composite of continuous-wave components first appears at the output of mixer 150, shown in FIG. 5, wherein separate spectral components of complex video signal V are mixed together.

The phases and frequencies of the reconstructed carriers in this second composite are related to the phases and frequencies of the respective implicit carriers of the respective spread-spectrum signal components received from the respective satellites. Each reconstructed carrier has double the phase and double the frequency of the respective implicit carrier. Because of the frequency doubling, narrow bandpass filter 152, shown in FIG. 5, is centered at 2 $f_o$ rather than $f_o$. As mentioned with reference to FIG. 5, in order to reduce the speed requirements of subsequent signal-processing circuitry, the reconstructed carriers in second composite signal 154 of narrow bandpass filter 152 are the down converted, from the narrow band of frequencies centered at 2 $f_o$, to a narrow band centered at zero frequency. This down conversion yields complex L1 band reconstructed $f_o$ carrier composite S(L1), whose real and imaginary parts are respectively, in-phase reconstructed L1 band $f_o$ carrier composite 88, and quadrature phase reconstructed L1 band $f_o$ carrier composite 90.

The frequency shifts of the $f_o$ implicit carriers due to the Doppler effect and to any satellite frequency-standard offsets relative to frequency standard 28 of terminal 23, shown in FIG. 2, but doubled, are preserved in the down conversion operation performed within L1 band $f_o$ carrier reconstruction and down converter 86. The effect of this down conversion is to subtract the constant 2 $f_o$ reference frequency and phase of local oscillator reference input 160, shown in FIG. 5, from the respective frequencies and phases of the reconstructed carriers.

As shown in FIG. 2 and FIG. 3, the down-converted in-phase reconstructed L1 band $f_o$ carrier composite 88 and quadrature phase reconstructed L1 band $f_o$ carrier composite 90 are included in the set of low frequency signals 30 which is input to every one of the several identical satellite tracking channels like satellite tracking channel 32, shown in FIG. 6. As noted above, within satellite tracking channel 32, which is assigned to GPS satellite 12, L1 band $f_o$ carrier phase detector 206 selects the particular reconstructed carrier signal from GPS satellite 12 by use of the satellite-specific frequency prediction generated by phase and group delay register subsystem 196, and represented by the time-rate-of change of $f_o$ carrier phase estimate 204.

Referring now to FIG. 12, L1 band $f_o$ carrier phase detector 206 compares phase observable $PSI_{L1}$ of GPS satellite 12's L1 band $f_o$ carrier to $f_o$ residual phase estimate 204, and yields L1 $f_o$ carrier phase measurement 210. In like manner, L2 band $f_o$ carrier phase detector 208 compares phase observable $PSI_{L2}$, of GPS satellite 12's L2 band $f_o$ carrier to $f_o$ carrier phase estimate 204, and yields L2 $f_o$ residual phase measurement 212, Since both the L1- and the L2-related $f_o$ residual phase measurements are determined with respect to the same $f_o$ carrier phase estimate 204, any errors in this estimate will be reflected in common in both the L1- and the L2-related $f_o$ residual phase measurements. Therefore, the difference between the L1- and the L2-related $f_o$ residual phase measurements will be insensitive to errors in $f_o$ carrier phase estimate 204. This insensitivity is important because the difference between the L1- and the L2-related $f_o$ residual phase measurement for each satellite is used by real time computer 40 to determine the amount of ionosphere delay and phase shift of the satellite's signals, in order to determine position information without loss of accuracy due to ionospheric effects.

Because local oscillator reference input 160 used in the down-conversion performed in reconstructor and down converter 86 to generate S(L1) applied to L1 band $f_o$ carrier L1 band $f_o$ carrier phase detector 206 is derived from the same 4 $f_o$ reference signal 26 from the same frequency standard 28 in terminal 23, as is used in L2 band $f_o$ carrier reconstructor and down converter 96 to generate S(L2) applied to L2 band $f_o$ carrier phase detector 208, any phase or frequency variations of frequency standard 28 will also be reflected equally in both L1 $f_o$ residual phase measurement 210 and L2 $f_o$ residual phase measurement 212. Thus, the difference between the L1- and the L2-related $f_o$ residual phase measurements is also insensitive to phase and frequency variations of frequency standard 28. The insensitivity is also important for determining accurately the amount of ionospheric delay and phase shift of the satellite's signals, in order to determine position information without loss of accuracy due to ionospheric effects.

It may readily be understood that, for the same reason, antenna 22 and terminal 23 should be constructed and arranged generally such that any source of error affecting L1 $f_o$ residual phase measurement 210 will tend to affect L2 $f_o$ residual phase measurement 212 equally. For like reasons, the entire system shown in FIG. 1 for determining position should also be constructed and arranged such that any source of error affecting any measurement of any satellite's signals will tend to affect corresponding measurements of all other satellite's signals equally.

Referring again to FIG. 12, in-phase reconstructed L1 band $f_o$ carrier composite 88 and quadrature phase reconstructed L1 band $f_o$ carrier composite 90 are applied as inputs to phasor counter rotator 240 at one input of L1 band $f_o$ carrier phase detector 206. In addition, $f_o$ carrier phase estimate 204 is applied to the other input of phasor counter rotator 240. In a manner similar to that employed by phasor counter rotator 220 shown in FIG. 7, phasor counter rotator 240 serves to subtract a phase, in this case $f_o$ carrier phase estimate 204, from complex L1 band reconstructed $f_o$ carrier composite $S_{(L1)}$.

As explained with reference to FIG. 8, the manner of phase subtraction may be understood as a counter-rotation of L1 band reconstructed carrier composite phasor 89, representing complex L1 band reconstructed $f_o$ carrier composite $S_{(L1)}$. In the complex $f_o$ carrier reconstructed $f_o$ carrier composite $S_{(L1)}$, L1 band reconstructed carrier composite phasor 89 is rotated clockwise, or "unwound", by an angle equal to $f_o$ carrier phase estimate 204. However, as previously noted with respect to phasor counter rotator 220, only two bits are used to represent each phasor, and the output of phasor counter rotator 240 is just a pair of one bit digital signals, in-phase wound reconstructed $f_o$ carrier residual phase 244 and quadrature unwound reconstructed $f_o$ carrier residual phase 246, which taken together indicate only the quadrant of the unwound complex composite reconstructed carrier residual phase signal.

This two-bit quadrant indication may seem too crude, in view of the position-determination accuracy which may be desired. The phase quantization, of one-quarter cycle, corresponds to distance quantization of one quarter of the wavelength of a radio wave of frequency equal to the reconstructed carrier frequency, $2 f_o$, or about 10 MegaHertz. Thus, the distance quantization is about 7.5 meters, and the RMS quantization error, given by the quantization level divided by the square root of 12, is about 2 meters. It is important to note, however, that this level of quantization pertains only to the instantaneous value of the phase.

As will be described below, measurements of $f_o$ carrier phase observables $PSI_{L1}$ by L1 band $f_o$ carrier phase detector 206 and $PSI_{L2}$ by L2 band $f_o$ carrier phase detector 28 result from relatively long integrations of the unwound reconstructed carrier residual phase signals, preferably over time intervals of about 100 seconds. During such a long time interval, $f_o$ carrier phase estimate 204 varies typically by very many cycles of phase, and the variation is quite non uniform due to the accelerations of GPS satellite 12 and antenna 22. $f_o$ carrier phase estimate 204 rotates through a full cycle, or four quadrants, for every 30-meter change in the distance between GPS satellite 12 and antenna 22.

The projection of the orbital velocity of GPS satellite 12 along the line of sight to antenna 22 is typically several hundred meters per second, and typically changes at a rate of the order of 0.1 meter per second. Any acceleration of antenna 22 will of course also contribute. Thus, the error associated with quantization tends to be averaged over a rather large number of quarter-cycle phase steps during the course of each 100-second integration, so that the quantization noise remaining in the phase measurement is likely to be negligible.

It is also important for the reduction of quantization error in L1 band $f_o$ carrier detector 206 and L2 band $f_o$ carrier phase detector 208 that the signal-to-noise ratio of in-phase reconstructed L1 band $f_o$ carrier composite 88 and quadrature phase reconstructed L1 band $f_o$ carrier composite 90 is extremely low. The large amount of noise in these signals acts to "dither" or smear out the quantization.

As noted above, phasor counter rotator 240 subtracts from complex L1 band reconstructed $f_o$ carrier composite $S_{(L1)}$ an amount of phase equal to the current estimate of the phase of the selected satellite's component, in order to permit selection of that reconstructed carrier component from the complex L1 band reconstructed $f_o$ carrier composite $S_{(L1)}$. By virtue of this essentially continuous phase subtraction, the phase of the selected satellite's reconstructed carrier component in the unwound complex output of phasor counter rotator 240 will be virtually stationary. Therefore, a long time-integration of the unwound complex output of phasor counter rotator 240 may be employed to select the desired signal and to reject noise and signals from other satellites. Other satellites' signals will be rejected because their unwound phasors will still rotate during the integration time interval. The counter rotation performed by phasor counter rotator 240 will not have made their phasors stationary because $f_o$ carrier phase estimate 204 was not derived for them and they have different frequency shifts.

To effect this satellite selection process, in-phase unwound reconstructed $f_o$ carrier residual phase 244 and quadrature unwound reconstructed $f_o$ carrier residual phase 246 from phasor counter rotator 240 are applied as inputs to in-phase integrator 248 and quadrature integrator 250. In-phase integrator 248 and quadrature integrator 250 may be constructed in the same manner as 0.01 second integrators 324 and 328 shown in FIG. 10 except that their integration period is set to 100 seconds, rather than 0.01 seconds. Also, since the bandwidths of the signals processed in L1 band $f_o$ carrier phase detector 206 are so much smaller than those involved in correlator 226, it is possible to use logic circuits in phasor counter rotator 240, in-phase integrator 248, and quadrature integrator 250 which are clocked at a correspondingly slower rate.

There are two reasons for the use of an extended integration period in L1 band $f_o$ carrier phase detector 206. First, as noted, the signal to noise ratio between the reconstructed $f_o$ carrier signals in complex L1 band reconstructed $f_o$ carrier composite $S(L1)$ and the background noise is much lower than the signal to noise ratio of the 308 $f_o$ carrier signals reconstructed in mixers 302 and 308 in on-time signal detector 350 shown in FIG. 10, because the latter signals are greatly amplified by correlation with the matching local model of the satellite-specific C/A code.

The lower signal to noise ratio in complex L1 band reconstructed $f_o$ carrier composite $S(L1)$ results from the fact that the carrier reconstruction performed by L1 band $f_o$ carrier reconstruction and down converter 86 is accomplished without the benefit of knowledge or use of the code associated with that carrier. The longer integration period used in in-phase integrator 248 and quadrature integrator 250 improves the effective signal to noise ratio by reducing the noise equivalent bandwidth to 0.01 Hertz. In other words, noise which is present in in-phase unwound reconstructed $f_o$ carrier residual phase 244 and quadrature unwound reconstructed $f_o$ carrier residual phase 246 with frequencies differing by more than about 0.01 Hertz from the frequency of the selected reconstructed carrier will be attenuated by the integration.

An equally important reason for the extended integration period used in L1 band $f_o$ carrier phase detector 206 is to reject the reconstructed $f_o$ carrier signals from the other GPS satellites not tracked by this particular satellite tracking channel 32. As noted above, the Doppler shifts of the reconstructed $f_o$ carrier signals from the various GPS satellites generally differ within a range of plus and minus 30 Hertz. $f_o$ carrier phase estimate 204 applied to phasor counter rotator 240 changes with time at a rate which reflects the Doppler shift of GPS satellite 12, to which satellite tracking channel 32 is assigned.

The Doppler shift of any particular 2 $f_o$ reconstructed carrier signal is equal to the frequency 2 $f_o$ multiplied by the time derivative of C/A code group delay observable TAU. As 30-bit C/A code group delay estimate TAU$_{est}$ 876 contained in delay register 842 changes, so does $f_o$ carrier phase estimate 204 which is subtracted from complex L1 band reconstructed $f_o$ carrier composite $S_{(L1)}$.

In this manner it can be seen that phasor counter rotator 240 applies a frequency shift to complex L1 band reconstructed $f_o$ carrier composite $S_{(L1)}$ equal in magnitude and opposite in sign to the Doppler shift peculiar to GPS satellite 12 at that instant of time, subject only to the accuracy of $f_o$ carrier phase estimate 204.

Therefore the rotation of GPS satellite 12's L1 band reconstructed $f_o$ carrier phasor, as indicated by phasor counter rotator 240's one-bit outputs in-phase unwound reconstructed $f_o$ carrier 244 and quadrature unwound reconstructed $f_o$ carrier residual phase 246, will have been virtually stopped, while the reconstructed $f_o$ carrier phasors from other GPS satellites will continue to rotate. Their rates of rotation will equal the difference between their frequency shifts and the frequency of $f_o$ carrier phase estimate 204.

The filter bandwidth effectively obtained by the 100 second integration, as noted above, is about 0.01 Hertz. This value is approximately 1/3000th of the maximum magnitude of Doppler shift of about 30 Hertz. Therefore, most of the time, only the desired L1 band reconstructed $f_o$ carrier component will be within the passband of the 0.01 Hertz bandwidth filter which is formed by in-phase integrator 248 and quadrature integrator 250.

Occasionally, of course, another satellite's reconstructed $f_o$ carrier will be found to have the same Doppler shift, within 0.01 Hertz, as that of GPS satellite 12. However, these occasions are infrequent and the Doppler shifts of two different satellites will not remain equal within 0.01 Hertz for very long time. In particular, it is important that the Doppler shifts of two different satellites generally do not remain equal within 0.01 Hertz for as long as 100 seconds. Therefore, the L1 band reconstructed $f_o$ carrier component from GPS satellite 12 will indeed be selected, and any other satellite's signal will be rejected, by the 100 second integrations performed by in-phase integrator 248 and quadrature integrator 250.

In-phase integrator output 252 and quadrature integrator output 254 may be regarded as the real and imaginary parts, respectively, of a complex number whose angle is the desired measurement of L1 $f_o$ carrier residual phase. In order to determine this phase, in-phase integrator output 252 and quadrature integrator output 254 are input to four-quadrant inverse tangent generator 256, whose output is L1 $f_o$ carrier residual phase measurement 210. Four-quadrant inverse tangent generator 256 may be constructed like, and may operate in almost the same manner as, two quadrant inverse tangent function generator 334 shown in FIG. 10.

Four-quadrant inverse tangent generator 256 generates L1 $f_o$ carrier residual phase measurement 210 equal to the angle in the range minus one-half to plus one-half cycle, whose sine is $$Q/(I^2+Q^2)^{\frac{1}{2}},$$

whose cosine is $$I/(I^2+Q^2)^{\frac{1}{2}},$$

and whose tangent is Q/T, where I is in-phase integrator output 252 and Q is quadrature integrator output 254 as shown in FIG. 12. Note that this inverse tangent function generator yields a result with a four-quadrant, or one-cycle range, whereas the inverse tangent generation performed by two quadrant inverse tangent function generator 334 shown in FIG. 10 yields a result with a two-quadrant, or one-half cycle range. In four-quadrant inverse tangent generator 256 a four-quadrant inverse tangent function generation is useful and preferable because the reconstructed $f_o$ carrier residual phase component present in in-phase integrator output 252 and quadrature integrator output 254 does not have phase reversals due to telemetry modulation. However, since the phase of the $f_o$ carrier implicit in the in-phase reconstructed L1 band $f_o$ carrier composite 88 and quadrature phase reconstructed L1 band $f_o$ carrier composite 90 input to L1 band $f_o$ carrier phase detector 206 was doubled by the carrier reconstruction operation performed by L1 band $f_o$ carrier residual phase detector 206, L1 $f_o$ carrier phase measurement 210 from four-quadrant inverse tangent generator 256 represents the phase of the $f_o$ implicit carrier uniquely modulo 0.5 cycle.

FIGURE 13

Referring now to FIG. 13, phase and group delay register subsystem 196 discussed above with respect to FIG. 6 is shown in detail. Because phase and group delay register subsystem 196 is at the heart of the operation of terminal 23, a review of the manner of interaction between phase and group delay register subsystem 196, and other portions of terminal 23, will be helpful for a clear understanding of the instant invention.

As noted above with respect to FIG. 6, phase and group delay register subsystem 196 performs a major portion of the operation of satellite tracking channel 32. Within satellite tracking channel 32, the phase and delays inherent in GPS signals 15 from GPS satellite 12 are tracked. Phase and delay measurements 202, included within measurements 42, are generated by phase and group delay register subsystem 196 and applied to real time computer 40. Phase and group delay register subsystem 196 receives, included within estimate 38, group delay initial value 37 and frequency estimate 39, from real time computer 40.

Phase and group delay register subsystem 196 also generates 308 $f_o$ carrier phase estimate PHI$_{est}$ 192 and C/A code group delay estimate TAU$_{est}$ 194 which are applied as inputs to 308 $f_o$ carrier phase and C/A code delay error detector 190.

As noted above with respect to FIG. 9, 308 $f_o$ carrier phase estimate PHI$_{est}$ 192 is a modulo one cycle estimate of phase. Half-cycle bit 812 and quarter-cycle bit 814 taken together indicate only the quadrant of 308 $f_o$ carrier phase estimate PHI$_{est}$ 192.

Similarly, C/A code group delay estimate TAU$_{est}$ 194 is modulo one millisecond, that is, one period of the C/A code function. Thus C/A code group delay estimate TAU$_{est}$ 194 provides only the fractional-period part of the group delay estimate to 308 f$_o$ carrier phase and C/A code delay error detector 190.

308 f$_o$ carrier phase and C/A code delay error detector 190 determines the difference between 308 f$_o$ implicit carrier phase observable PHI and 308 f$_o$ carrier phase estimate PHI$_{est}$ 192, modulo one-half cycle, and generates phase error signal 198. Similarly, 308 f$_o$ carrier phase and C/A code delay error detector 190 detects the difference between C/A code group delay observable TAU and C/A code group delay estimate TAU$_{est}$ 194, modulo one millisecond, and generates delay error signal 200.

Phase error signal 198 and delay error signal 200 are applied to phase and group delay register subsystem 196 to form both a phase-tracking feedback loop, that is, a phase-locked loop, and a delay-tracking feedback loop, that is, a delay-locked loop.

As noted in greater detail with respect to FIG. 7, in-phase video signal 82 and quadrature video signal 84, represented by complex video phasor 83, are correlated with 308 f$_o$ carrier phase estimate PHI$_{est}$ 192 by phasor counter rotator 220 to generate unwound complex video signal U, represented by unwound complex video phasor 223, which is then cross-correlated in correlator 226 with one bit C/A code local model 228 to produce phase error signal 198. One bit C/A code local model 228, which is specific to GPS satellite 12, is generated by C/A code generator 230 with the appropriate delay under the control of C/A code group delay estimate TAU$_{est}$ 194.

Referring again now to FIG. 6, phase and group delay register subsystem 196 also provides f$_o$ carrier phase estimate 204 to L1 band f$_o$ carrier phase detector 206 and L2 band f$_o$ carrier phase detector 208. f$_o$ carrier phase estimate 204 is modulo one-half cycle of oscillation of f$_o$, that is, one cycle at 2 f$_o$, and has a two-bit digital form similar to 308 f$_o$ carrier phase estimate PHI$_{est}$ 192. f$_o$ carrier phase estimate 204 provides L1 band f$_o$ carrier phase detector 206 and L2 band f$_o$ carrier phase detector 208 with an estimate of the quadrant of L1 band reconstructed f$_o$ carrier phasor 89$_{12}$, shown in FIG. 8D.

L1 band f$_o$ carrier phase detector 206 generates L1 f$_o$ carrier residual phase measurement 210 equal to the difference, averaged over 100 seconds, and modulo one-half cycle, between L1 band implicit f$_o$ carrier phase observable PSI$_{L1}$, implicit in the L1 band portion of GPS signals 15 from GPS satellite 12, and f$_o$ carrier phase estimate 204. Similarly, L2 band f$_o$ carrier phase detector 208 generates L2 f$_o$ carrier residual phase measurement 212 equal to the difference, modulo one-half cycle, between L2 band implicit f$_o$ carrier phase observable PSI$_{L2}$, implicit in the L2 band portion of GPS signals 15 from GPS satellite 12, and f$_o$ carrier phase estimate 204.

Referring now to FIG. 13, phase and group delay register subsystem 196 is shown in greater detail. Phase and group delay register subsystem 196 includes two major subsystems, phase register 840 and delay register 842.

Phase register 840 is divided into two parts, phase register lower part 844 and phase register upper part 846. Phase register 840 contains 48-bit, binary 308 f$_o$ carrier phase estimate PHI$_{est}$ 856, which includes 16 least significant bit phase estimate 852 generated by, or contained in, phase register lower part 844 and 32 most significant bit phase estimate 854 generated by, or contained in, phase register upper part 846. Most significant bit (MSB) 848, generated by, or contained in, phase register lower part 844 represents one-quarter of one cycle of 308 f$_o$ implicit carrier phase observable PHI. Least significant bit (LSB) 850, generated by or contained in phase register upper part 846 represents one-half of one cycle of 308 f$_o$ implicit carrier phase observable PHI.

Phase register upper part 846 generates half-cycle bit 812, applied to phasor counter rotator 220 shown in FIG. 9, equal to least significant bit (LSB) 850. Similarly, phase register lower part 844 generates quarter-cycle bit 814, applied to phasor counter rotator 220, equal to most significant bit (MSB) 848.

Delay register 842 is configured from three cascaded, reversible, up-down, counters: modulo-77 counter 858, modulo-40 counter 860, and modulo-130944 counter 862. Thus delay register 842, unlike phase register 840, may not be regarded as one binary-numerical register. Rather, delay register 842 contains a mixed-base numerical representation of C/A code group delay estimate TAU$_{est}$ 876 including f$_o$ carrier phase estimate 204 and C/A code group delay estimate TAU$_{est}$ 194.

Modulo-77 counter 858 within delay register 842 contains a 7-bit number in the range zero to 76 (decimal), representing group delay in units of one-half period of oscillation at a frequency of 308 f$_o$. Thus, modulo-77 counter 858 contains values of group delay expressed in units equivalent to the phase unit of least significant bit (LSB) 850 of phase register upper part 846. These units are equivalent in the sense that each represents a change in position equal to one-half wavelength of a radio signal of frequency equal to 308 f$_o$, travelling in a vacuum.

Modulo-40 counter 80 within delay register 842 contains a 6-bit number in the range zero to 39 (decimal), representing group delay in units equivalent to 77 half-periods of oscillation at a frequency of 308 f$_o$, which are the same as units of one-fourth of one period of oscillation at a frequency of 2 f$_o$.

Modulo-40 counter 860 is configured from two cascaded stages: 2-binary-bit, modulo-4, counter 864 which serves as the input stage; and 4-bit, modulo-10 counter 866 which serves as the following stage.

2-binary-bit, modulo-4, counter 864 within modulo-40 counter 860 generates, or contains, 2-bit f$_o$ carrier phase estimate 204 in the range zero to 3 (decimal) representing group delay in units of one-fourth of one period of oscillation at a frequency of 2 f$_o$. As noted above with respect to FIG. 6, 2-bit f$_o$ carrier phase estimate 204 is applied to L1 band f$_o$ carrier phase detector 206 and L2 band f$_o$ carrier phase detector 208.

Note that f$_o$ carrier phase estimate 204 is derived directly from C/A code group delay estimate TAU$_{est}$ 876, not from 308 f$_o$ carrier estimate PHI$_{est}$ 856. This is done because the time-variations of the f$_o$ implicit carrier phases are expected to mimic those of C/A code group delay observable TAU more closely than those of 308 f$_o$ implicit carrier phase observable PHI. It would be possible to use 308 f$_o$ carrier phase estimate PHI$_{est}$ 856 instead or in addition as the basis for deriving f$_o$ carrier phase estimate 204, if desired.

4-bit, modulo-10 counter 866 within modulo-40 counter 860 generates, or contains, 4-bit estimate 872 in the range zero to 9 (decimal) representing group delay in units of one period of oscillation at a frequency of 2 $f_o$. This unit of group delay is also equal to one chip width of the P-code modulation, and therefore to one-tenth of one chip width of the C/A code modulation. As noted above with respect to FIG. 11, 2-bit $f_o$ carrier phase estimate 204 and 4-bit estimate 872 are applied to C/A code generator 230, as parts of C/A code group delay estimate $TAU_{est}$ 194.

Modulo-130944 counter 862 is configured from two cascaded stages: 10-binary-bit, modulo-1023 reversible counter 868 which serves as the first stage; and 7-bit, modulo-128 reversible counter 870 which serves as the second stage.

10-binary-bit, modulo-1023 reversible counter 868 within modulo-130944 counter 862 generates, or contains, 10-bit whole chip group delay estimates 874 in the range zero to 1022 (decimal), representing group delay in units of whole chips of the C/A code modulation. 10-bit whole chip group delay estimate 874, 4-bit estimate 872 from 4-bit, modulo-10 counter 866, and $f_o$ carrier phase estimate 204 together form C/A code group delay estimate $TAU_{est}$ 194. 7-bit modulo-128 reversible counter 870, generates, or contains, a number in the range zero to 127 (decimal), representing delay in units of one millisecond, which is the period of the C/A code.

Before delay-locked tracking of GPS signals 15 from GPS satellite 12 begins, a program is executed by real time computer 40 to compute group delay initial value 37 which is applied to modulo-130944 counter 862 based on external information 44, as shown in FIG. 2. If external information 44 is uncertain, or unavailable, a series of trial values of group delay initial value 37 may be formed by real time computer 40. Group delay initial value 37 is applied to 10-binary-bit, modulo-1023 reversible counter 868 as well as modulo-128 reversible counter 870 within modulo-130944 counter 862. Note that the least significant bit of group delay initial value 37 represents one chip of C/A code. This precision is sufficient to enable detection of the satellite signal by 308 $f_o$ carrier phase and C/A code delay error detector 190. This precision, being much finer than the repetition period of the C/A code, is also sufficient to prevent integer-period ambiguity in the interpretation of the delay.

30-bit C/A code group delay estimate $TAU_{est}$ 876 is applied to real time computer 40 and includes the 7-bit contents of modulo-77 counter 858, the 6-bit contents of modulo-40 counter 860 and the 17-bit contents of modulo-130944 counter 862. The total value of 30-bit C/A code group delay estimate $TAU_{est}$ 876 is equal to the sum of the numbers contained in each stage of each counter in delay register 842, each multiplied by the respective unit of delay. The total value of 30-bit C/A code group delay estimate $TAU_{est}$ 876 is thus in the range of zero to 128 milliseconds, and has a numerical precision of approximately 0.3 nanoseconds, the delay unit of modulo-77 counter 858. Of course, the instantaneous value of 30-bit C/A code group delay estimate $TAU_{est}$ 876 will differ from C/A code group delay observable TAU by more than 0.3 nanoseconds, due to noise, multipath interference, etc.

The contents of delay register 842, that is, the value of 30-bit C/A code group delay estimate $TAU_{est}$ 876, may be altered, otherwise than through initialization by real time computer 40, by delay register increment 878 for OR gate 890 and by delay register decrement 880 from OR gate 892, both of which are applied to modulo-77 counter 858. Delay register increment 878 increases the value in modulo-77 counter 858 by one and delay register decrement 880 decreases the value in modulo-77 counter 858 by one.

If delay register increment 878 is received by modulo-77 counter 858 while the value contained in modulo-77 counter 858 is equal to 76, then the value will change to zero, and modulo-77 counter 858 will generate overflow signal 882 which is applied to module-40 counter 80 causing the value in modulo-40 counter 860 to be incremented by one. If delay register decrement 880 is received by modulo-77 counter 858 while the value in modulo-77 counter 858 is equal to zero, then the value will change to 76, and modulo-77 counter 858 will generate underflow signal 884 which is applied to modulo-40 counter 860 causing the value in modulo-40 counter 860 to be decremented by one.

In the same manner, modulo-40 counter 860 generates overflow signal 886 and underflow signal 888 which are applied to increment and decrement, respectively, the count in modulo-130944 counter 862. In normal operation, modulo-130944 counter 862 will not overflow or underflow.

OR gate 890 generates delay register increment 878 in response to either delay register incrementing signal 414 within delay error signal 200 or phase adder carry signal 894 from phase adder 898. Similarly, OR gate 892 generates delay register decrement 880 in response to either delay register decrementing signal 418 within delay error signal 200 or phase adder borrow signal 896 from phase adder 898.

Delay error signal 200 is generated by correlator 226 as shown in FIG. 10 to indicate the sign of the difference between C/A code group delay observable TAU and C/A code group N delay estimate $TAU_{est}$ 194, that is, whether the energy detected by early signal detector 352 is greater or less than the energy detected by late signal detector 358. Delay register incrementing signal 414, within delay error signal 200, indicates that 30-bit C/A code group delay estimate $TAU_{est}$ 876 should be increased to better correspond to C/A code group delay observable TAU, while delay register decrementing signal 418 indicates that 30-bit C/A code group delay estimate $TAU_{est}$ 876 should be decreased to better correspond to C/A code group delay observable TAU.

Phase adder 898 generates phase adder carry signal 894, which is applied to one input of OR gate 890 and the increment input register upper part 846, and phase adder borrow signal 896, which is applied to one input of OR gate 892 and the decrement input of phase register upper part 846, in response to the sum of its three inputs: phase error signal 198 from two quadrant inverse tangent function generator 334, 16 least significant bit phase estimate 852 from phase register lower part 844 and carrier frequency register output 900. Phase adder 898 adds together at least two of these three 16-bit binary numbers 110,000 times per second in response to a timing signal included in digital real time indication 34 from real time clock 36.

Phase adder 898 receives phase error signal 198 only at time intervals, according to digital real time indication 34 from real time clock 36, which are integer multiples of 0.01 second. As discussed with reference to FIG. 11, phase error signal 198 is available only at such time intervals, and then only if on-time signal energy indication 348 exceeds threshold value 406, so that above threshold indication 410 is TRUE, indicating that a valid phase error measurement was possible.

Phase adder 898 receives 16 least significant bit phase estimate 852 from phase register lower part 844 precisely 110,000 times per second, at uniformly spaced time intervals according to digital real time indication 34. Phase adder 898 also receives carrier frequency register output 900 from 16-bit frequency register 902, precisely 110,000 times per second, at uniformly spaced time intervals according to digital real time indication 34.

Carrier frequency register output 900 is also applied to real time computer 40 as part of phase and delay measurements 202.

Thus, 109,900 times per second, phase adder 898 may receive and add together just two numbers, 16 least significant bit phase estimate 852 and carrier frequency register output 900; and 100 times per second, phase adder 898 may receive and add together three numbers, including phase error signal 198. At an invariable rate of 110,000 times per second, phase adder 898 yields 16-bit phase sum 904 and, if appropriate, phase adder carry signal 894 or phase adder borrow signal 896. Phase adder carry signal 894 signifies that the addition by phase adder 898 produced a sum which overflowed 16 bits, and phase adder borrow signal 896 signifies that the addition produced a sum which underflowed 16 bits.

16-bit phase sum 904 is generated 110,000 times per second and is applied, each time, to phase register lower part 844 to replace the contents thereof. 16-bit phase sum 904 always includes a contribution from 16 least significant bit phase estimate 852 and carrier frequency register output 900, and may include phase error signal 198. Whenever phase adder carry signal 894 is generated by phase adder 898, phase register upper part 846 is incremented by one. Whenever phase adder borrow signal 896 is generated, phase register upper part 846 is decremented by one. As noted above, phase adder carry signal 894 is also applied to OR gate 890 to increment delay register 842 and phase adder borrow signal 896 is also applied to OR gate 892 to decrement delay register 842.

16-bit frequency register 902 receives frequency sum 906 from frequency adder 908 100 times per second and replaces its contents with frequency sum 906 at this rate.

Frequency adder 908 may receive three 16-bit binary number inputs, carrier frequency register output 900 from 16-bit frequency register 902; phase error signal 198 from two quadrant inverse tangent function generator 334; and frequency estimate 39 from real time computer 40.

The inclusion of phase error signal 198 in the inputs to frequency adder 908 tends to improve the dynamic behavior of the phase-locked loop formed by 308 $f_o$ carrier phase and C/A code delay error detector 190 and phase and group delay register subsystem 196 discussed with reference to FIG. 6. Phase error signal 198 must be properly scaled before inclusion in frequency adder 908.

Frequency estimate 39 is included in the inputs to frequency adder 908 for two distinct purposes, initialization and satellite loss.

Frequency estimate 39 is required in frequency adder 908 during initialization so that the signal from GPS satellite 12 may be acquired before the phase locked loop has begun to track 308 $f_o$ implicit carrier phase observable PHI. As noted above with respect to FIG. 10, 0.01 second integrators 324 and 328 is correlator 226 have an effective bandwidth of about 100 Hertz. In phase unwound video signal 222 and quadrature unwound video signal 224 applied to correlator 226 must therefore be accurately generated by phasor counter rotator 220 so that the signal to be integrated is within the effective bandpass of these integrators. In other words, 308 $f_o$ carrier phase estimate $PHI_{est}$ 192 applied to phasor counter rotator 220, as shown in FIG. 7 and FIG. 9, must accurately reflect the 308 $f_o$ implicit carrier frequency of the signal from GPS satellite 12 is received to within about 50 Hertz.

Similarly, frequency estimate 39 maintains 30-bit C/A code group delay estimate $TAU_{est}$ 876 generated by phase register 840, and 308 $f_o$ carrier phase estimate $PHI_{est}$ 856 generated by delay register 842, reasonably accurate even when GPS satellite 12 happens to be momentarily obscured. Operating in this manner is akin to navigating by dead reckoning, that is, maintaining an estimate of position based on a previously known position and an estimate of the change of position determined from an assumed rate of change of position multiplied by elapsed time. Frequency adder 908 may be configured to add together phase error signal 198 and carrier frequency register output 900 to produce frequency sum 906, if and only if, above threshold indication 410 indicates that phase error signal 198 is available. If above threshold indication 410 indicates that phase error signal 198 is not available, then frequency estimate 39 may be substituted for phase error signal 198. Even if phase error signal 198 is available, frequency estimate 39 may be used by frequency adder 908 for "rate aiding" purposes.

Carrier frequency register output 900 which, as mentioned, is contained in and generated by 16-bit frequency register 902, represents the amount by which phase register 840 would be incremented or decremented every time, 110,000 times per second, if there were no input to phase adder 898 from phase error signal 198. Thus 16-bit frequency register 902 may correctly be called a phase rate register. If the phase-locked loop formed by 308 $f_o$ carrier phase and C/A code delay error detector 190 and phase and group delay register subsystem 196 is in phase lock, then carrier frequency register output 900 represents a measurement of the frequency of the 308 $f_o$ L1 band center frequency carrier implicit in GPS signals 15 as received.

EXAMPLE 14

Figure 14A:
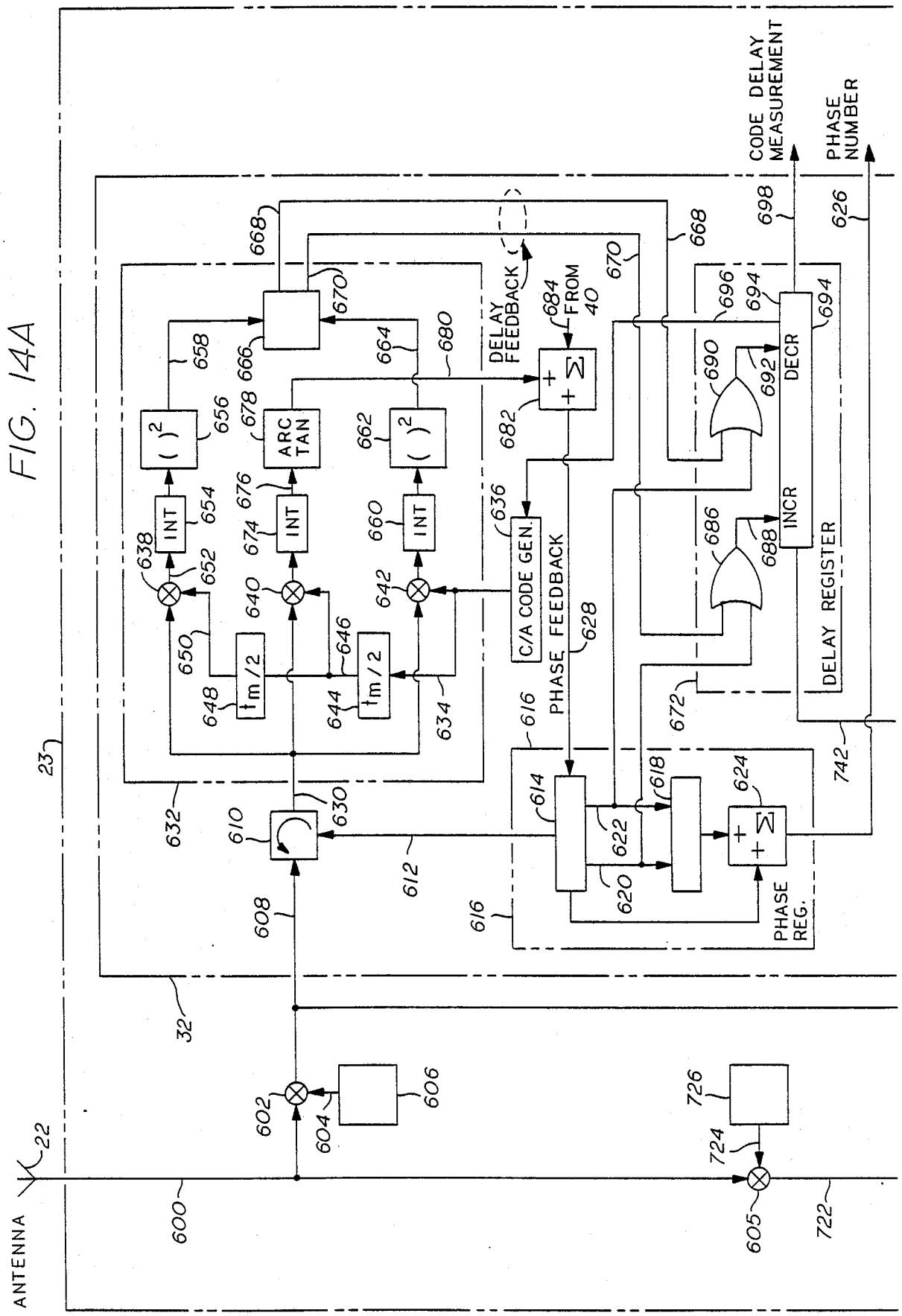
FIG. 14, formed by the combination of FIG. 14A and FIG. 14B, is a detailed signal flow diagram of the overall system shown in FIG. 2.
Figure 14B:
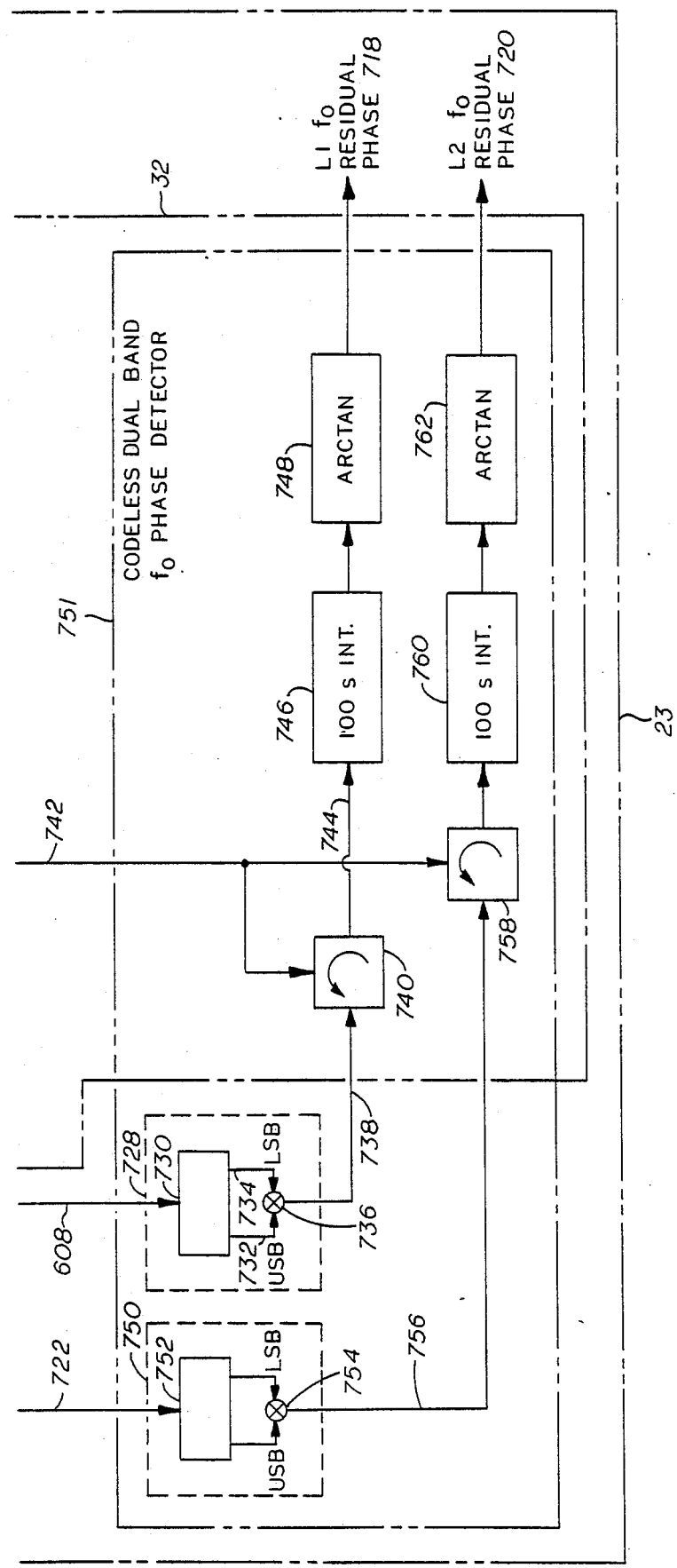

Referring now to FIG. 14, a simplified, conceptual signal flow diagram is presented for the purpose of explaining the operation of terminal 23, including the operation of and interconnection between the various phase and delay locked loops and other related feedback control and measurement loops within the signal processing circuitry.

In this conceptual signal flow diagram, for simplicity, some details which were disclosed in the discussions of the other Figures have been omitted. In particular, some of the signals discussed with reference to the earlier Figures were described as having analog form, and some were described as having digital form. Some of the digital signals were represented with different numbers of bits and some of the signals were complex signals with both in-phase and quadrature parts, that is, real and imaginary parts. In this FIG. 14, however, such details are not shown. Signals are discussed without regard to analog or digital form, multiple parts or bits.

Also for simplicity in FIG. 14, multiple satellite tracking channels 32 are not shown. The operation of one such satellite tracking channel 32 is discussed in terms of the signals from only one GPS satellite. It should be understood that parallel operations are performed simultaneously or concurrently for the signals from each of the plurality of GPS satellites being observed.

Antenna 22 receives a composite of overlapping, spread spectrum L band radio frequency signals simultaneously from a plurality of GPS satellite. The composite of signals received by antenna 22 in the L1 and L2 frequency bands is applied by transmission line 600 to a pair of mixers 602 and 605. In mixer 602, the L1 band signals are down converted by mixing with locally generated, 308 $f_o$ local model 604 from local oscillator 606. It should be noted that all oscillators and other time-critical circuits and operations shown in FIG. 14 are governed by a single frequency standard, not shown, similar to frequency standard 28 shown in FIG. 2.

Video frequency output 608 from mixer 602 is applied to counter rotator 610 which subtracts the phase of phase estimate 612 from video frequency output 608 to generate output video signal 630.

If the frequency of the center frequency carrier wave, nominally at a frequency of 308 $f_o$, implicit in the signals in transmission line 600 is greater than the frequency of 308 $f_o$ local model 604, then the phase of the carrier implicit in the satellite signals in increasing more rapidly with time than the phase of 308 $f_o$ local model 604. The phase of the center frequency carrier wave implicit in video frequency output 608, generated by mixer 602 as the product of the satellite signals and 308 $f_o$ local model 604, therefore increases with time.

The phasor which represents video frequency output 608 is therefore rotating in the positive, that is, the counterclockwise direction in the complex plane. The rate of rotation in revolutions per second equals the frequency difference, in Hertz, between the frequency of the implicit center frequency carrier of the satellite signals and the frequency of 308 $f_o$ local model 604. The Doppler shift of the satellite signals as received, due to the relative motion between the satellite and receiving antenna 22, is usually the main cause for this frequency difference. Typically, the Doppler shift of the 308 $f_o$ carrier implicit in received GPS satellite signals is on the order of a few kiloHertz. In other words, the rotation rate of the phasor representing video frequency output 608 is several thousand revolutions per second.

Counter rotator 610 may be said to rotate the coordinate axes of the complex plane so that, with respect to the new rotating axes, the signal phasor is not rotating so rapidly.

Phase estimate 612 represents an angle in the range zero to one cycle, or zero to 360 degrees. This angle is the instantaneous angle, modulo one cycle, by which the rotated coordinate axes, to which output video signal 630 is referred, are rotated with respect to the stationary coordinate axes, to which video frequency output 608 is referred, by counter rotator 610. Phase estimate 612 varies with time and may increase or decrease.

Phase estimate 612 is formed in phase register 616 from a combination of externally derived and internally derived information. The term "internally derived information" refers to information derived from measurements performed within satellite tracking channel 32. Such measurements include measurements of signal properties in addition to 308 $f_o$ implicit carrier phase observable PHI. The term "externally derived information" refers to information derived from sources external to satellite tracking channel 32. Externally derived information may include a priori information derived from signals received at other locations, such as shore station 18 shown in FIG. 1, and information derived from measurements, within other satellite tracking channels 32 within the same terminal 23, of signals received from other satellites by antenna 22.

Accordingly, phase register 616 receives phase feedback 628 which includes information from within satellite tracking channel 32 via phase value 680 and from real time computer 40 via rate information 684, which may be generated by real time computer 40 based on information from a wide variety of other sources.

The goal is to have the phase angle of phase estimate 612 rotate at very nearly the same rate as the phase angle of the video signal phasor representing video frequency output 608. Ideally, the phase angle of phase estimate 612 would rotate at the same rate as the phase angle of video frequency output 608 so that the phase angle of output video signal 630 from counter rotator 610 would be stationary. Ideally, the value of this stationary phase angle would be zero. When the phase angle of output video signal 630 is near zero, phase estimate 612 is nearly equal to, and may serve as a measurement of, the phase of the 308 $f_o$ center frequency carrier from the selected satellite implicit in video frequency output 608, that is 308 $f_o$ implicit carrier phase observable PHI.

It is sufficient for normal operation to have reduced the rotation rate of output video signal 630 to less than about 50 revolutions per second. Thus, the frequency, that is, the time derivative of phase estimate 612, should be no more than 50 Hertz different from the frequency of the 308 $f_o$ center frequency carrier implicit in video frequency output 608 from the selected satellite. If the rotation rate has been successfully reduced to less than about 50 revolutions per second it is possible, as discussed below, to average the signal over a time interval of 0.01 second without having the phasor rotate more than halfway around the complex plane during this interval. It is desired to average the signal for a time interval of the order of about 0.01 second in order to reduce the effects of noise and interference which may be present. Averaging for about 0.01 second reduces the effective bandwidth of terminal 23 to about 100 Hertz, that is, to the reciprocal of the integration time. A long integration time, and thus a narrow bandwidth, are described to reduce noise, etc., but the integration time must not be so long that the phasor to be integrated or averaged rotates more than about one-half cycle. If the phasor rotates a full cycle, its integrated or average value will be zero.

The signals received from the GPS satellites are not continuous wave signals with smoothly time-varying phases. The phase of each orthogonal component of a GPS satellite signal is, in fact, very rapidly switched back and forth between two different values 180 degrees apart due to the bi phase modulation applied in the satellite's transmitter. The rate of this switching is about one million times per second for the C/A code-related component of the satellite signal, and ten million times per second for the P-code-related component, and in either case is much more rapidly than the rate of rotation of the phasor discussed above. Thus, the "instantaneous" phasor representing video frequency output 608 at each instant of time switches back and forth between two points on opposite sides of the origin of the complex plane very rapidly, and these two points while remaining on opposite sides of the origin move relatively slowly around a circle centered on the origin of the plane.

The 308 $f_o$ center frequency carrier wave implicit in the satellite signals may be represented by a rotating, but non-switching, phasor which points to either one of the diametrically opposed rotating points. The carrier of a GPS satellite signal is suppressed by the modulation in the satellite because the average resultant position of the "instantaneous" phasor is exactly midway between the two opposite points, and therefore at the origin of the complex plane.

If not distinction can be made between the two opposite points, then the phase angle of this suppressed, implicit carrier is ambiguous by 180 degrees. This half-cycle ambiguity may be resolved, or eliminated, if one of the opposite points can be distinguished from the other. Such a distinction can be made if a certain pattern in the bi phase modulation is know which can serve to identify one of the two phase points as the "zero" phase point, as opposed to the 180-degree phase point. The pattern of the C/A code function, in combination with a related pattern such as the frame synchronization pattern of the GPS navigation data modulation, may be used. Even partial knowledge of such patterns may be sufficient to distinguish the two phase points. An example of sufficient partial knowledge that the C/A code sequence contains unequal numbers of "1" and "0" bits, in combination with knowledge of a fragment of, or a partial pattern in, the navigation data.

Counter rotator 610 removes most of the rotation rate or angular velocity of the phasor but it does nothing to remove the very rapid, e.g. million times per second, flickering or jumping back and forth of the instantaneous phasor between the two diametrically opposed points on the circle centered on the origin of the complex video plane. To remove that flickering, the received signal is multiplied by C/A code replica 634 which jumps back and forth in nearly perfect synchronism with the jumping of the received signal.

C/A code replica 634 is a replica, or "model", of the C/A code component of the modulation of the signal transmitted by the chosen satellite. C/A code replica 634 is generated in C/A code generator 636 and is multiplied with output video signal 630 in correlator 632. The timing of the generation of C/A code replica 634 is governed by time delay estimate $TAU_{est}$ 696 from delay register 672.

The time delay of C/A code replica 634 must continuously be adjusted to track the time delay of the signal received from the satellite. The time delay of C/A code replica 634 is controlled by delay estimate 696 which is contained in, and generated by, delay register 672.

Like the contents of phase register 616, the contents of delay register 672 are adjusted to track the satellite signal by a combination of externally derived information as well as information derived by observation of the satellite signal. However, while phase register 616 is adjusted to track the center frequency carrier phase, which is related to the phase delay of the signal, delay register 672 is adjusted to track the group delay of the signal.

Separate but interconnected registers are used for the phase delay and the group delay estimates despite the fact that the phase delay and the group delay of the satellite signal are affected virtually equally by a change in range, that is, by a position displacement of the satellite along the line of sight from receiving antenna 22. A range change of this type results in a change in the time required for the signal to propagate through space from the satellite to the receiver.

One reason for generating separate phase delay, or "phase", and group delay, or "delay", estimates, with separate registers is that the phase delay and the group delay of the signal are not equally affected by propagation through the earth's ionosphere. Another reason for maintaining separate estimates is that multipath propagation of the signal affects the phase delay and the group delay unequally. Another reason is that the integer-cycle or half-integer cycle ambiguity of the implicit carrier phase observable is quite different from any ambiguity of the group delay observable. Another reason is that the two observables have different biases and therefore should be treated separately.

308 $f_o$ implicit carrier phase observable PHI has the best precision of the observables. Its equivalent distance precision is of the order of one centimeter or less, essentially because the wavelength of the 308 $f_o$ implicit carrier wave is so short, about 19 centimeters, and because errors stemming from multipath and noise tend to be a small fraction, typically about 1/20th, of the relevant wavelength. The precision of 308 $f_o$ implicit carrier phase observable PHI is also the best in a temporal sense. This phase may be measured accurately based on only 0.01 seconds of signal integration, or averaging. Thus, relatively rapid random motions of receiving antenna 22 do not prevent accurate measurement, and a rapidly varying position may be determined as a function of time with excellent temporal resolution as well as excellent spatial resolution.

The main disadvantage of the 308 $f_o$ carrier phase observable is that, in part because the wavelength is so short that the intrinsic integer-wavelength ambiguity in the interpretation of the phase is difficult to resolve, the observed value of 308 $f_o$ carrier phase is biased by an unknown amount of potentially enormous magnitude. This bias must be determined if full advantage is to be taken of the power of this observable. As long as observations are made continuously, or effectively so, the temporal variation of the phase may be followed or tracked, so that the continuous series of observations contains only one constant additive bias. Therefore, a long time is potentially allowable for the determination of the bias.

The bias in the time-series of 308 $f_o$ carrier phase observations may be determined by one or a combination of methods. One method takes advantage of the fact that the partial derivative of a phase observable with respect to a position coordinate, a clock synchronization parameter, a satellite orbital parameter, or any of most other parameters which might be unknown and required to be determined, varies with time due to the motion of the satellite across the sky.

While these partial derivatives reflecting the sensitivities of the observable to all other unknown variables vary with time, the partial derivative of the observable with respect to the additive bias remains constant, equal to one. Therefore a set of simultaneous equations relating all the unknowns to the observations at the series of observation times may be solved to obtain a unique, or a least-squares, solution separating the solution for the bias from the solutions for the other variables.

Although this general approach may be employed for the determination of the time-varying position of a moving vessel, additional information is required to solve the bias problem. If no additional information were available, then for each time there would be one or more additional independent position-related unknowns. With the additional presence of a bias unknown, there might be more unknown, and a unique solution would therefore be impossible. However, given a sufficient number of satellites being observed simultaneously for a sufficiently long time, and given sufficient continuity of both the observation series and the position series or trajectory, a useful solution may still be made for the set of relevant biases simultaneously with a set of variables representing the trajectory.

Another method for determining the bias in the time-series of 308 $f_o$ carrier phase observations is to utilize observations of some other observable. This method may be utilized alone or in combination with the above described method. The other observable may be the phase of another implicit carrier of a different frequency. If the second carrier frequency is sufficiently low, then its wavelength may be great enough that its integer or half-integer wavelength ambiguity can be resolved, for example by the use of a priori position information. If the second carrier frequency is close to the 308 $f_o$ frequency, then it may be possible to resolve the integer ambiguity associated with the beat frequency between the two carrier frequencies. The latter, beat-frequency approach is akin to the method of "wide-laning" used in navigation with the Omega system.

A significant problem in the use of any other carrier phase observable to resolve bias ambiguity is that the new observable does have its own bias and ambiguity problems. If the effective wavelength associated with the second carrier phase observable, either used directly, or used indirectly as in the beat-frequency case, is very great, then the integer wavelength ambiguity may easy to resolve but by the same token, the precision of the resulting position determination is poor. The positional precision would be poor because, in general, imprecision tends to increase proportionally with wavelength.

Conversely, if the effective wavelength associated with the second carrier phase observable, used either directly or indirectly as in the case of a beat-frequency wavelength, is very small, then the potential precision is correspondingly very good; but unfortunately this potential may be unrealizable because it is impossible to resolve the integer ambiguity.

Therefore, in the preferred embodiment, an observable other than a carrier phase observable is used to determine the bias in the carrier phase observation. In the preferred embodiment, C/A code group delay observable TAU is used for this purpose. C/A code group delay observable TAU is a group-delay observable. Because the C/A code is a periodic function with a period of one millisecond, the so-called "code phase", which is the delay measured in code periods modulo one, has a potential ambiguity of 300 kilometers, the distance traveled by a signal in one millisecond. Such widely spaced ambiguities may be resolved conveniently by means of very crude a priori position information. This ambiguity is also resolvable through the use of the 50-bit-per-second navigation data modulation of the GPS signal, either by decoding the navigation message, or by measuring the phase of the 25 Hertz carrier associated with this modulation. These methods of resolving the integer-millisecond ambiguity may be combined.

The precision of C/A code group delay observable TAU is limited, mainly by noise and multipath effects, typically to the level of about 15 meters. This is the level of precision which may be obtained with a relatively short signal integration or averaging time, of the order of one second or less. This level of precision is related to, and essentially is determined by, the bandwidth of the C/A code modulation, which is of the order of one MegaHertz. It may be noted that one wavelength at one MegaHertz is 300 meters, and that 15 meters is 1/20th of 300 meters.

The noise and multipath effects which account for most of the error in an "instantaneous", i.e. one-second-average, measurement of C/A code group delay observable TAU are relatively large, but usually they are not significantly biased, in the sense that the error may be reduced to a relatively small value by averaging a series of observations over a long time. Quantities related to the observations, such as series of instantaneous position determinations, each such determination derived from C/A code observations of a plurality of satellites at one instant of time, may also be time-averaged. However, such an approach suffers from the problem that the desired position information may be time-varying, and it may be desired to determine position instantaneously, not on a long-time-averaged basis. Conventional time averaging would yield unacceptable data related to the average position of ship 10 during the integration period, not its actual position.

In the preferred embodiment, measurements of C/A code group delay observable TAU are utilized to determine position, and a long time average is performed in such a way that fluctuating errors in these observations are reduced, or averaged out. However, the C/A code delay measurements are not simply time-averaged directly, because the position of receiving antenna 22 may be varying with time and it is not desired to average the position information.

Instead, the difference between 308 $f_o$ implicit carrier phase observable PHI and C/A code group delay observable TAU for the same satellite at the same time is taken, and this difference as a function of time is time-averaged. Before the difference is taken, of course, both observables must be expressed in the same units, for example time delay, or equivalent distance. Motion of antenna 22, or of the satellite, does not cause this difference to vary, except to the extent that motion may cause errors such as multipath effects to fluctuate. Thus, the bias in the difference between 308 $f_o$ implicit carrier phase observable PHI and C/A code group delay observable TAU is determined for each satellite, without any undesired averaging of time-variable position-related information.

Since the series of C/A code delay observations does not contain a significant bias, the result of time averaging the difference between 308 $f_o$ implicit carrier phase observable PHI and C/A code group delay observable TAU is just the bias of 308 $f_o$ implicit carrier phase observable PHI. Having thus been determined, this bias is subtracted from the original series of 308 $f_o$ implicit carrier phase observable PHI observations to obtain a "new" series of 308 $f_o$ implicit carrier phase observable PHI observations which are free of significant bias, yet they retain their original excellent precision both in position and in time.

The ionosphere, however, adds to the group delay and subtracts from the phase delay of signals received from a satellite, when both delays are defined such that a displacement of the satellite along the line of sight to the receiving antenna would cause equal changes, with the same sign, in both observables. Therefore, when the difference is taken between 308 $f_o$ implicit carrier phase observable PHI, which is a phase delay observable, and C/A code group delay observable TAU, which is a group delay observable, the effects of the ionosphere do not cancel. In fact they add, doubling the effect.

In order to eliminate the effect of the ionosphere, observations may be made simultaneously of the phases of other carrier waves implicit in the GPS signals received. In the preferred embodiment, the other carrier waves which are observed in part for the purpose of eliminating ionospheric errors in position determination are waves with frequencies equal to $f_o$. One such $f_o$ carrier is implicit in the signals received from each satellite in the L1 band, and one is implicit in the L2 band signals received from each satellite. The phases of these carriers indicate the group delays of the signals in the two bands. These two group delays, and thus the respective $f_o$ carrier phases, are equally affected by a position displacement of the satellite along the line of sight from receiving antenna 22, that is, by a change in the time required for the signal to propagate through space. However, they are not equally affected by the ionosphere.

The group delay indicated by C/A code group delay observable TAU, which is derived from a signal component in the L1 band, and the group delay indicated by L1 band implicit $f_o$ carrier phase observable $PSI_{L1}$ are derived from the signals in the same band and have equal contributions from the ionosphere. However, the group delay indicated by L2 band implicit $f_o$ carrier phase observable $PSI_{L2}$ is greater by a factor of $(77/60)^2$, the square of the ratio of the two band center frequencies. The difference between the group delays in the two bands due to the ionosphere is therefore (2329/3600) times the group delay in the L1 band.

The contribution of the ionosphere to the group delay in the L1 band is determined by multiplying the difference between the L2 and the L1 band $f_o$ phase measurements by (3600/2329). $f_o$ carrier phase is converted to group delay simply by dividing the phase by the carrier frequency, which is the same for each band.

The difference between the L2 and the L1 band $f_o$ phase measurements has a half-integer ambiguity which must be resolved. This ambiguity is easily resolved because the spacing of the equivalent distance ambiguities, one-half wavelength at a frequency of $f_o$, one wavelength at 2 $f_o$, or about 30 meters, is large.

As mentioned above, the difference between L2 band implicit $f_o$ carrier phase observable $PSI_{L2}$ and L1 band implicit $f_o$ carrier phase observable $PSI_{L1}$ is sensitive to the ionosphere but is insensitive to the position of ship 10. The effect of the ionosphere on this difference observable is known a priori to be less than about 15 meters, or less than one-half cycle of phase. Thus, in practice there is not significant ambiguity in the (L2 band implicit $f_o$ carrier phase observable $PSI_{L2}$)-(L1 band implicit $f_o$ carrier phase observable $PSI_{L1}$) difference. The value of the half-integer bias is zero.

As mentioned above, the effect of the ionosphere on the 308 $f_o$ L1 band center frequency carrier phase delay is equal and opposite to the effect on the L1 band group delay. Therefore the effect of the ionosphere on the "fundamental" 308 $f_o$ carrier phase observations may be determined, and removed.

Even if there were no ionosphere to be accounted for, the L1 and L2 band $f_o$ carrier phase observations would contribute usefully to the position determination, because each represents a group delay measurement which is useful for the purpose of determining the bias of the 308 $f_o$ carrier phase observations by the differencing and averaging approach described above in relation to the C/A code group delay observations. In fact, each $f_o$ carrier phase observation may actually be more precise than the C/A code group delay observation because the satellite signal bandwidth which contributes to each $f_o$ carrier phase observation is of the order of 2 $f_o$. As mentioned above, the equivalent position imprecision of a group delay measurement varies inversely with the bandwidth of the signal contributing to the group delay measurement. The bandwidth, 2 $f_o$, contributing to the $f_o$ carrier phase measurements is ten times the bandwidth of one MegaHertz contributing to the C/A code group delay observation.

Another advantage of the ten-times-wider bandwidth of the $f_o$ carrier phase observations is that these observations are therefore insensitive to multipath interference from reflected signals whose excess propagation path length, relative to that of the directly received signal, is greater than about 30 meters, the effective wavelength corresponding to the bandwidth of 2 $f_o$. In contrast, the C/A code delay measurements are sensitive to reflected signals with excess path lengths of up to about 300 meters, the effective wavelength corresponding to the bandwidth of about one MegaHertz. Thus, the $f_o$ carrier phase measurements help significantly to reduce the effects of multipath interference on position determination, especially on ship 10, where antenna 22 may be located atop a mast of the order of 30 meters high.

The $f_o$ carrier phase measurements may be used as described above to determine the bias in the 308 $f_o$ carrier phase measurements whether or not C/A code delay measurements are used, and whether or not the delay-locked loop which includes correlator 632 and C/A code generator 636 is locked by the action of delay error signals 688 and 692. As noted above, the functioning of correlator 632 which is normally required in order to obtain accurate 308 $f_o$ carrier phase measurements from correlator 632 and phase register 616 does require that delay estimate 696 from delay register 672 is accurate within less than one chip of the C/A code. However, it should be noted that this chip width is equivalent to about 300 meters of path length, and that position information accurate within the requisite 300 meters may be obtainable from other sources, as mentioned above.

Satellite tracking channel 32 contains means for generating measurements of the $f_o$ carrier phase relative to an estimate generated by delay register 672. These measurements of $f_o$ carrier phases are provided to real time computer 40 wherein closed loop tracking is performed by the execution of a stored program in accordance with standard techniques well known in the art. It is preferable to perform closed loop tracking of the $f_o$ carrier phases in real time computer 40, rather than with specialized hardware in satellite tracking channel 32 because these phases are so slowly varying.

Another reason for desiring to generate separate phase delay, or "phase", and group delay, or "delay" estimates with separate phase and delay registers is that, for a variety of possible causes, a valid measurement of one observable but not the other may be possible at a given time. Phase and delay registers 616 and 672 have the ability to "flywheel" or dead-reckon, even in the absence of rate information from real time computer 40, by virtue of the action of phase adder 898 and carrier frequency or 16-bit frequency register 902, as shown in FIG. 13.

As mentioned, the phase locked loops and delay locked loops in terminal 23 generally attempt to track carrier phases and C/A code delays by means of error detection and feedback control. Each loop is coupled to the others, in the sense that its output may aid the other loops, and also in that it may be aided by the outputs of the other loops. This coupling may be included in satellite tracking channel 32 as well as in real time computer 40 which furnishes estimates 38 to satellite tracking channel 32 and in return receives measurements 42. This coupling may extend beyond terminal 23, for example to data processing center 20 which, as discussed with respect to FIG. 1, exchanges data with terminal 23 by data link 21.

The generation of accurate estimates of phase and delay observables may be aided by external information input 44 from ship position and velocity information 50, as discussed with reference to FIG. 2. Ship position and velocity information 50 may include both translational and rotational information, and may include not only estimates of the translational and rotational state of the ship, but also statistical information related to this state, such as wind and sea conditions. The statistical information may be used to optimize the dynamic tracking performance of a loop. Rotational information may include information on the roll, pitch, and yaw of the ship. Such information may be combined in real time computer 40 with information on the directions of the satellite in order to predict or estimate obstruction of the line of sight to a satellite, and/or the presence of a reflection of the signal from the satellite by some part of ship 10 or by the sea surface.

A particularly useful function which may be accomplished by combination of ship and antenna position and orientation information with satellite direction information is the rejection of reflected signals. From such geometric information real time computer 40 may compute the expected effects of signal reflection and other position- and direction-dependent signal propagation effects such as antenna phase-center variations. The computed effects may be applied as correction to the observed values of phases and delays.

Means may be provided for connecting a plurality of antennas 22 to terminal 23, and corresponding satellite tracking channels 32 may be included in terminal 23 to generate measurements related to the signals received by the additional antennas. Alternatively, time-division multiplexing means may be incorporated in terminal 23, whereby signals from different antennas 22 are successively switched to terminal 23, and terminal 23 may operate on the signals from the different antennas during corresponding time intervals.

The use of multiple antennas 22 in conjunction with terminal 23 provides several benefits. One benefit is that a satellite signal could be received by one antenna while the view of the satellite from another antenna was obstructed. However, even if a satellite were simultaneously in view of more than one antenna, the simultaneous availability of observations from the plurality of antennas would be very useful. One use would be to combine the observations from different antennas to determine the relative position or baseline vector between multiple antennas 22 to derive information related to the orientation of ship 10.

If information on the orientation of ship 10 is available, from any source such as the use of multiple antennas 22 described above or from other means such as the ship's compass or an inertial navigation system on ship 10, this orientation information may be combined with the observations from multiple antennas 22 mounted at different positions on ship 10 to distinguish the signals which came directly from the satellite from other, undesired, signals which had been reflected from ship 10 or from the sea surface.

In effect, any pair of antennas 22 forms an interferometer. The baseline vector of the interferometer could be computed from the position and orientation information, as mentioned above. The expected fringe phase of the signal received from each satellite, that is the difference between the phases of the signals received simultaneously at the ends of the baseline from the satellite, may be computed from knowledge of the baseline vector and the direction of the satellite. Similarly, the fringe phase may be computed for the same interferometer receiving a reflected signal. In the latter case, the actual position of the satellite would be replaced in the calculation with the position of the satellite's reflected image. The position of the image could be computed from knowledge of the reflecting surface, which might be a surface of ship 10 such as the main deck, or the sea surface.

Based on such calculations of the fringe phases for both direct and reflected signals, a linear superposition of the complex signals received from both antennas 22 may be formed with the complex signal combination coefficients computed such that in the combined signal, the reflected-signal contributions cancelled, leaving the desired, direct-signal contributions. This superposition to reject reflections may be done on a satellite-specific basis because separate phase data are available for each satellite. The superposition can also of course be done on a continually time-varying basis.

In other words, an interferometer or set of interferometers formed by a plurality of single antenna elements may be regarded as phased array antenna forming a beam with one or more nulls. The direction of a null can be steered relative to a coordinate frame fixed with respect to the array, by varying the relative phases and amplitudes with which the signals from individual antennas are combined. A null can be steered toward the direction from which a reflected signal is expected to arrive, based on knowledge of the relative geometry of the satellite, the reflecting surface, and the array of antennas. Thus, a reflected signal can be rejected. The computations required to accomplish this rejection may be performed by real time computer 40 with multiple antennas 22 connected to terminal 23.

Returning now to the detailed operation of the tracking loops in satellite tracking channel 32 of terminal 23, it should be noted that, whereas the operation of each loop may be aided by inputs from other source, each loop may also operate autonomously. For example, the C/A code delay tracking loop in satellite tracking channel 32 may function to maintain delay lock regardless of whether any related phase-tracking loop is in lock. As mentioned above, the angular "rotation" rate of phase estimate 612 used in counter rotator 610 must be within plus or minus about 50 Hertz of the received signal's phasor rotation rate, to permit constructive integration of the signal in correlator 632 which forms part of the delay tracking loop. However, a sufficiently accurate rotation rate may conveniently be computed from external information without requiring phase lock.

Similarly, a phase-tracking loop may function to maintain phase lock whether or not a related delay-locked loop is in lock. Even in "open-loop" or unlocked conditions, phase and delay estimates may be maintained with sufficient accuracy by means of aiding information inputs from internal and/or external sources, as mentioned above.

Every feedback loop is also provided with means for recognizing which of its multiple information inputs are probably valid and therefore ought to be used. In some cases the validity decision is best made by real time computer 40 based on application of "reasonableness" and mutual-consistency criteria to the plurality of available inputs. However, validity decisions are also made within satellite tracking channel 32. For example, correlator 632 may include a comparator such as on-time signal energy indication 348, as shown in FIG. 10, in which the received signal strength is compared with a computed threshold value, every 0.01 second. Only is the signal exceeds the threshold is a phase error signal generated by correlator 632 applied to phase register 616 in order to adjust the phase estimate contained therein.

The contents of delay register 672 are adjustable by direct input of a computed value of delay from real time computer 40, as shown in FIG. 2, as well as by the feedback control action of delay error signals 668 and 670 generated by correlator 632 and fed back to delay register 672. The contents of delay register 672 are also adjusted by incrementing and decrementing signals 620 and 622 respectively, from phase register 616. These incrementing and decrementing signals may maintain an accurate delay estimate in delay register 672 even in the absence of delay error feedback signals 668 and 670. As mentioned above, phase register 616 itself is constantly receiving adjustments derived both from external information and from measurements of the received signal.

Output video signal 630 from counter rotator 610 is applied to correlator 632 wherein it is applied to mixers 638, 640 and 642 for multiplication, or cross-correlation, with C/A code replica 634 generated by C/A code generator 636. C/A code replica 634 is fed directly to mixer 642 and then to mixer 640 after being time-delayed by an amount equalling one-half the width of one C/A code chip.

The C/A code is the satellite-specific, pseudorandom, binary code according to which the instantaneous phasor representing the GPS satellite signal is switched back and forth between the two points on the circle 180 degrees apart. The code is binary, that is, the phase switches between only two values, and the temporal pattern of switching back and forth is periodic with a period of one millisecond. The code may be said to be represented by a binary function which has a value of zero when the instantaneous signal phasor is one position and a value of one when the phasor is in the other position. The function is a periodic function of time with a period of one millisecond.

During the one millisecond period, the C/A code function switches back and forth at times which, and only at times which, are integer multiples of 1/1,023rd of one millisecond. Each of the intervals between these times, that is, each 1,023rd of one millisecond, is known as a "chip" of the code or a "code chip". In delay circuit 644, C/A code replica 634 is delayed by one-half of a chip to obtain half chip delayed version 646 which is applied to mixer 640 for correlation with output signal 630. The output of mixer 640 is integrated for 0.01 seconds by integrator 674 and applied to arctangent generator 678 which generates phase signal 680 a measure of the phase of output video signal 630, with the fast bi phase switching having been removed from the signal, and with the signal having been averaged over 0.01 second. Phase signal 680 is the output of the on-time correlation channel and is applied to summer 682 along with rate estimate 684 from real time computer 40.

The channel of the correlator which includes mixer 640, integrator 674 and arctangent generator 678 is called the on-time channel because half chip delayed replica 646, which is correlated with output video signal 630 in this channel, is intended to be "on time", that is, half chip delayed replica 646 switches back and forth in synchrony with the desired satellite signal contained in output video signal 630. The other two of the three similar channels of the correlator are called the "early" channel and the "late" channel because C/A code replicas 634 and 650 switch back and forth earlier and later, respectively than "one-time" half chip delayed replica 646. The main purpose of the early and late channels is to enable an error in delay estimate 696 to be detected.

Half chip delayed replica 646 is delayed by a half chip in delay circuit 648 to generate full chip delayed replica 650 applied to mixer 638. Therefore, in mixers 638, 640 and 642, output video signal 630 is correlated with the same code sequence, except for the half-chip difference in delay. Mixer 638 generates mixer output 652 which is integrated for 0.01 second by integrator 654 before being fed to squarer 656. Similar operations are performed on the output of mixer 642 by integrator 660 and squarer 662.

If the delay of the switching function generated in C/A code generator 636, after being delayed one-half chip in delay circuit 644, exactly matches that of output video signal 630, in other words, if half chip delayed replica 646 jumps or switches back and forth in synchronism with output video signal 630, then late correlation output 658 will be essentially equal to early correlation output 664. That is, the early and the late channels of correlator 632 will yield equal outputs, except, of course, for a little jitter due to noise.

Late correlation output 658 indicates the signal energy detected by the cross-correlation between output video signal 630 and full chip delayed replica 650 during each 0.01 second integration period. Similarly, early correlation output 664 indicates the signal energy detected by the cross-correlation between output video signal 630 and C/A code replica 634. If output video signal 630 is phase-switching simultaneously with "on-time" half chip delayed replica 646, then the correlation with full chip delayed replica 650 and the correlation with C/A code replica 634 will yield the same value.

On the other hand, if the received signal is arriving somewhat earlier, early correlation output 664 will be greater than late correlation output 658. Whether the locally generated code is being generated too early or too late relative to the received signal is determined by comparing late correlation output 658 with early correlation output 664 is comparator 666. Outputs 668 and 670 from comparator 666 indicate whether the early correlator channel or the late correlator channel had greater output. Therefore outputs 668 and 670 from comparator 666 indicate whether the C/A code replica 634 should be generated earlier or later by C/A code generator 636 in order to match the on-time half chip delayed replica 646 to the signal in output video signal 630.

If the late correlation yields a higher output such that the locally generated code appears to be too early, and therefore should be delayed to bring it into alignment with the received signal, then comparator output 668 is "true". Comparator output 668 is applied to delay register 672 and causes delay estimate 696, which is contained in and generated by delay register 672 and is applied to C/A code generator 636 in order to control the delay of the code generation, to be increased.

Increasing the value of delay estimate 696 causes C/A code replica 634 to be generated earlier, not later as might otherwise infer from the label "delay". Delay register 672 is called the "delay" register to distinguish its function from the function of phase register 616. By feedback control, the contents of delay register 672 are caused to track the group delay of the C/A code component of the received satellite signal. The term "group delay", which is commonly used in physics and in geodetic and astrometric radio interferometry, is the negative of the derivative with respect to frequency, of the phase of the signal. "Group delay" is also known as "envelope delay" and as "modulation delay", in electrical engineering and communication. If a signal arrives later, its group delay is increased. Group delay observables are sometimes called "pseudorange".

It should also be remembered that some observables called "phase", such as C/A code phase and $f_o$ carrier phase, are basically group delay observables; whereas some observables occasionally called "delay" may be basically phase delay observables.

In the preferred embodiment, if the satellite signal arrives later, its group delay is increased, but delay estimate 696 will decrease, and so will phase estimate 612 contained in and generated by phase register 616. The signs of the contents of delay estimate 696 and delay register 672 are defined such that both contents change in the same direction in response to a change of the distance between the satellite and antenna 22. If the satellite moves closer, that is, if the range of the satellite decreases, then both the phase estimate and the delay estimate should increase.

Special consideration must be given to the peculiar effects of the ionosphere on the propagation of radio signals. At frequencies such as those of the GPS L1 and L2 bands, the ionosphere acts to increase the apparent distance of the satellite as indicated by C/A code group delay observable TAU which is tracked by delay register 672 in cooperation with correlator 632. At the same time, however, the same ionosphere acts to decrease the apparent distance of the satellite as indicated by 308 $f_o$ implicit carrier phase observable PHI which is tracked by phase register 616 in cooperation with correlator 632. Thus, 308 $f_o$ implicit carrier phase observable PHI and C/A code group delay observable TAU give contradictory indications of the apparent change of satellite-to-receiver distance which is due to the ionosphere.

Accordingly, an increase of ionospheric density causes phase estimate 612 to increase, as though the satellite moved nearer, and the same increase of ionospheric density causes L1 band implicit $f_o$ carrier phase observable $PSI_{L1}$ and L2 band implicit $f_o$ carrier phase observable $PSI_{L2}$ to decrease. These phase observables are related to the group delays, not the phase delays, of the signals received in the L1 and L2 bands.

The group delay for each band, and therefore the phase shift of the $f_o$ carrier implicit in the signals received in each band, is inversely proportional to the square of the center frequency of each band. Thus, a given amount of ionization along the upper-atmospheric path between the satellite and the receiver causes a decrease of the phase of the L1 $f_o$ carrier equal to $(77/60)^2$ times the decrease of the phase of the L2 $f_o$ carrier phase. Both $f_o$ carrier phases are decreased, whereas the center-frequency implicit carrier phase in each band, e.g. The 308 $f_o$ carrier phase for the L1 band, is increased.

Now continuing the detailed discussion of FIG. 14, if the locally generated code model appears to have too little delay, or is switching earlier than the satellite signal in output video signal 630, then output 668 would be true and would cause the contents of delay register 672 to be decreased. Thus, correlator 632, together with delay register 672, form a closed feedback loop which maintains a number in delay register 672 that tracks the variations of the phase switching delay of the received signal and which is therefore a measurement or an estimate of the delay in output video signal 630.

As noted above, the C/A code function has 1,023 chips. In the early and late channels of correlator 632 only two possible delays of the code, spaced one chip apart, have been correlated with the signal. Of course, if the delay of the signal is different from that contained in delay register 672 by more than one chip neither the late channel, formed by mixer 638, integrator 654 and squarer 656, not the early channel formed by mixer 642, integrator 660 and squarer 662, will yield significant correlation. This situation in which no correlator channel yields significant correlation may occur during initialization if the initial value of delay register 672 does not agree sufficiently with the actual signal delay. If significant power is not detected in any of the correlator channels, then delay register 672 must be incremented a little bit at a time until all 1,023 possible chip delays have been explored or until the correlation with the signal is found.

The delay locked loop just described yields a measurement of the time delay of the phase switching pattern of the received signal. Another measurement of interest, as described above, is a measurement of the phase angle of the received signal phasor at particular times. This measurement is performed in an analogous manner by feedback to cause the contents of phase register 616 to track the phase of the signal phasor in video frequency output 608. Phase register 616 contains a "real" number with both a fractional cycle part and an integer or signed whole number part. The fractional cycle part is continuously updated and small phase increments much smaller than one full cycle or rotation of the phasor are added into the fractional cycle portion of the phase register at a rate of 110,000 times per second. Phase feedback 628 is applied to phase register 616 and is the sum formed by summer 682 of phase signal 680 and rate-related fractional cycle value 684 from real time computer 40. Even in the absence of a phase error, rate-related fractional cycle value 684 causes the contents of phase register 616 to vary with them. Rate-related fractional cycle value 684 may be derived from a combination of a value contained by a rate register, not shown, which is included in satellite tracking channel 32, and a value from real time computer 40.

Rate-related fractional cycle value 684 is added 110,000 times per second and is computed according to the information on the satellite's orbit and the positions and motions of the receiving antenna and the satellite as well as from phase signal 680. The amount which is added into fractional cycle lower part 614 of phase register 616 of 110,000 times per second is simply equal to the expected frequency shift of the received signal in Hertz due to Doppler shift, and any other causes, divided by 110,000.

Phase register 616 is configured in two parts, fractional cycle lower part 614 which includes all bits of the binary phase number up to and including the quarter-cycle bit, and whole cycle upper part 618 which includes the more significant bits of the number.

When the lower part of the phase number reaches and passes an integer value, the fractional cycle lower part 614 of phase register 616 generates carry signal 620 which causes whole cycle upper part 618 to be incremented by one. If the expected frequency shift of the received signal is negative, then the amounts added into fractional cycle lower part 614 110,000 times per second are negative and in this case, the lower part of the number may decrease to and pass a half-integer value.

On such an occurrence, borrow signal 622 is generated and applied to whole cycle upper part 618 of phase register 616 and causes its content to be decreased by one. The total value of phase contained in phase register 616 is indicated by phase number 626 which is the sum of fractional cycle lower part 614 and whole cycle upper part 618 formed by summer 624.

The most significant bit of fractional cycle lower part 614, together with the least significant bit of whole cycle upper part 618 of phase register 616 form phase estimate 612, modulo one cycle and with one-quarter cycle resolution or quantization, by which video frequency output 608 is counter rotated in counter rotator 610. There is no need for counter rotator 610 to receive the integer portion of the phase estimate, and the quantization error associated with the coarse, quarter-cycle, resolution of phase estimate 612 is effectively averaged out because the phase varies rapidly and nonuniformly. Hopefully, the rate at which the content of the phase register increases or decreases matches that of the selected satellite's component in video frequency output 608 within less than 50 revolutions per second in magnitude. If this condition is in fact satisfied then the angle of the phasor will rotate no more than one-half revolution in 0.01 second and the signal will survive the integration in integrators 654, 660 and 674.

Output video signal 630 is mixed with "prompt" half chip delayed replica 646 in mixer 640 and is integrated in integrator 674. Phase angle 680 is computed by taking the arctangent of the imaginary, divided by the real, parts of complex signal 676 in arc tangent generator 678. Phase angle 680 is applied as a phase error feedback signal to summer 682 which generates phase feedback 628 which is applied as a small increment 110,000 times per second to phase register 616.

By this phase feedback path, the contents of phase register 616 are increased or decreased as necessary to bring the phase estimate contained in phase register 616 into alignment with the actual received signal phasor. As the received signal phasor rotates around forward and/or backward the angle of the phasor is continuously tracked by phase register 616 and all of the turns of the phasor around the complex plane are also counted within whole cycle upper part 618 of phase register 616.

The 308 $f_o$ carrier phase of the received signal is a very precise and very rapid measure of the range or path length from the satellite to the receiver. Any increase of the path length is immediately, within about 0.01 seconds, reflected by a decrease in the contents of phase register 616. For every 308 $f_o$ carrier wavelength that the satellite moves, the phase of the received carrier signal changes by one cycle of phase and the contents of phase register 616 change by one unit. Of course, fractions of a wavelength of motion are also seen.

Phase number 626 is therefore an indication or measurement of the range to the satellite, although biased as discussed above. That is, the phase in cycles equals the distance in wavelengths, plus a bias. The bias is due to the inescapable fact that when the apparatus is first put into operation, the correct initial value of phase number 626 is not known. All changes of the received signal phase are faithfully reflected by changes in this number, but the initial value is arbitrary or meaningless.

Although the phase as a measurement of satellite to receiver range is biased, the bias does remain constant for the entire time that the satellite signal is being tracked by phase register 616 unless there is some interruption in the tracking. During such an interruption, the number of cycles of phase which would have been received if the signal had not been interrupted, may not be known correctly, or may not guessed correctly, so the contents of phase register 616 might have a different bias following the interruption. However, the difference in the bias must be an integer number of cycles. If the interruption is brief, there is a good chance that this integer change will be zero, because the 110,000 times-per-second increments of phase feedback 628 received during the interruption may have kept the phase estimate increasing at a rate very close to the actual signal's phase rate. In other words, phase register 616 will flywheel or dead-reckon accurately with error increasing by less than one cycle if the time duration of the outage is short.

In order to minimize the probability that the phase bias might change, rate-related fractional cycle value 684 applied to summer 682 is at all times are being computed from the best current information on the motion of the satellite and ship 10 and therefore of the Doppler shift and other shifts which the received signal might have. During a brief interruption of the signal, these increments from summer 682 would be very accurate predictions of the increments which phase register 616 should in fact have in order to maintain phase alignment of phase register 616 with the received signal.

The delay locked loop formed by correlator 632 and delay register 672 yields an indication or measurement of the range from the satellite antenna 22 because changes in the range are reflected not only in phase register 616 but also in delay register 672. If the satellite moves farther away, then the signal propagation time is increased and the phase-flickers arrive later. This lateness would immediately be detected by an increase in late correlation output 658, or be indicated by late correlation output 658 becoming greater than early correlation output 664. As long as this inequality persisted, comparator 666 would continue to cause delay register 672 to be increased or decreased, until finally delay estimate 696 caused the code to be generated by C/A code generator 636 with the correct delay. However it should be noted that delay register 672 would also have been receiving incrementing or decrementing inputs via carry signal 620 or borrow signal 622 from phase register 616, and that in the absence of any effects such as ionospheric dispersion which cause the group delay to vary differently from the phase delay, signals 620 and 622 by themselves would maintain a correct estimate of delay in delay register 672.

As discussed above, it is possible to determine position directly from phase number 626 from phase register 616. It is also possible to determine position by C/A code delay measurement 698, from delay register 672. As noted, an advantage of phase number 626 is that they are very precise: even a very small motion of the order of a centimeter can be detected because the wavelength of the signal is about 19 centimeters, so 1 centimeter of motion would cause a phase change of 1/20th of a cycle which could be detected.

However, these phase measurements as also noted above are biased by an unknown amount, whereas C/A code delay measurement 698 from delay register 672 do not suffer from such a bias.

As discussed above, L1 band implicit $f_o$ carrier phase observable $PSI_{L1}$ and L2 band implicit $f_o$ carrier phase observable $PSI_{L2}$ implicit in GPS signals 15 are measured, and the difference therebetween is used to determine, and to remove, the effects of the ionosphere from the measurements of 308 $f_o$ implicit carrier phase observable PHI and C/A code group delay observable TAU. Codeless dual band phase detector 751, shown in FIG. 14, yields measurements of L1 band implicit $f_o$ carrier phase observable $PSI_{L1}$ and L2 band implicit $f_o$ carrier phase observable $PSI_{L2}$.

As noted above, GPS signals 15 from GPS satellite 12 are received by antenna 22 and applied via transmission line 600 to mixer 602 for correlation with 308 $f_o$ local model 604 from local oscillator 606 to produce video frequency output 608. In addition, the signals in transmission line 600 are also applied to mixer 605 for correlation with 240 $f_o$ local model 724 from L2 band local oscillator 726 to produce L2 band video output 722. Video frequency output 608 and L2 band video output 722 are equivalent correlation products except that they were correlated with replicas of L1 and L2 band center frequency carriers, respectively.

Codeless dual band phase detector 751 receives video frequency output 608 and L2 band video output 722 from mixers 602 and 605 respectively. Mixer 605 is like mixer 602 and down-converts the L2 band portion of transmission line 600 to the video frequency band by mixing transmission line 600 with 240 $f_o$ local model 724 from L2 band local oscillator 726.

Within codeless dual band phase detector 751 video frequency output 608 is applied to L1 band $f_o$ carrier reconstructor 728 which generates L1 reconstructed carrier composite 738. L2 band video output 722 is applied to L2 band $f_o$ carrier reconstructor 750 which generates L2 reconstructed carrier composite 756. L1 band $f_o$ carrier reconstructor 728 and L2 band $f_o$ carrier reconstructor 750 are exactly alike, the only difference being that one receives an input and generates an output related to signals received in the L1 band and the other receives an input and generates an output related to signals received in the L2 band.

L1 reconstructed carrier composite 738 is applied to phasor counter rotator 740 to produce output 744 which is integrated for 100 seconds by 100 second integrator 746. The output of 100 second integrator 746 is applied to arctangent generator 748 which generates L1 $f_o$ residual phase measurement 718.

Similarly, L2 reconstructed carrier composite 756 is applied to phasor counter rotator 758 whose output is integrated for 100 seconds by 100 second integrator 760. The output of 100 second integrator 760 is applied to arctangent generator 762 whose output is L2 $f_o$ residual phase measurement 720.

L1 reconstructed carrier composite 738 from L1 band $f_o$ carrier reconstructor 728 is a composite of continuous wave signal components with frequencies near 2 $f_o$. In L1 reconstructed carrier composite 738, one continuous wave component represents the reconstructed carrier wave implicit in the signals received from each satellite in the L1 band. The frequency of each continuous wave, or reconstructed carrier component, is exactly twice that of the respective $f_o$ carrier implicit in the received signals. The phase of each reconstructed carrier is also doubled. The frequency of each reconstructed carrier is offset from exactly 2 $f_o$ due mainly to the Doppler shift of the satellite's signal as received, by an amount which varies between about plus and minus 30 Hertz, as a function of time.

The reconstructed carrier component from the particular satellite to which satellite tracking channel 32 has been assigned is selected from L1 reconstructed carrier composite 738 by phasor counter rotator 740 and 100 second integrator 746. The basis of this selection is provided by $f_o$ carrier phase estimate 742 which is generated by delay register 672 and applied to phasor counter rotator 740. The frequency, that is, the time derivative of $f_o$ carrier phase estimate 742 is extremely close, within less than about 0.005 Hertz, to the frequency of the reconstructed carrier component from the selected satellite within L1 reconstructed carrier composite 738. Therefore the phasor representing the reconstructed carrier component related to the selected satellite in output 744 from phasor counter rotator 740 rotates by less than one-half cycle during the 100 second time span of each integration performed by 100 second integrator 746. The reconstructed carrier component for the satellite to which satellite tracking channel 32 is assigned will therefore accumulate coherently during the integration which the reconstructed components for all other satellites will not. The reconstructed carrier components from other satellites will not accumulate coherently, that is, they will average to zero during the integration performed by 100 second integrator 746 because their phasor components in output 744 from phasor counter rotator 740 rotate by one or more cycles during the 100 second integration time. The other satellites'phasors rotate because their reconstructed carrier frequencies are generally not equal, within 0.01 Hertz, to the frequency of $f_o$ carrier phase estimate 742.

Thus, at the conclusion of each 100 second integration, arctangent generator 748 generates L1 $f_o$ residual phase measurement 718 which is the four-quadrant inverse tangent function of the output of 100 second integrator 746. L1 $f_o$ residual phase measurement 718 is therefore an accurate measurement of L1 band implicit $f_o$ carrier phase observable $PSI_{L1}$ for the selected satellite relative to $f_o$ carrier phase estimate 742.

$f_o$ carrier phase estimate 742 is applied to both phasor counter rotator 740 which otherwise operate in the same manner on L1 and L2 band signals, respectively.

Similarly, 100 second integrator 760 and arctangent generator 762 operate on L2 band signals from phasor counter rotator 758 to generate L2 $f_o$ residual phase measurement 720 in the same manner as 100 second integrator 746 and arctangent generator 748 operate on L1 band signals from phasor counter rotator 740 to generate L1 $f_o$ residual phase measurement 718 which is an accurate measurement of L2 band implicit $f_o$ carrier phase observable $PSI_{L2}$, for the selected satellite, relative to $f_o$ carrier phase estimate 742.

Satellite tracking channel 32 provides C/A code delay measurement 698, phase number 626, L1 $f_o$ residual phase measurement 718 and L2 $f_o$ residual phase measurement 720 to observables combiner 701, described below with respect to FIG. 15.

FIGURE 15

Figure 15A:
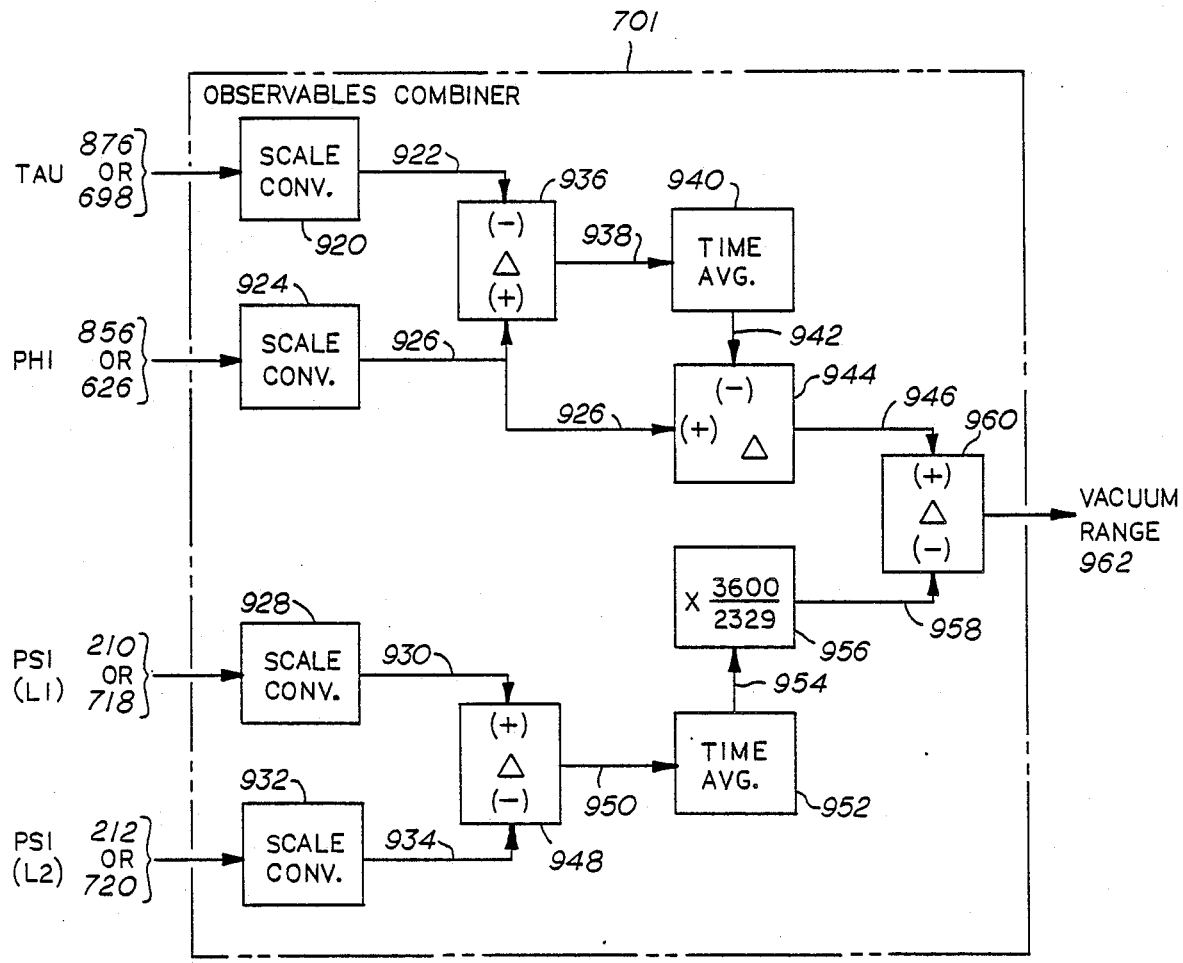
FIG. 15 shows alternate embodiments of observables combiners for combining 308 $f_o$ implicit carrier phase observable PHI, C/A code group delay observable TAU, L1 band implicit $f_o$ carrier phase observable $PSI_{L1}$ and L2 band implicit $f_o$ carrier phase observable $PSI_{L2}$ to unambiguously determine position relatively free from ionospheric degradation.
Figure 15B:
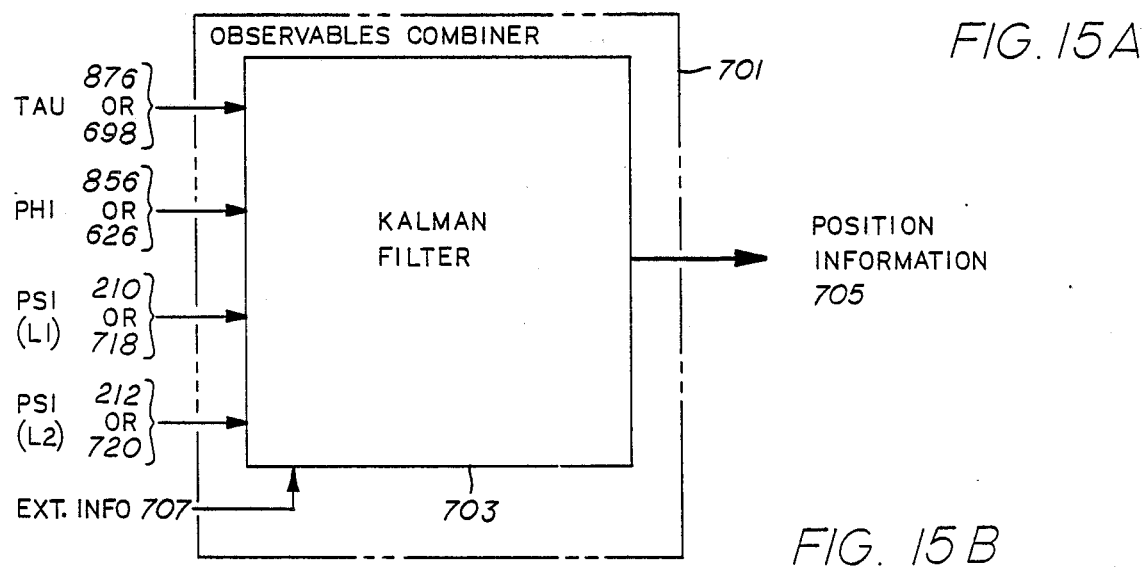
Figure 16:
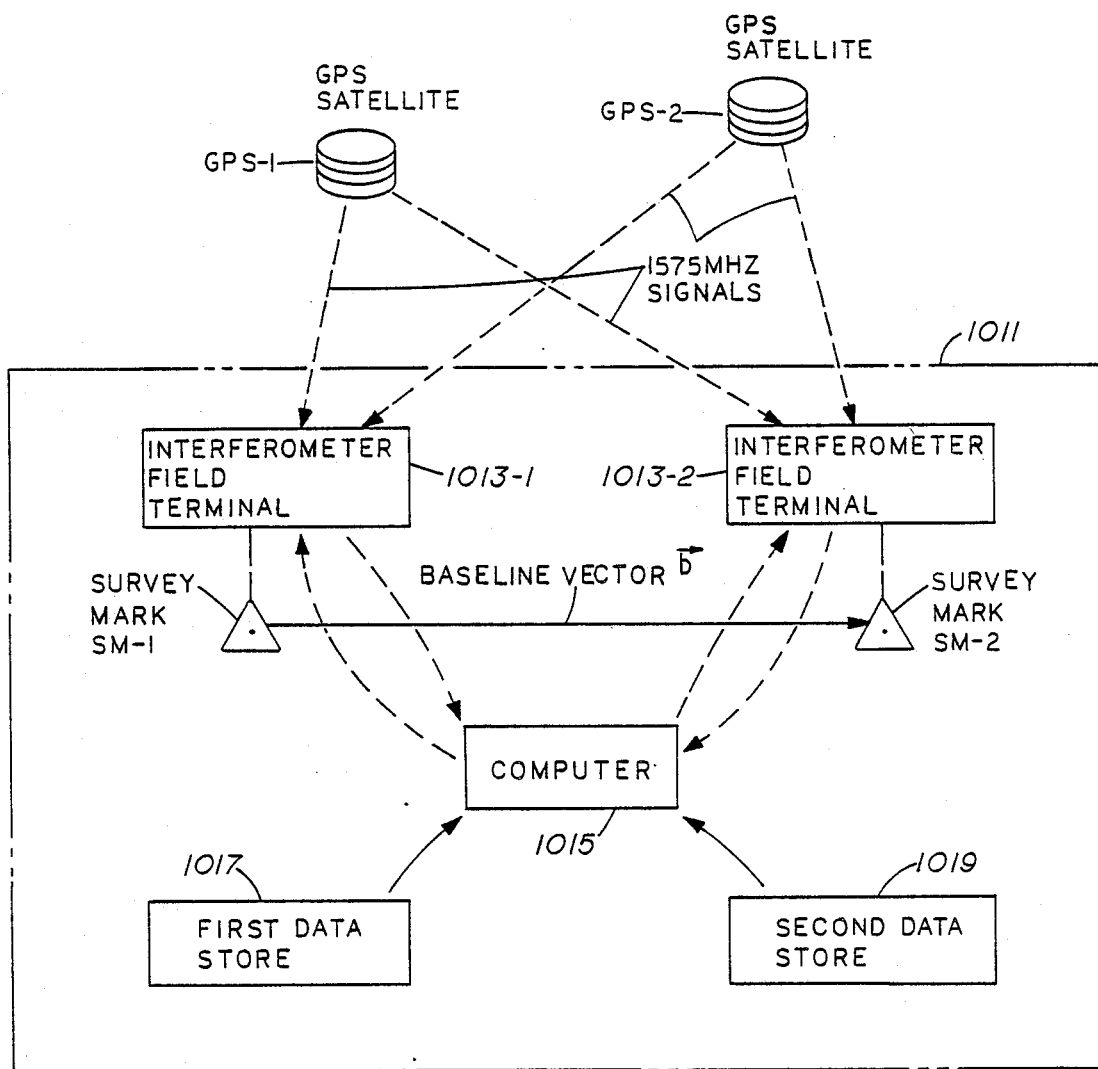
FIG. 16 illustrates a system for determining a baseline vector with GPS satellites according to the principles of an alternate embodiment of the present invention.
Figure 17:
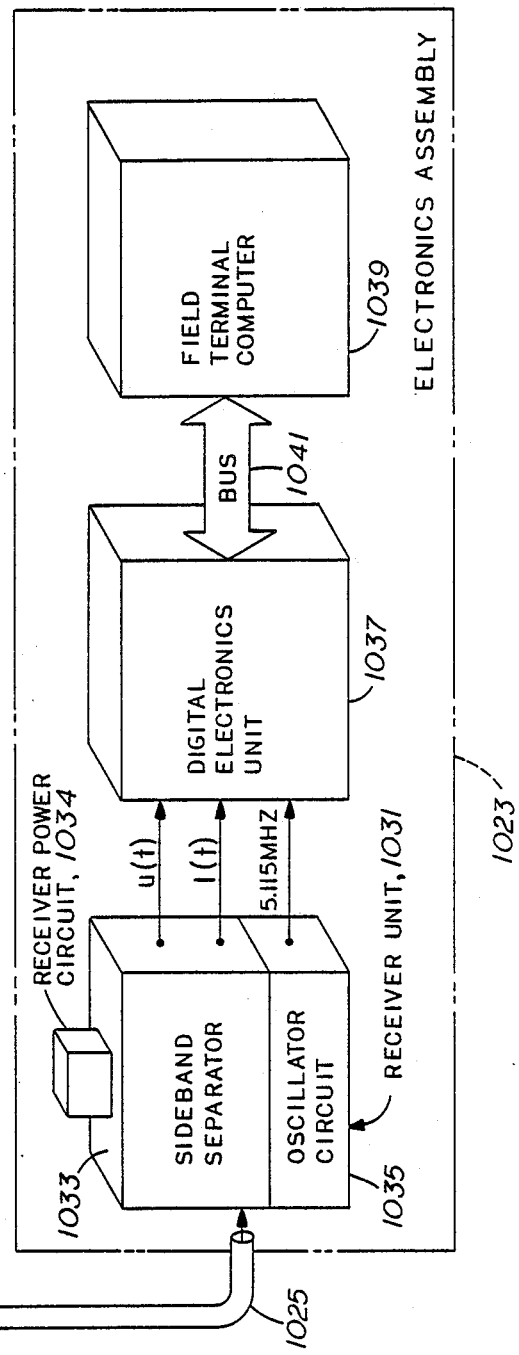
FIG. 17 is a block diagram of one of the field terminals shown in FIG. 16.
Figure 17:
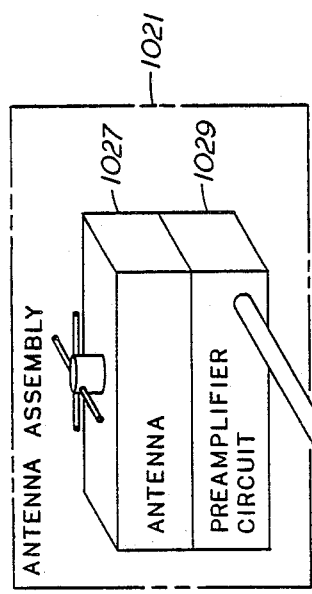
Figure 18:
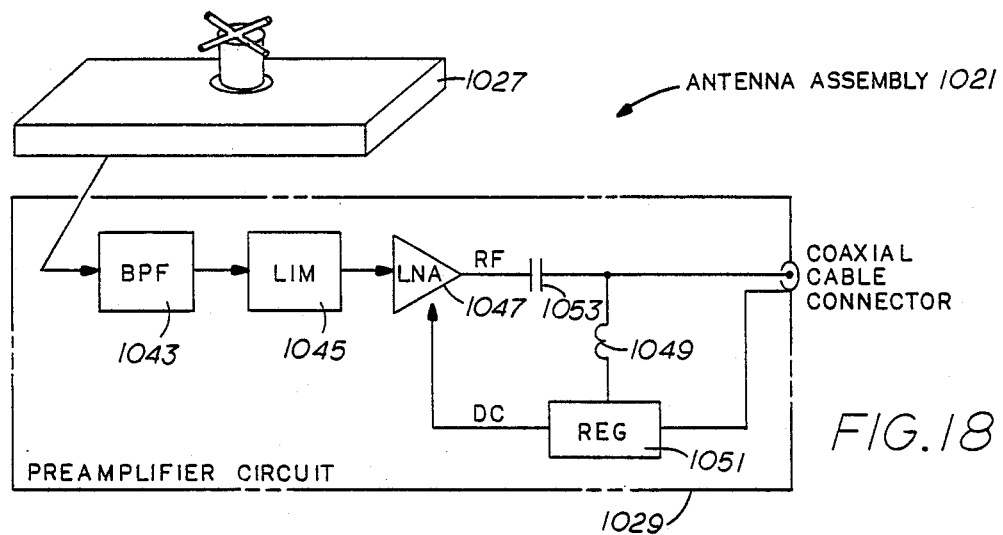
FIG. 18 is a block diagram of the antenna assembly shown in FIG. 17.

Referring now to FIG. 15, two embodiments of observables combiner 701 are disclosed. In FIG. 15A a simplified embodiment of observables combiner 701 is shown for ease of explanation of the operation thereof. The alternate embodiment of observables combiner 701, shown in FIG. 15B, is configured from a Kalman filter in accordance with techniques well known in the art. The embodiment shown in FIG. 15B is advantageous because it makes fuller use of the information content of the observables.

In the embodiment shown in FIG. 15A, observables combiner 701 receives a measurement of C/A code group delay observable TAU, such as 30-bit C/A code group delay estimate $TAU_{est}$ 876 from delay register 842 as shown in FIG. 13 or C/A code delay measurement 698 from delay register 672 as shown in FIG. 14; a measurement of 308 $f_o$ implicit carrier phase observable PHI such as 48-bit binary 308 $f_o$ carrier phase estimate $PHI_{est}$ 856 from phase register 840 shown in FIG. 13 or phase number 626 from phase register 616 as shown in FIG. 14; a measurement of L1 band implicit $f_o$ carrier phase observable $PSI_{L1}$ such as L1 $f_o$ carrier phase measurement 210 from L1 band $f_o$ carrier phase detector 206 as shown in FIG. 6 or L1 $f_o$ residual phase measurement 718 from codeless dual band phase detector 751 as shown in FIG. 14; and a measurement of L2 band implicit $f_o$ carrier phase observable $PSI_{L2}$ such as L2 $f_o$ carrier phase measurement 212 from L2 band $f_o$ carrier phase detector 208 as shown in FIG. 6 or L2 $f_o$ residual phase measurement 720 from codeless dual band phase detector 751 as shown in FIG. 14.

As discussed above, the measurement of C/A code group delay observable TAU is unambiguous. That is, the integer millisecond ambiguity potentially affecting a C/A code delay measurement has been resolved, for example as discussed above with reference to delay register 842 and group delay initial value 37 shown in FIG. 13. In this sense C/A code group delay observable TAU is therefore not significantly biased. However, it is corrupted by near-zero-mean random fluctuations of the order of 15 meters, due to noise and multipath interference, and by an error typically of the order of zero to 30 meters due to ionospheric refraction along the signal propagation path from GPS satellite 12 to antenna 22.

Since the ionospheric contribution to the measurement of C/A code group delay observable TAU can have only one sign, it might be said that C/A code group delay observable TAU is indeed biased. On the other hand, a correction for an expected value of the ionospheric effect could be applied to the measurement of C/A code group delay observable TAU, by for example an estimate from external information used in real time computer 40 or by other means not shown, so that the uncorrected, remaining effect had a zero mean in the statistical sense. Methods of generating an expected value of the ionospheric effect on a C/A code delay measurement are known. In fact, the GPS broadcast navigation data include data from which such a value may be generated. However, these data are generally not very accurate, and they may be unavailable. Therefore it is desirable to determine the ionospheric effect and thereby to remove it, based upon observed phase and/or delay characteristics of the signals received from a satellite.

As discussed with reference to FIG. 14, the measurement of 308 $f_o$ implicit carrier phase observable PHI is a biased measurement of range with an integer or half-integer cycle ambiguity, corresponding to an integer or half-integer wavelength ambiguity, which is difficult to resolve. However, the measurement of 308 $f_o$ implicit carrier phase observable PHI is a very precise indicator of variations in range. The measurement of 308 $f_o$ implicit carrier phase observable PHI includes only very small noise and multipath errors, in comparison with the measurement of C/A code group delay observable TAU. However, the error in the measurement of 308 $f_o$ implicit carrier phase observable PHI due to the ionosphere is of exactly the same magnitude as the error in the measurement of C/A code group delay observable TAU due to the ionosphere when both measurements are expressed in equivalent units, such as range units. This error is typically on the order of 5 to 30 meters of range.

In the preferred embodiment, as discussed above, the signs of the measurement of both C/A code group delay observable TAU and 308 $f_o$ implicit carrier phase observable PHI are defined such that a displacement of the satellite along the line of sight toward antenna 22 causes an increase in each of these measurements. Therefore the effects of the ionosphere in these measurements have opposite signs. That is, the ionospheric affects on the propagation of GPS signals 15 could typically be on the order of the range equivalent of 20 meters which would appear in a measurement of C/A code group delay observable TAU as an increase of group delay while the same affect would appear in a measurement of 308 $f_o$ implicit carrier phase observable PHI as a decrease of phase delay.

As shown in FIG. 14 for example, the signs of L1 $f_o$ residual phase measurement 718 and L2 $f_o$ residual phase measurement 720 are also defined such that each of these measurements would also increase if the satellite moved nearer, assuming for the moment that $f_o$ carrier phase estimate 742 did not change. Because these subcarrier phase measurements are actually group delay measurements rather than phase delay measurements, such changes would have the same sign as the changes in C/A code group delay observable TAU, (that is they would appear as increases,) rather than the sign of the changes in 308 $f_o$ implicit carrier phase observable PHI. Of course, the normal response of $f_o$ carrier phase estimate 742 to a motion of the satellite along the line of sight is to increase, so that normally neither L1 $f_o$ residual phase measurement 718 nor L2 $f_o$ residual phase measurement 720 would change.

Referring to FIG. 15A, the measurement of C/A code group delay observable TAU is applied to scale converter 920 which accepts C/A code group delay observable TAU in the numerical representation in which it was generated and generates delay range 922 which is a number representing C/A code group delay observable TAU in units of range.

The measurement of 308 $f_o$ implicit carrier phase observable PHI is applied to scale converter 924 which accepts the measurement of 308 $f_o$ implicit carrier phase observable PHI in the numerical representation in which it was generated and generates phase range 926 which is a number representing 308 $f_o$ implicit carrier phase observable PHI in the same range units as delay range 922.

Similarly, the measurements of L1 band implicit $f_o$ carrier phase observable $PSI_{L1}$ and L2 band implicit $f_o$ carrier phase observable $PSI_{L2}$ are applied to scale converters 928 and 932, respectively, which generate L1 residual range 930 and L2 residual range 934 respectively, in the same range units as phase range 926 and delay range 922.

Phase range 926 and delay range 922 are applied to L1 range subtractor 936 which subtracts delay range 922 from phase range 926 to generate L1 range difference 938, which in turn is applied to averager 940. Averager 940 generates bias estimate 942 as the average of L1 range difference 938 over a period of time. The purpose of this time averaging is to average or integrate out the fluctuations in L1 range difference 938 which are due to noise and multipath errors, so that bias estimate 942 will be a good estimate of the bias present in phase range 926. The length of the averaging period may be the total time span for which continuous observations are available.

On the other hand, it may be preferable to use a shorter averaging time, for example in order to limit the maximum possible span of time for which unbiased precise range 946 could be corrupted by an accidental "cycle slip", or step change in the bias of phase number 626, due to any momentary failure of phase tracking in satellite tracking channel 32.

Phase range 926 and bias estimate 942 are applied to bias subtractor 944 which subtracts bias estimate 942 from phase range 926 to generate unbiased precise range 946, which therefore is a measurement of range having the spatial and the temporal precision of phase range 926, and the freedom from ambiguity or bias of delay range 922. It should be noted that both phase range 926 and delay range 922 contribute to unbiased precise range 946.

In one sense it can be said that terminal 23 derives position information from observations of C/A code group delay observable TAU with the aid of observations of 308 $f_o$ implicit carrier phase observable PHI. In another, equally valid sense it can be said that terminal 23 derives position information from observations of 308 $f_o$ implicit carrier phase observable PHI with the aid of observations of C/A code group delay observable TAU. In fact, terminal 23 derives position information from a multifaceted combining of C/A code group delay observable TAU and 308 $f_o$ implicit carrier phase observable PHI, both during and after measurement in satellite tracking channel 32. Within phase and group delay register subsystem 196 as shown in FIG. 6, and as may also be seen from the interconnections of phase register 616 and delay register 672 in FIG. 14, 308 $f_o$ implicit carrier phase observable PHI and C/A code group delay observable TAU are measured interactively within satellite tracking channel 32. The measurement of each aids the measurement of the other. This interaction during measurement of 308 $f_o$ implicit carrier phase observable PHI and C/A code group delay observable TAU is different than and separable from the interaction during the combining of these observable after measurement, as performed in codeless dual band phase detector 751.

In fact, this interactive determination may be considered to be the measurement of a new and different observable, the group-phase delay observable. Measurements of the group-phase delay observable, combined as shown above, determine a new kind of range distance between the satellite and the receiver. The process may be called "MACRORANGING" measurement, and the range so measured may be called the "MACRORANGE" distance.

Only the variation, and not the average value or the constant component of phase range 926 during the observation time period, contribute to unbiased precise range 946. The average or constant component of unbiased precise range 946 is determined by delay range 922. Thus, terminal 23 may be said to derive position information from observations of C/A code group delay observable TAU.

However, the measurement of 308 $f_o$ implicit carrier phase observable PHI applied to bias subtractor 944 enhances the measurement of phase range 926 by removing its bias, which if not removed would constitute an error. Unbiased precise range 946 which is the output of bias subtractor 944 is phase range 926 with the bias error reduced. Delay range 922 contributes to the enhancement of phase range 926 by helping to reduce its bias error. Thus, terminal 23 can also be said to derive position information from measurements of 308 $f_o$ implicit carrier phase observable PHI with the aid of measurements of C/A code group delay observable TAU.

Unbiased precise range 946 is corrupted by ionospheric error due to the ionospheric errors present in both delay range 922 and phase range 926. In order to correct unbiased precise range 946, it will be combined as discussed below with a correction derived from L1 residual range 930 and L2 residual range 934 L2.

L1 residual range 930 and L2 residual range 934 are applied to L1-L2 subtractor 948 which subtracts L2 residual range 934 from L1 residual range 930 to generate L1-L2 difference 950 which measures the difference between the ionospheric delays of the GPS signals received in the two bands. L1-L2 difference 950 is time averaged or filtered in L1-L2 difference averager 952 to produce ionosphere estimate 954 which is a smoothed estimate of the ionospheric effect on the signals. The reason for the averaging or filtering performed in L1-L2 difference averager 952 is to improve the estimate by smoothing out any rapid fluctuations which might be due to noise or multipath interference, etc. in L1 residual range 930 or L2 residual range 934. Usually such fluctuations are more rapid than actual fluctuations of the ionosphere.

However, the characteristic time scale of multipath-related fluctuations may vary depending on environmental factors such as antenna height, the horizontal distance to a reflector, sea conditions, ship speed, and so on. Therefore the averaging time or filter characteristics used in L1-L2 difference averager 952 should be matched to the situation at hand. More rapid changes in the relative position of antenna 22 and potential reflectors such as the sea surface as well as rapid changes in the position of antenna 22 with respect to the satellite, caused for example by rough seas, reduce the coherence of multipath errors and permit integration periods as short as one minute. Less rapid changes may require longer integration periods on the order of several minutes. Certain ionospheric changes, known as Travelling Ionospheric Disturbances, are quasi periodic with quasi periods on the order of one half to three quarters of an hour. Integrations periods should therefore be typically less than 10 minutes in length.

Ionosphere estimate 954 is scaled by being multiplied by a factor of 3600/2329 in scaler 956. The product of this operation is L1 ionosphere estimate 958 which represents an estimate of the contribution of the ionosphere to unbiased precise range 946. L1 ionosphere estimate 958 is subtracted from unbiased precise range 946 by ionosphere subtractor 960 to produce vacuum range 962 in which the effect of the ionosphere on unbiased precise range 946 has been substantially removed, leaving vacuum range 962 which retains the temporal and most of the spatial precision of phase range 926 and the freedom from ambiguity or bias of delay range 922.

Referring now to FIG. 15B, the alternate embodiment of observables combiner 701 is disclosed. This embodiment is configured from a conventional Kalman filter, or sequential least-squares estimator, in accordance with well known techniques.

As shown in FIG. 15B, Kalman filter 703 in combiner 701 receives measurements of C/A code group delay observable TAU, 308 $f_o$ implicit carrier phase observable PHI, L1 band implicit $f_o$ carrier phase observable $PSI_{L1}$, and L2 band implicit $f_o$ carrier phase observable $PSI_{L2}$ from all satellite tracking channel 32, and related time-tag information such as digital real time indication 34 from real time clock 36 shown in FIG. 2. Kalman filter 703 also receives external information 707 which may include orbital and time correction information 46, phase & delay observations from shore stations 48, and ship position and velocity information 50 as shown in FIG. 2.

In Kalman filter 703, the preferred values of the standard deviations of the input measurement errors, expressed in range units, are on the order of 10 meters for C/A code group delay observable TAU, 1 meter for L1 band implicit $f_o$ carrier phase observable $PSI_{L1}$ and for L2 band implicit $f_o$ carrier phase observable $PSI_{L2}$, and 3 millimeters for 308 $f_o$ implicit carrier phase observable PHI.

Kalman filter 703 generates position information 705 which may include the current estimates, and the estimated covariances of the associated estimation errors, of the variables listed in the first column of the table shown in FIG. 15C. The variables and related information shown in FIG. 15C are typical of those which might be appropriate for determining the position of a ship of medium size such as a seismic survey ship, with the ship's terminal 23 equipped with a clock which is governed by a frequency standard of the commercially available rubidium-vapor type.

In Kalman filter 703 each estimated variable is modeled by a first-order Gauss-Markov process, by an integrated Gauss-Markov process, or by the sum of one of each such processes. As is known to those familiar with the art of filtering and estimation, the autocovariance of a first-order Gauss-Markov process is an exponential function of time-lag, and may conveniently be characterized by two parameters; the square root of the variance for zero lag, SIGMA; and the 1/e decay or correlation time, T. Preferred values of these two model parameters are shown for each variable in the second and third columns of the table shown in FIG. 15C. It should be noted that in some cases the preferred correlation time T is much longer than any possible time span of observation. In such cases the Gauss-Markov process resembles a random-walk process.

It should be understood that different sets of state variables, models, and/or statistical parametrizations may be more appropriate in other situations. The set given in the table is a nearly minimal set, in that a more elaborate parametrization may be desirable. For example, wave-induced motion of ship 10 might be modeled by means of damped harmonic oscillators. It may also be desired to introduce variables representing satellite orbit and clock parameters.

The first three variables, latitude, longitude, and height, describe the short-time-mean position of antenna 22, with wave-induced motion removed. The next two variables are the time derivatives of latitude and longitude, respectively. The latitude and the longitude of ship 10 are modeled by just the integrals of the respective derivative processes characterized in the table. The height of ship 10 is modeled simply by the first-order process with the characteristics listed after "Height".

The instantaneous position of antenna 22 is described by the sums of the short-time-mean latitude, longitude, and height variables, plus the respective offsets delta latitude, delta longitude, and delta height. It may be desirable to include such "delta" or position offset variables to model wave-induced motion of ship 10. Of course, these offset variables will tend to follow, or absorb, any short-term motion of antenna 22.

The epoch error of real time clock 36 as a function of time is modeled by the sum of the "Clock epoch" process and the integral of the "Clock rate" process characterized in the table.

The bias of 308 $f_o$ implicit carrier phase observable PHI for each observed satellite is modeled explicitly, by a process which amounts to a very slow random-walk.

The ionospheric range effect in 308 $f_o$ implicit carrier phase observable PHI and C/A code group delay observable TAU is modeled in a standard manner as the product of a local "zenith" value and a zenith-angle-dependent "mapping" factor which is a function of each satellite's local zenith angle. The Gauss-Markov parameters given in the table pertain to the zenith value.

As mentioned above, the a priori uncertainty of the ionosphere parameter may be so small that there is no need to estimate bias parameters related to L1 band implicit $f_o$ carrier phase observable $PSI_{L1}$ and L2 band implicit $f_o$ carrier phase observable $PSI_{L2}$. However, bias parameters for these observables for each satellite may be included in the set of estimated state variables. Very rapidly after the commencement of observations of a given satellite, the estimates of these biases should converge to the correct half-integer values, normally zero. When such convergence has been obtained, a bias parameter may be removed from the set of variables, and fixed at the appropriate half-integer value.

Kalman filter 703 preferably includes means for monitoring the validity of its input data. Cycle slips in the phase tracking, which appear as half-integer or integer step changes in the phase measurements, may be detected by known methods. The root-mean-squares of the difference between the observed and the model-computed values of the observables may also be monitored and checked against a priori assumptions. An individual observation differing by more than a few times the appropriate r.m.s. value should be rejected.

.3 An Alternate Embodiment Fig. 16 through 24

Now referring to an alternate embodiment of the present invention, a system for determining position using radio signals from GPS satellites independently of knowledge of the codes used in the modulation of the signals transmitted by the satellites is disclosed in FIGS. 16 through 24.

Major portions of the system disclosed in FIGS. 16 through 24 are substantially similar to corresponding portions of the system disclosed in FIGS. 1 through 14. For example, terminal 1013-1 shown in FIG. 16 performs many of the same functions as terminal 23 shown in FIG. 2. Receiver 24 shown in FIG. 2 includes most of the same components, or close equivalents, as receiver unit 1031 shown in FIG. 17.

In both embodiments, a first composite of spread-spectrum, suppressed carrier signals received concurrently from a plurality of GPS satellites in the L1 band is down-converted by in-phase and quadrature mixing with a 308 $f_o$ local reference oscillator to a video band of frequencies, and separated into two signals representing two different portions of the L band frequency spectrum: an upper sideband signal containing those signals which were received with frequencies greater than 308 $f_o$, and a lower sideband signal containing those signals received with frequencies less than 308 $f_o$.

Figure 19:
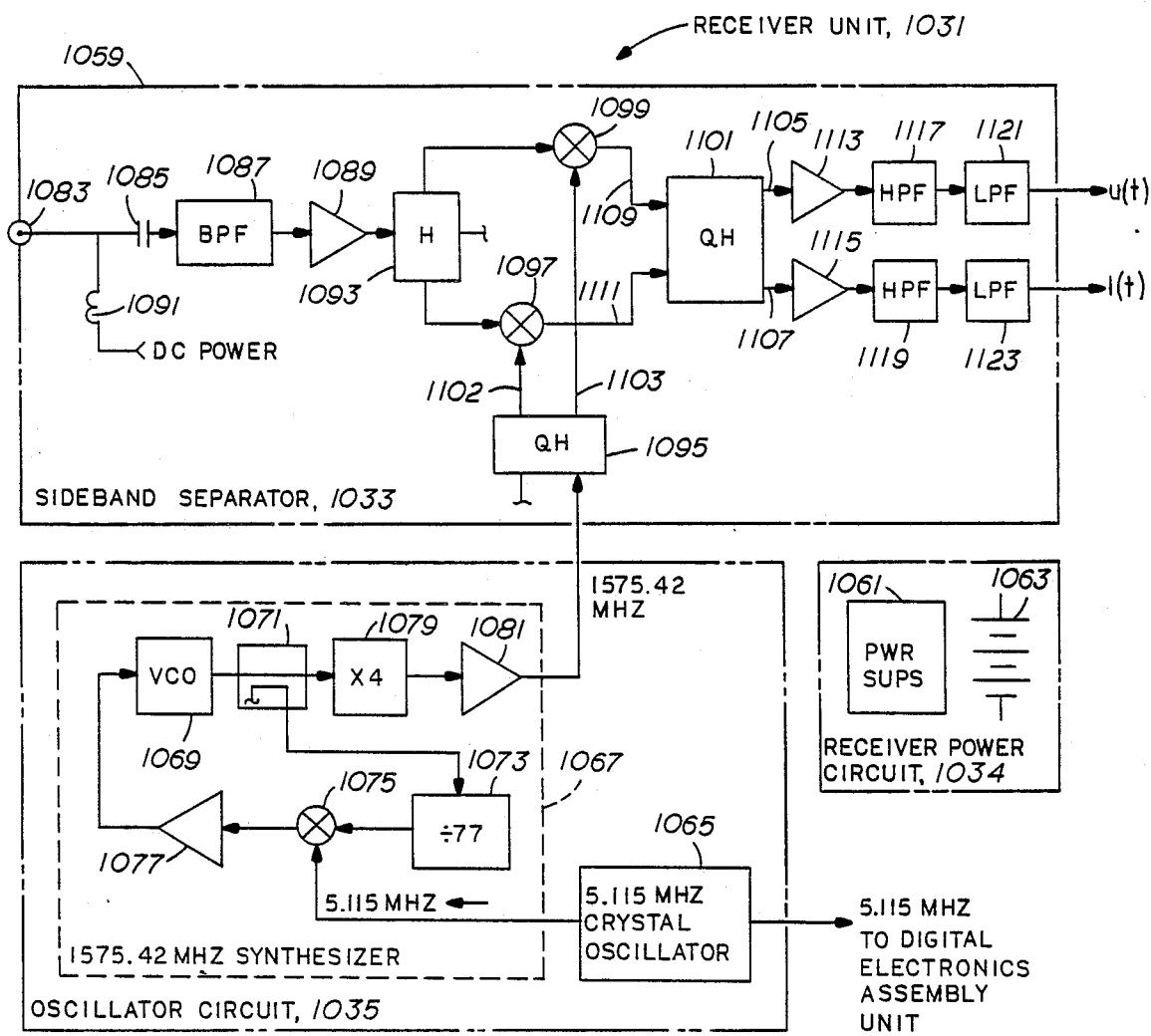
FIG. 19 is a block diagram of the receiver unit shown in FIG. 17.

Referring to FIG. 19, the upper sideband signal appears as the output of filter 1121, labeled "u(t)", and the lower sideband signal appears as the output of filter A123, labeled "1(t)". Referring to FIG. 5, the upper sideband signal appears as the input of broadband bandpass filters 146, labeled "USB 142", and the lower sideband signal appears as the input of broadband bandpass filter 148, labeled "LSB 144".

In both embodiments, the upper sideband signal is then mixed with the lower sideband signal to generate a second composite signal simultaneously including a plurality of reconstructed carrier components which are continuous waves with discrete frequencies. This mixing is performed in exclusive-nor gate 1137 shown in FIG. 21, and in mixer 150 shown in FIG. 5.

In both systems, a reconstructed carrier component of a selected satellite is separated from the other components of the second composite signal by mixing the second composite signal with in-phase and quadrature components of a local model whose frequency is varied to track the frequency of the selected reconstructed carrier component. Then, in both, systems the phase of the selected reconstructed carrier component is determined from the inverse tangent function of the integrated quadrature mixer outputs. These operations are performed within L1 band $f_o$ carrier phase detector 206 shown in FIG. 6, and mostly within correlator assembly 1137 shown in FIG. 20. The local model used within L1 band $f_o$ carrier phase detector 206 shown in FIG. 6 is $f_o$ carrier phase estimate 204 generated by phase and group delay register subsystem 196. The local model used within correlator assembly 1127 shown in FIG. 20 is generated by numerical oscillator assembly 1129.

The second composite signal as generated in each system contains reconstructed carrier components representing both the 308 $f_o$ and the $f_o$ carriers which are implicit in the L1 band signals. However, correlator assembly 1127 selects the 308 $f_o$ implicit carriers, while L1 band $f_o$ carrier phase detector 206 selects the $f_o$ implicit carriers.

Reconstructed carriers representing the 240 $f_o$ L2 band center frequency implicit carriers are generated by the mixing together of the L2-band upper and lower sideband signals within phase and group delay register subsystem 196, shown in FIG. 3, and the phases of these carriers are measurable by the same means as already discussed.

Figure 20:
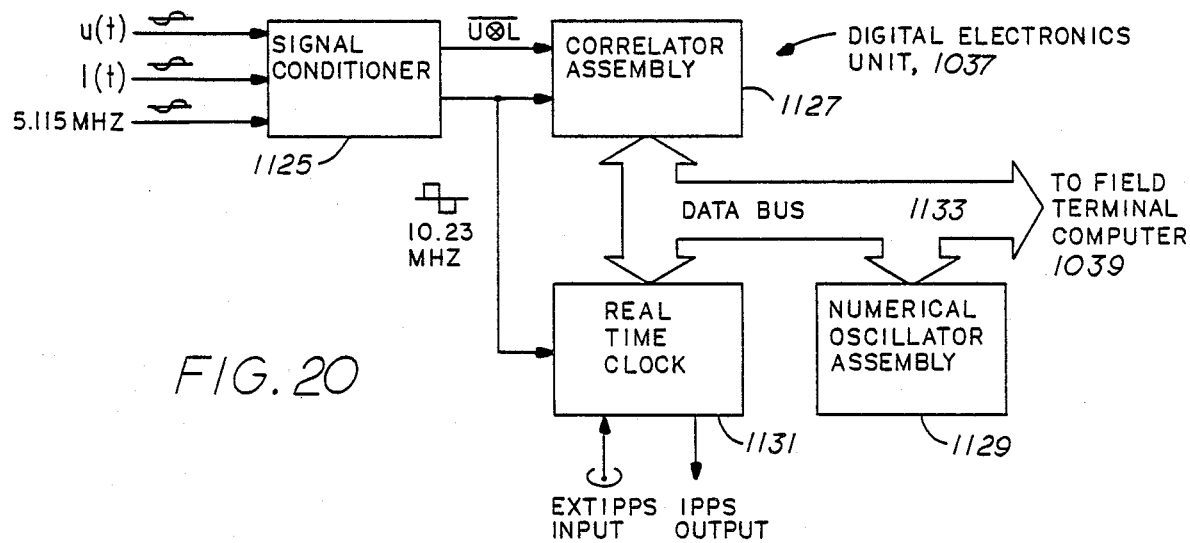
FIG. 20 is a block diagram of the digital electronics unit shown in FIG. 17.
Figure 21:
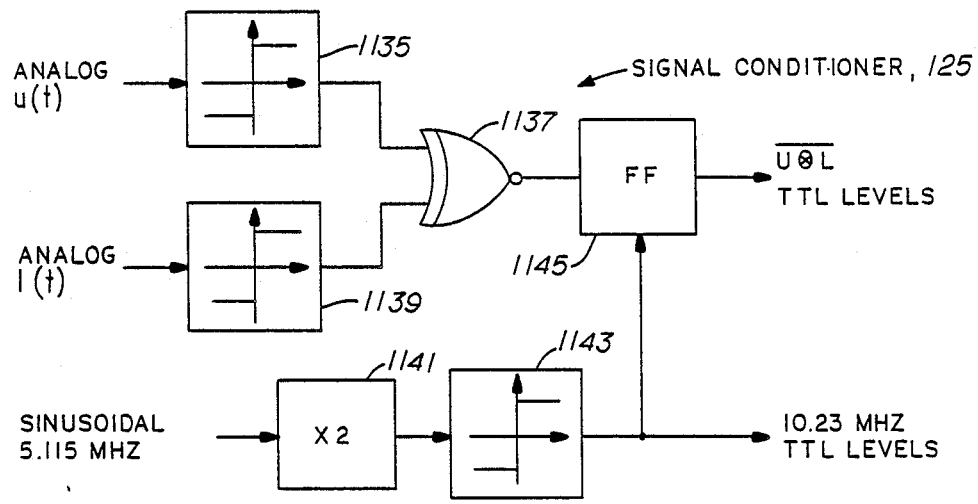
FIG. 21 is a block diagram of the signal conditioner shown in FIG. 20.
Figure 22:
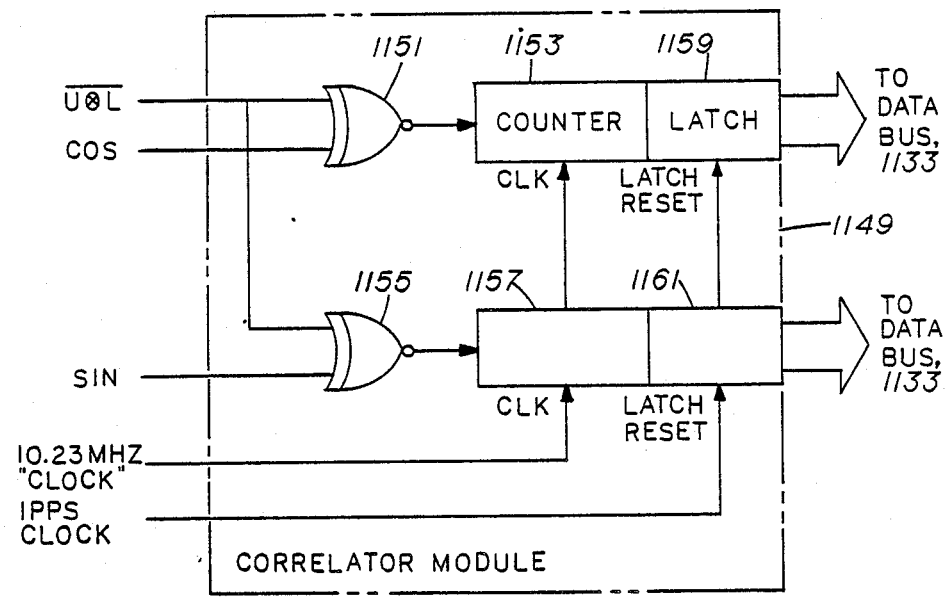
FIG. 22 is a block diagram of one of the correlator modules in the correlator assembly shown in FIG. 20.

In particular, an accurate local model could be generated by means such as numerical oscillator assembly 1129 shown in FIG. 20, or phase and group delay register subsystem 196 shown in FIG. 6, and be correlated with the second composite signal derived from the L2 band by means such as L1 band $f_o$ carrier phase detector 206 or L2 band $f_o$ carrier phase detector 208 shown in FIG. 6, or correlator assembly 1127 shown in FIG. 20.

Figure 23:
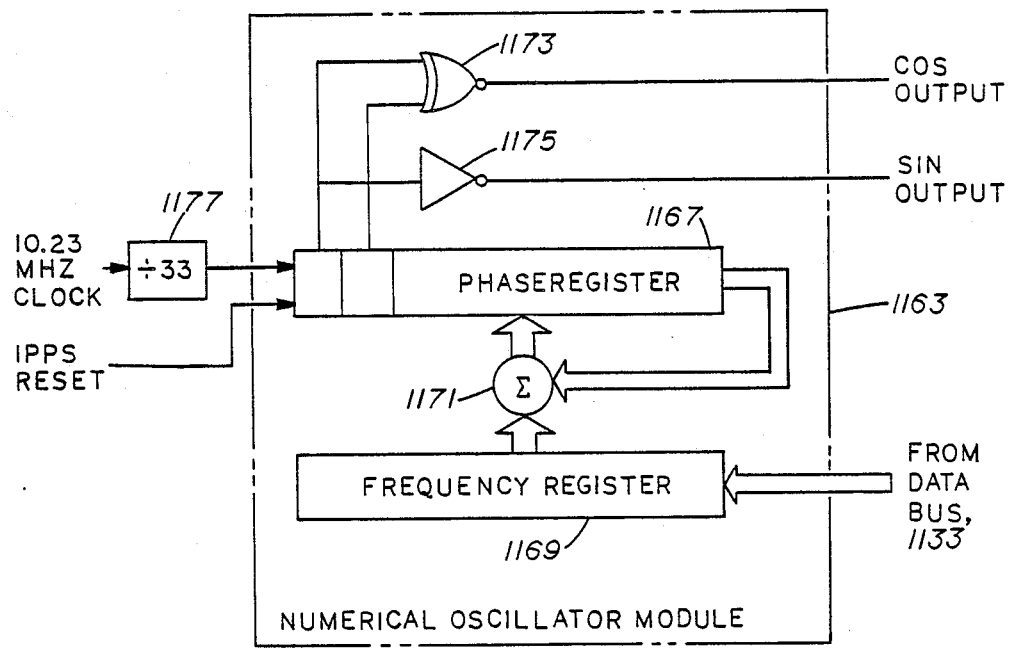
FIG. 23 is a block diagram of one of the numerical oscillator modules in the numerical oscillator assembly shown in FIG. 20.
Figure 24:
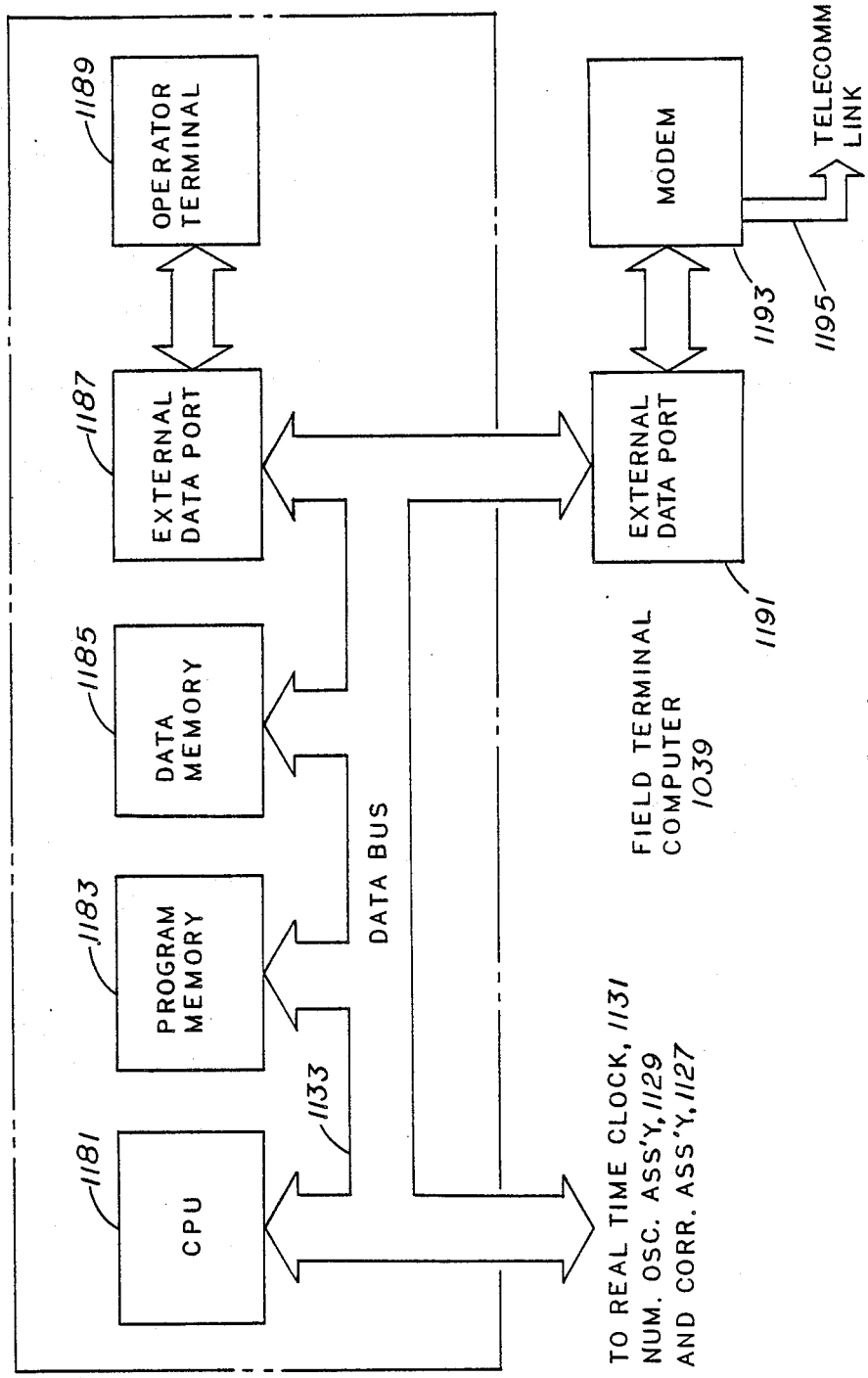
FIG. 24 is a block diagram of the field terminal computer shown in FIG. 17.

The local model signal used to separate a selected satellite's reconstructed 240 $f_o$ carrier from an L2-band related second composite signal could be derived, as indicated above with reference to $f_o$ carrier phase estimate 204, from phase register 840 shown in FIG. 13, or it could be derived from phase register 1167 shown in FIG. 23.

In the operation of the embodiment disclosed in FIGS. 16 through 24, real time clock 1131 is synchronized by means of a direct connection to the input labeled "EXT 1 PPS INPUT" and/or the output labeled "1 PPS OUTPUT" as shown in FIG. 20. In the operation of the embodiment disclosed in FIG. 2, real time clock 36 does not need to be synchronized by means of a direct connection to another clock. As discussed above, an epoch offset of real time clock 36 may conveniently be determined "internally", from the observations of pseudorange which are made by terminal 23.

The observations used for the purpose of determining the departure from synchronization of real time clock 36 are preferably measurements of C/A code group delay observable TAU such as those made by terminal 23 using the C/A code. The advantage of using C/A code group delay observable TAU for this purpose is the relative lack of ambiguity in such measurements. However, it may be convenient to determine the departure from synchronization of real time clock 36 instead, or additionally, from codeless measurements of the phases of relatively low frequency carriers such as the $f_o$ carriers, the $f_o/10$ carriers, the 1 kiloHertz carriers, the 25 Hertz carriers, and/or other carriers which are implicit in the GPS signals.

The means disclosed in FIGS. 2 through 14 for the measurement of group delay, or low-frequency carrier phases, with or without use of the C/A code, therefore provide an enhancement of the embodiment disclosed in FIGS. 16 through 24. This enhancement lessens the need for direct connection of clocks for the purpose of synchronizing them.

It should be noted that it would be sufficient, for the purpose of determining the clock epoch offset, to make just one measurement of pseudorange or group delay, of the signals received from just one satellite, at just one time, if sufficient phase measurement data were available to determine any unknown position coordinates simultaneously.

I claim:

1. A method of determining range data from a composite of code modulated, overlapping spread spectrum signals received on a moving platform from a plurality of GPS satellites, comprising the steps of:
    developing estimates of the phase and delay of selected signals inherent in the composite;
    using the estimates to measure the phase and delay of the selected signals;
    updating the estimates in response to the measurements to derive phase and delay observations; and
    time averaging the observations to derive instantaneous platform range data.

2. The method of claim 1, wherein the time averaging step further comprises:
taking differences between phase and delay observations and;
averaging the differences over a time period sufficiently long to include a plurality of independent observations.

3. The method of claim 2 wherein the time averaging step reduces phase bias in response to the delay.

4. The method of claim 2 wherein the time averaging step reduces multipath error in response to the phase.

5. The method of claim 3 or 4 wherein substantial platform motion occurs between observations included in the time averaging.

6. The method of claim 5 wherein the step of deriving the observations further comprises:
adjusting the delay estimates in response to phase changes.

7. The method of claim 6 wherein the step of deriving the observations further comprises:
monitoring an aspect of the measurements to develop an indication of the validity thereof; and
inhibiting the updating of the estimates in response to the validity indication.

8. The method of claim 7 wherein the step of deriving the observations further comprises:
changing the delay estimate by a predetermined magnitude whenever valid measurements indicate a change in the delay.

9. The method of claim 8 wherein the step of adjusting the delay estimates in response to phase changes further comprises:
modifying the delay estimate by the predetermined magnitude.

10. The method of claim 9 further comprising the step of:
continuously updating the phase estimate in accordance with an estimate of changes of platform range.

11. The method of claim 3 or 4 wherein the satellite signals are transmitted in first and second frequency bands, each being modulated by one or more mutually orthogonal codes; and the observations are related to signals in the first band of frequencies, the method further comprising the steps of:
deriving second band observations in response to the first band observations, independently of externally derived knowledge of the information content of the modulating codes applied to the second band signals;
deriving ionospheric data related to differences between the signals received in both bands; and
using the ionospheric data to reduce ionospheric effects in the instantaneous platform range data.

12. The method of claim 11 further comprising:
deriving first band subcarrier phase observations related to a first band modulating code, independently of externally derived knowledge of the information content of the modulating code; and
deriving the ionospheric data from the difference between these subcarrier phase observations and second band observations.

13. The method of claim 12 wherein the first band signals are modulated by C/A codes and the method further comprises:
applying C/A code replicas to the composite to measure delay;
applying the resultant delay observations to the composite to derive subcarrier phase observations from both bands.

14. A system for determining range data from a composite of code modulated, overlapping spread spectrum signals received on a moving platform from a plurality of GPS satellites, comprising:
registers containing estimates of phase and delay of selected signals inherent therein;
phase and delay error detection means responsive to the received composite and the estimates for determining phase and delay of the selected signals;
feedback means responsive to the phase and delay error detection means for updating the estimates to derive phase and delay observations; and
averaging means responsive to the observations for deriving instantaneous platform range data.

15. The system of claim 14, wherein the averaging means further comprises:
differential means for taking the difference between the series of phase and delay observations and;
means for averaging the differences over a time period sufficiently long to include a plurality of independent observations.

16. The system of claim 15 wherein the averaging means reduces phase bias in response to the delay.

17. The system of claim 15 wherein the averaging means reduces multipath error in response to the phase.

18. The system of claim 16 or 17 wherein substantial platform motion occurs between observations included in the time averaging.

19. The system of claim 18 wherein the feedback means further comprises:
means for adjusting the delay estimates in response to phase changes.

20. The system of claim 19 wherein the phase and delay error detection means further comprises:
monitoring means responsive to an aspect of the detection for developing a validity indication related thereto; and
the feedback control means further comprises;
means for inhibiting the updating of the estimates in response to the validity indication.

21. The system of claim 20 wherein the feedback control means further comprises:
changing the delay estimate by a predetermined magnitude whenever valid measurements indicate a change in the delay.

22. The system of claim 21 wherein the delay estimates are modified by a predetermined magnitude in response to phase changes.

23. The system of claim 19 further comprising:
estimating means for deriving an estimate of changes of platform range; and
aiding means responsive thereto for continuously updating the phase estimate.

24. The system of claim 16 or 17 wherein the satellite signals are transmitted in first and second frequency bands, each being modulated by one or more mutually orthogonal codes and the observations are related to signals in the first band of frequencies, the system further comprising:
codeless second band means for deriving second band observations in the response to the first band observations, independently of externally derived knowledge of the information content of the modulating codes applied to the second band signals;

means for deriving ionospheric data related to differences between signals received in both bands; and ionospheric correction means responsive to the ionospheric data for reducing ionospheric effects in the instantaneous platform range data.

25. The system of claim 24 further comprising:

codeless subcarrier means for deriving first band subcarrier phase observations related to a first band modulating code, independently of externally derived knowledge of the information content of that modulating code; and means for deriving the ionospheric data from the difference between these subcarrier phase observations and second band observations.

26. The system of claim 25 wherein the first band signals are modulated by C/A codes and the system further comprises:

C/A code generating means for applying replicas of the code modulation to the composite to measure delay;

satellite selection means for applying the resultant delay observations to the composite to derive subcarrier phase observations from both bands.

27. A method of deriving dual-band observations from a composite of code modulate, overlapping spread spectrum signals transmitted by a plurality of GPS satellites in L1 and L2 frequency bands and modulated by satellite specific C/A codes in the L1 band, comprising:

applying replicas of the C/A codes to the composite to detect separately the satellite specific signals modulated thereby;

deriving therefrom a first series of observations related to those satellite specific signals; and applying the first series of observations to the composite, to derive observations related to signals received in the L2 band independently of externally derived knowledge of the information content of the modulating codes applied to the L2 band signals.

28. The method of claim 27 further comprising:

applying the first series of observations to the composite to derive observations related to signals in the L1 band modulated by a code orthogonal to the C/A code, independently of externally derived knowledge of the information content of the orthogonal code.

29. The method of claim 27 further comprising:

developing satellite specific estimates of the delay of the C/A code modulated signals inherent in the composite;

using the estimates to measure the delay of those signals;

updating the estimates to derive satellite specific C/A code delay observations;

reconstructing the composite to form a composite of reconstructed L2 band signals independently of externally derived knowledge of the information content of the modulating codes applied to those signals; and applying the C/A code delay observations to the reconstructed L2 band composite to form a series of satellite specific L2 band observations.

30. The method of claim 29, further comprising:

reconstructing the composite to form a composite of reconstructed L1 band signals independently of externally derived knowledge of the information content of the related modulating codes; and applying the satellite specific L1 band delay observations to the reconstructed L1 band composite to form a series of satellite specific observations related to signals modulated by a second L1 band modulating code, independently of externally derived knowledge of the information content of that second modulating code.

31. A system for deriving dual-band observations from a composite of code modulated, overlapping spread spectrum signals, transmitted by a plurality of GPS satellites in L1 and L2 frequency bands and modulated by satellite specific C/A codes in the L1 band, comprising:

code correlating means for applying replicas of the C/A codes to the composite to detect separately the satellite specific signals modulated thereby;

means for deriving therefrom a first series of observations related to those satellite specific signals; and aiding means responsive to the first series of observations, for deriving a second series of observations from the composite related to signals received in the L2 band independently of externally derived knowledge of the information content of the modulating codes applied to the L2 band signals.

32. The system of claim 31 further comprising:

aiding means for applying the first series of observations to the composite to derive observations related to signals in the L1 band modulated by a code orthogonal to the C/A code, independently of externally derived knowledge of the information content of the orthogonal code.

33. The system of claim 31 wherein the C/A code generating means further comprises:

means for developing satellite specific estimates of the delay of the C/A code modulated signals inherent in the composite;

means responsive to the estimates for measuring the delay of those signals;

feedback means for updating the estimates to derive satellite specific C/A code delay observations;

correlation means for reconstructing the composite to form a composite of reconstructed L2 band signals independently of externally derived knowledge of the information content of the modulating codes applied to those signals; and means for applying the C/A code delay observations to the reconstructed L2 band composite to form a series of satellite specific L2 band observations.

34. The system of claim 33, further comprising:

means for reconstructing the composite to form a composite of reconstructed L1 band signals independently of externally derived knowledge of the information content of the related modulating codes; and aiding means for applying the satellite specific L1 band delay observations to the reconstructed L1 band composite to form a series of satellite specific observations related to signals modulated by a second L1 band modulating code, independently of externally derived knowledge of the information content of that second modulating code.

35. A method of determining ionospheric information, comprising:

collecting a first composite signal simultaneously including code modulated, overlapping spread spectrum signals received from a plurality of GPS satellites;

separating the first composite signal into portions representing different frequency bands each including modulation products of a particular code from each satellite;

multiplying one such portion by another to form a second composite signal including a plurality of demodulated components, each related to the modulation products from a satellite;

deriving an estimate related to the Doppler shift of the signals from a selected satellite;

combining the estimate with the second composite to select therefrom the demodulated component having a phase responsive to the difference between the ionospheric phase shifts of the signal from the selected satellite in both bands, independently of prior knowledge of the information content of the particular code from that satellite; and determining ionospheric information in response to the selected component.

36. The method of claim 35, wherein the estimate deriving step further comprises:

tracking a carrier implicit in the spread spectrum signal received from the selected satellite to update the estimate in real time.

37. The method of claim 36 wherein the estimate deriving step further comprises:

tracking the center frequency carrier of the GPS L1 band; and deriving the estimate in response to the received frequency of this carrier.

38. The method of claim 37 wherein the particular code is the GPS P or Y code.

39. The method of claim 38 wherein the second composite signal is formed in response to a portion of the first composite signal received in the GPS L2 band.

40. The method of claim 39 wherein the set of determining ionospheric information further comprises:

determining ionospheric information in response to defferential ionospheric effects between the L1 and L2 bands.

41. The method of claim 40 wherein the step of determining ionospheric information further comprises:

determining ionospheric information in response to the difference between the delays of the signals received in the L1 and L2 bands.

42. A system for determining ionospheric information, comprising:

omni-directional antenna means for collecting a first composite signal simultaneously including code modulated, overlapping spread spectrum signals from a plurality of GPS satellites;

frequency-selective means for separating the first composite signal into portions representing different frequency bands each including modulation products of a particular code from each satellite;

cross-correlation means for correlating one portion with another to form a second composite signal simultaneously including a plurality of demodulated components, each related to the modulation products from a satellite;

estimating means for generating an estimate related to the Doppler shift of the signals from a selected satellite;

codeless selection means responsive to the estimate for selecting the demodulated component from the second composite having a phase responsive to the difference between the ionospheric phase shift of the signal from the selected satellite in both bands, independently of prior knowledge of the information content of the related code;

phase detector means for determining the phase of the selected component; and processing means for determining ionospheric information in response to the phase determination.

43. The system of claim 42, wherein the estimating means further comprises:

means for tracking a carrier implicit in the spread spectrum signal received from the selected satellite for updating the estimate in real time.

44. The system of claim 43 wherein the estimating means further comprises:

means for tracking the center frequency carrier of the GPS L1 band; and scaling means responsive to the received carrier frequency for updating the Doppler shift estimate.

45. The system of claim 44 wherein the particular code is the GPS P or Y code.

46. The system of claim 44 in which the second composite signal is formed in response to a portion of the first composite signal received in GPS L2 band.

47. The system of claim 46 in which the processing means derives the ionospheric information from the difference between the signals received in the L1 and the L2 bands.

48. The system of claim 46 in which the processing means derives the ionospheric information from the difference between the delays of the signals received in the L1 and the L2 bands.

49. A method of deriving range information from a modulated, suppressed carrier signal being received from a GPS satellite, comprising:

generating a range estimate in the form of a number having a first portion and a second portion;

generating a model of the received signal in response to said range estimate, said model having a carrier component which is generated in response to the first portion of said number, and a modulation component which is generated in response to the second portion of said number;

correlating the model with the received signal to detect carrier phase and modulation delay differences between the model and the signal;

changing the first portion of said number in response to detected carrier phase differences to maintain carrier phase lock between the model and the received signal;

changing the second portion of said number in response to variations of a selected magnitude in the first portion of said number and in response to detected modulation delay differences between the model and the received signal to maintain modulation delay lock between the model and the received signals; and deriving range information from the range estimate.

50. The method of claim 49 wherein said number comprises a plurality of digits and the changing of the second portion of the number in response to the first portion of the number comprises borrowing and carrying.

51. The method of claim 49 further comprising:

deriving a phase observation of the received signal from the first portion of said number and deriving a modulation delay observation of the received signal from the second portion of said number;

determining differences between phase and delay observations;

determining the average of said differences between phase and delay observations over a time period sufficiently long to include a plurality of independent observations; and determining instantaneous range information from the observations and the averaged differences therebetween.

52. The method of claim 49 wherein the signal is received in a plurality of frequency bands, the range information is related to a component of the signal received in a first band, and a component of the signal being received in a second band has been modulated by a pseudo-random code, further comprising the steps of:

deriving a second estimate in response to the second band component of the signal, independently of prior knowledge of the information content of said pseudo-random code modulation of said second band; and applying the second estimate to enhance the range information derived from the first said range estimate.

53. The method of claim 49 wherein the received signal includes signals received in a plurality of frequency bands, the first said range estimate being related to a component of the signal received in a first frequency band, further comprising:

generating a second estimate related to a component of a signal which is received in a second frequency band; and applying the second estimate to the first said estimate to enhance the range information derived from the first said range estimate.

54. The method of claim 53 wherein the second estimate is responsive to the phase of a suppressed carrier implicit in the second band component of the received signal.

55. The method of claim 53 wherein the second estimate is responsive to the delay of the modulation of the second band component of the received signal.

56. The method of claim 49 wherein the signal from said satellite is being received in a plurality of frequency bands, and the range information is related to a component of the signal received in a first band, further comprising the steps of:

receiving in a second frequency band a composite signal simultaneously including components from a plurality of satellites including the first said satellite;

using satellite-specific Doppler shift information to select from the composite signal a component specific to the first said satellite;

deriving a second estimate in response to the selected component of the second band composite; and applying the second estimate to enhance the range information derived from the first said range estimate.

57. A system for deriving range information from a modulated suppressed carrier signal being received from a GPS satellite, comprising:

means for generating a range estimate in the form of a number having a first portion and a second portion;

means for generating a model of the received signal in response to said range estimate, said model having a carrier component which is generated in response to the first portion of said number, and a modulation component which is generated in response to the second portion of said number;

means for correlating the model with the received signal to detect carrier phase and modulation delay differences between the model and the signal;

means for changing the first portion of said number in response to detected carrier phase differences to maintain carrier phase lock between the model and the received signal;

means for changing the second portion of said number in response to variations of a selected magnitude in the first portion of said number and in response to detected modulation delay differences between the model and the received signal to maintain modulation delay lock between the model and the received signal; and means for deriving range information from the range estimate.

58. The system of claim 57 wherein said number comprises a plurality of digits and the means for changing of the second portion of the number in response to the first portion of the number comprises means for borrowing and carrying.

59. The system of claim 57 further comprising:

means for deriving a phase observation of the received signal from the first portion of said number and means for deriving a modulation delay observation of the received signal from the second portion of said number;

means for determining differences between phase and delay observations;

means for determining the average of said differences between phase and delay observations over a time period sufficiently long to include a plurality of independent observations; and means for determining instantaneous range information from the observations and the averaged differences therebetween.

60. The system of claim 57 wherein the signal is received in a plurality of frequency bands, the range information is related to a component of the signal received in a first band, and a component of the signal being received in a second band has been modulated by a pseudo-random code, further comprising:

means for deriving a second estimate in response to the second band component of the signal, independently of prior knowledge of the information content of said pseudo-random code modulation of said second band; and means for applying the second estimate to enhance the range information derived from the first said range estimate.

61. The system of claim 57 wherein the received signal includes signals received in a plurality of frequency bands, the first said range estimate being related to a component of the signal received in a first frequency band, further comprising:

means for generating a second estimate related to a component of a signal which is received in a second frequency band; and means for applying the second estimate to the first said estimate to enhance the range information derived from the first said range estimate.

62. The system of claim 61 wherein the second estimate is responsive to the phase of a suppressed carrier implicit in the second band component of the received signal.

63. The system of claim 61 wherein the second estimate is responsive to the delay of the modulation of the second band component of the received signal.

64. The system of claim 57 wherein the signal from said satellite is being received in a plurality of frequency bands, and the range information is related to a component of the signal received in a first band, further comprising:
   means for receiving in a second frequency band a composite signal simultaneously including components from a plurality of satellites including the first said satellite;
   means for using satellite-specific Doppler shift information to select from the composite signal a component specific to the first said satellite;
   means for deriving a second estimate in response to the selected component of the second band composite; and
   means for applying the second estimate to enhance the range information derived from the first said range estimate.

* * * * *